(12) United States Patent  (10) Patent No.: US 7,362,258 B2
Kawabe et al.  (45) Date of Patent: Apr. 22, 2008

(54) TRANSPONDER DETECTION SYSTEM USING RADIO AND LIGHT WAVE SIGNALS

(75) Inventors: Koji Kawabe, Saitama (JP); Satoki Matsumoto, Saitama (JP)

(73) Assignee: Honda Motor Co., Ltd., Minato-ku, Tokyo (JP)

( * ) Notice: Subject to any disclaimer, the term of this patent is extended or adjusted under 35 U.S.C. 154(b) by 291 days.

(21) Appl. No.: 11/089,354

(22) Filed: Mar. 25, 2005

(65) Prior Publication Data

US 2005/0219114 A1    Oct. 6, 2005

(30) Foreign Application Priority Data

Mar. 31, 2004  (JP)  ............................. 2004-101985
Mar. 31, 2004  (JP)  ............................. 2004-102534
Mar. 31, 2004  (JP)  ............................. 2004-102544
Mar. 31, 2004  (JP)  ............................. 2004-102559

(51) Int. Cl.
*G01S 13/74* (2006.01)
*G01S 13/42* (2006.01)
*G01S 13/86* (2006.01)

(52) U.S. Cl. ........................... 342/44; 342/54; 342/146

(58) Field of Classification Search ............ 342/42–51, 342/54, 125, 146
See application file for complete search history.

(56) References Cited

U.S. PATENT DOCUMENTS 3,721,950 A * 3/1973 Jorgensen et al. ............. 367/2
3,911,433 A * 10/1975 Redman ...................... 342/53
4,418,349 A * 11/1983 Hofgen et al. ................ 342/37
4,727,374 A * 2/1988 Boulais ........................ 342/50
4,818,998 A * 4/1989 Apsell et al. ................ 342/444
4,858,203 A * 8/1989 Hansen ....................... 367/103
5,134,277 A * 7/1992 Yerbury et al. .......... 250/214 RC
5,165,064 A * 11/1992 Mattaboni ................ 356/141.2
5,446,445 A * 8/1995 Bloomfield et al. ........ 340/521
5,448,242 A * 9/1995 Sharpe et al. ................. 342/42
5,471,212 A * 11/1995 Sharpe et al. ................. 342/51
5,525,992 A * 6/1996 Froschermeier ............ 340/10.2
5,621,412 A * 4/1997 Sharpe et al. ............ 340/10.33

(Continued)

FOREIGN PATENT DOCUMENTS

DE    196 34 487    *   8/1998

(Continued)

*Primary Examiner*—Shelley Chen
(74) *Attorney, Agent, or Firm*—Squire, Sanders & Dempsey, L.L.P.

(57) ABSTRACT

A target object detection system for detecting a target object using a detector and a tag on the target object; the tag includes a radio wave receiver receiving radio wave from the detector; a light receiver receiving a light signal from the detector; a receipt signal generator generating a receipt signal; and a transmitter which transmits the receipt signal to the detector; and the detector includes a radio wave transmitter transmitting radio wave to the surrounding area; a receiver receiving the receipt signal from the tag; a light emitter irradiating the light signal to a search region; a controller controlling the radio wave transmitter, the receiver, and the light emitter; and a target position measuring unit measuring a distance to the target object based on the intensity of the receipt signal, and regarding the irradiation direction of the light signal from the light emitter as the direction of the target-object.

19 Claims, 36 Drawing Sheets

U.S. PATENT DOCUMENTS

| | | | |
|---|---|---|---|
| 5,659,520 A * | 8/1997 | Watson et al. | 367/125 |
| 5,682,313 A * | 10/1997 | Edlund et al. | 342/127 |
| 5,686,920 A * | 11/1997 | Hurta et al. | 342/42 |
| 5,781,147 A * | 7/1998 | Elliott et al. | 342/54 |
| 5,867,800 A * | 2/1999 | Leif | 701/23 |
| 5,959,568 A * | 9/1999 | Woolley | 342/42 |
| 5,966,227 A * | 10/1999 | Dubois et al. | 398/169 |
| 6,061,015 A * | 5/2000 | Sugimoto | 342/71 |
| 6,064,330 A * | 5/2000 | Elliott et al. | 342/54 |
| 6,133,867 A * | 10/2000 | Eberwine et al. | 342/29 |
| 6,150,948 A * | 11/2000 | Watkins | 340/693.3 |
| 6,452,504 B1 * | 9/2002 | Seal | 340/825.49 |
| 6,703,935 B1 * | 3/2004 | Chung et al. | 340/572.7 |
| 2003/0013146 A1 * | 1/2003 | Werb | 435/9 |
| 2005/0054332 A1 * | 3/2005 | Sakagami et al. | 455/414.1 |
| 2005/0110639 A1 * | 5/2005 | Puzio et al. | 340/572.1 |
| 2005/0219114 A1 * | 10/2005 | Kawabe et al. | 342/47 |
| 2006/0077759 A1 * | 4/2006 | Holm | 367/128 |

FOREIGN PATENT DOCUMENTS

| | | |
|---|---|---|
| JP | 2002-098749 | 4/2002 |
| JP | 2002-307338 | 10/2002 |
| JP | 2003-091678 | 3/2003 |

* cited by examiner

AREA SEGMENTATION METHOD

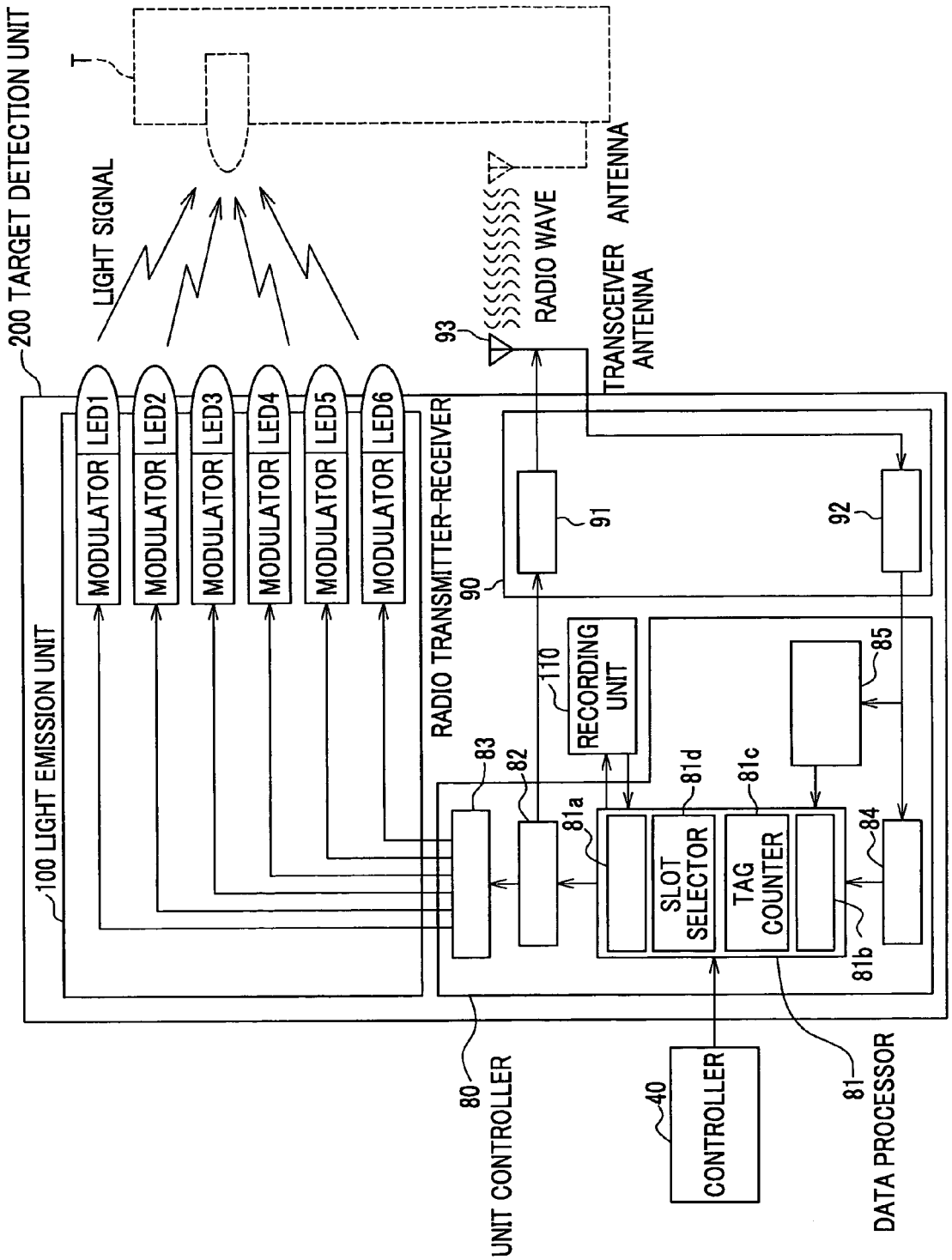

TRANSPONDER DETECTION SYSTEM USING RADIO AND LIGHT WAVE SIGNALS

BACKGROUND OF THE INVENTION

1. Field of the Invention

The present invention relates to a target object detection system, which detects a presence of a target object and measures a position of the detected target object.

The present invention, more specifically, relates to a target object detection system, which detects a presence of a target object within a surrounding area of a detection apparatus, and which measures a direction and distance of the detected target object on the basis of the position of the detection apparatus.

2. Description of Relevant Art

In recent years, an apparatus, which detects a presence of a target object within a specific area and measures the position within the specific area of the detected target objects, and the method thereof have been developed.

As an example of these conventional apparatus, apparatuses disclosed in Japanese unexamined patent publications, such as JP2002-307338, JP2003-91678, and JP2002-98749, have been discovered.

The apparatus disclosed in JP2002-307338 detects a presence of a target object by checking whether or not an infrared radiation from the target object is sensed by an infrared sensor (human sensor).

The apparatus disclosed in JP2003-91678 detects a presence of a target object using a plurality of detectors which are disposed within a specific area, and the position of the detector which sensed the target object is regarded as the position of the target object.

The apparatus disclosed in JP2002-98749 detects a presence of a target object using a plurality of transmitters, which are disposed within a specific area, and a transmitter, which is provided on a target object. In this apparatus, field intensity of radio wave transmitted from the target object's transmitter and field intensity of radio wave transmitted from the transmitter provided within the specific area are computed, and the position of the target object is measured using these computed field intensities.

In the case of JP2002-307338, however, the detection of the target object can be achieved only when the target object is within a detectable range of the infrared sensor (human sensor). That is, if the target object is out of the detectable range, the detection of the target object cannot be achieved.

In the case of JP2003-91678 and JP2002-98749, following defects exist. (1) Since a plurality of detectors or transmitters are required for detecting a target object, the cost of the apparatus becomes high; (2) If a target object moves around the wide range, the detection of the target object can be achieved only when the target object is within a specific area where detectors and transmitters are provided; and (3) Rough position of the target object can be measured but the accurate position of the target object, such as a direction and distance from the detector (transmitter), cannot be measured.

If at least one of the target object and the detector is a mobile object, for example, the area where the detector is provided for detecting the target object changes continuously. In this case, the apparatus disclosed in these references lack the effectiveness in the detection of the target object. This is because it is difficult to predict the area where target object moves around and to provide a plurality of detectors (transmitters) beforehand.

Therefore, the apparatus, which can detect the presence of the target object and measure the position of the target object without causing the above described defects, has been required.

In the above described references, additionally, the power of the transmitter, which is provided on the target object for detecting the target object, has to be turned on continuously. Therefore, the conventional transmitter has a significant scope to be improved in the power consumption.

In the above described references, furthermore, the following defects have arisen: if reflected wave due to an obstacle or a wall of buildings is received in the communication between the target object and the detector, the accurate position of the target object cannot be measured; and if a plurality of transmitters is used, the detection error of the signal due to the interference of radio waves from the transmitter has arisen.

Therefore, the apparatus, which can detect the presence of the target object and measure the position of the target object without causing the above described defects, has been required.

SUMMARY OF THE INVENTION

The present invention relates to a target object detection system for detecting a target object in a surrounding area of a detector using a tag provided on the target object.

In this system, the tag including, a radio wave receiver receiving radio wave transmitted from the detector, a light receiver receiving a light signal irradiated from the detector, a receipt signal generator generating a receipt signal when the light signal from the detector is received within a predetermined time after receiving radio wave, and a transmitter which transmits by wireless the receipt signal to the detector.

In this system, the detector including, a radio wave transmitter transmitting radio wave to the surrounding area of the detector, a receiver receiving the receipt signal transmitted from the tag, a light emitter irradiating the light signal to a search region established around the detector, a controller controlling the radio wave transmitter, the receiver, and the light emitter, and a target position measuring unit measuring a distance from the detector to the target object based on the intensity of the receipt signal when the receipt signal is received by the receiver, and the target position measuring unit regarding the irradiation direction of the light signal from the light emitter as the direction of the target-object.

In this system, it is preferable that the receipt signal generator generates the receipt signal including an emission request signal when the light signal is not received within a predetermined time after receiving radio wave, and that the controller controls the light emitter to irradiate the light signal when the receiver receives the receipt signal including the emission request signal.

In this system, a plurality of search regions are established around the detector and the detector is surrounded by a plurality of search regions. Here, the light emitter is provided as the same number as the search region, and each light emitter is directed to the corresponding search region.

Therefore, it is preferable that the light signal irradiated from each light emitter includes a unique identification number for identifying the light emitter which has irradiated the light signal, and that the receipt signal generator generates the receipt signal including the unique identification number. In this case, since the target position measuring unit can identify the light emitter which has irradiated the light signal received by the light receiver based on the unique identification number, the target position measuring unit regards the search region corresponding to the identified light emitter as the direction of the target object.

In this system, the controller controls the irradiation of the light signal such that an adjoining search region is not irradiated consecutively, when the light signal is irradiated to the corresponding search region from each light emitter.

In the system of the present invention, the tag may include a light condition distinction unit which checks whether or not the light received by the light receiver is a direct light within the search region. In this case, it is preferable that the receipt signal generator generates the receipt signal including the light condition data, which indicates the result of the check, and that the target position measuring unit determines the direction of the target object based on the light condition data in addition to the irradiation direction of the light signal from the light emitter.

In the system of the present invention, the detector may include a map database which stores a map data of an area where the detector moves around. In this case, it is preferable that the target position measuring unit determines the direction of the target object, based on map data, the irradiation direction of the light signal from the light emitter, and the light condition data, when the light received by the light receiver is not a direct light within the search region.

In this system, it is preferable that the receipt signal generator generates the receipt signal including the light condition data, when the tag receives the radio wave and light signal which are irradiated from the detector.

In this system, it is preferable that the target position measuring unit identifies the light emitter which has irradiated the light signal received by the light receiver based on the unique identification number, and the target position measuring unit identifies the direction of the target object based on the light condition data included in the receipt signal and the search region corresponding to the light emitter identified by the unique identification number.

In the system of the present invention, the tag may include an activation controller which activates the light receiver and receipt signal generator when radio wave from the detector is received. In this case, it is preferable that the receipt signal generator generates the receipt signal when the light signal from the detector is received within a first predetermined time after activating the light receiver and receipt signal generator.

In this system, it is preferable that the receipt signal generator generates the receipt signal including an emission request signal when the light signal is not received within the first predetermined time after receiving radio wave from the detector, and that the controller irradiates the light signal from the light emitter when the receiver receives the receipt signal including the emission request signal.

Additionally, it is preferable that the activation controller stops the light receiver and receipt signal generator, when the radio wave newly transferred from the detector is not received within a second predetermined time after transmitting the receipt signal including the emission request signal.

The system of the present invention may include an external device. Here, the external device generates a command signal which commands the detector to make an action defined by the command signal, and the external device stores therein the information of the target object that are correlated with a tag ID for identifying the tag provided on the target object. In this case, it is preferable that the receipt signal generator generates the receipt signal including the tag ID, and that the controller of the detector transmits the information indicating the tag ID included in the receipt signal to the external device. Additionally, it is preferable that the external device obtains the information of the target object based on the tag ID, and transmits it to the detector together with the command signal to the detector.

In this invention, the tag may include a slot storage which stores a transmission timing of a plurality of slots which are established for allowing time-sharing, the transmission timing is being correlated with the unique identification number, and a slot selector which selects one slot from among a plurality of slots based on the unique identification number included in the light signal. In this case, it is preferable that the transmitter transmits the receipt signal to the detector using a slot selected by the slot selector, and that the detector identifies the light emitter which has irradiated the light signal received by the light receiver based on the unique identification number. Additionally, it is preferable that the detector regards the search region corresponding to the identified light emitter as the direction of the target object.

In the present invention, the detector may include a tag counter which counts the number of tags for each search region based on the tag ID and unique identification number, which are included in the receipt signal, and a slot number adjustor which adjusts the transmission timing of at least one slot which is correlated with the unique identification number, based on the number of the tags counted by the tag counter. In this case, it is preferable that the light emitter irradiates an infrared light including the information indicating correlation between the transmission timing and the unique identification number, and that the tag stores the correlation between the transmission timing and the unique identification number in the slot storage.

According to the target object detection system of the present invention, radio wave is transmitted toward a surrounding area of the detector of the the system and a light signal is irradiated to the search region established around the detector. Then, the tag provided on the target object generates the receipt signal and transmits it by wireless to the detector, when radio wave and light signal from the detector are received by the tag. Then, the detector measures the distance to the target object from the detector based on the intensity of the receipt signal and regard the irradiation direction of the light signal as the direction of the target object. Thereby, the detection of the target object within the surrounding area of the detector can be achieved, and the positional relation between the target object and the detector can be recognized.

In the present invention, the light receiver and receipt signal generator are activated when the radio wave to be transferred to a surrounding area of the detector is received by the tag, and the light receiver and receipt signal generator are stopped when the radio wave newly transferred from the detector is not received within a predetermined time. This enables the reducing of a power consumption.

Especially, if the detector is a mobile robot which actuates in compliance with a command signal transferred from a base station, and the mobile robot detects the presence of the target object during the travel of the robot, the tag is turned on only when the radio wave transferred from the mobile robot (detector) is received by the tag.

This enables the reducing a power consumption of the tag. Thereby, since the life time of the tag can be increased, the time to be used for the travel of the robot can be increased and improves the freedom (flexibility) of the travel of the mobile robot (detector).

BRIEF DESCRIPTION OF THE DRAWINGS

FIG. 6 is an explanatory view for explaining the generation based on the field intensity of the information (area information) which indicates which area the target object exists in.

FIG. 30 is a block diagram of the target detection unit 200 of the robot R.

DETAILED DESCRIPTION OF THE PREFERRED EMBODIMENT

<Construction of the Target Object Detection System A>

The construction of the target object detection system A will be explained with reference to FIG. 1.

In the target object detection system A, a detector, e.g. robot R, detects a target object D, i.e. a person with a tag T, exists within a surrounding area of the robot R. The robot R measures a direction and distance of the target object D with respect to the robot R and determines the position of the target object D. That is, at least the following points are checked by the robot R: (1) how far the target object D is apart from the robot R; (2) which direction the target object D exists in.

Figure 1:
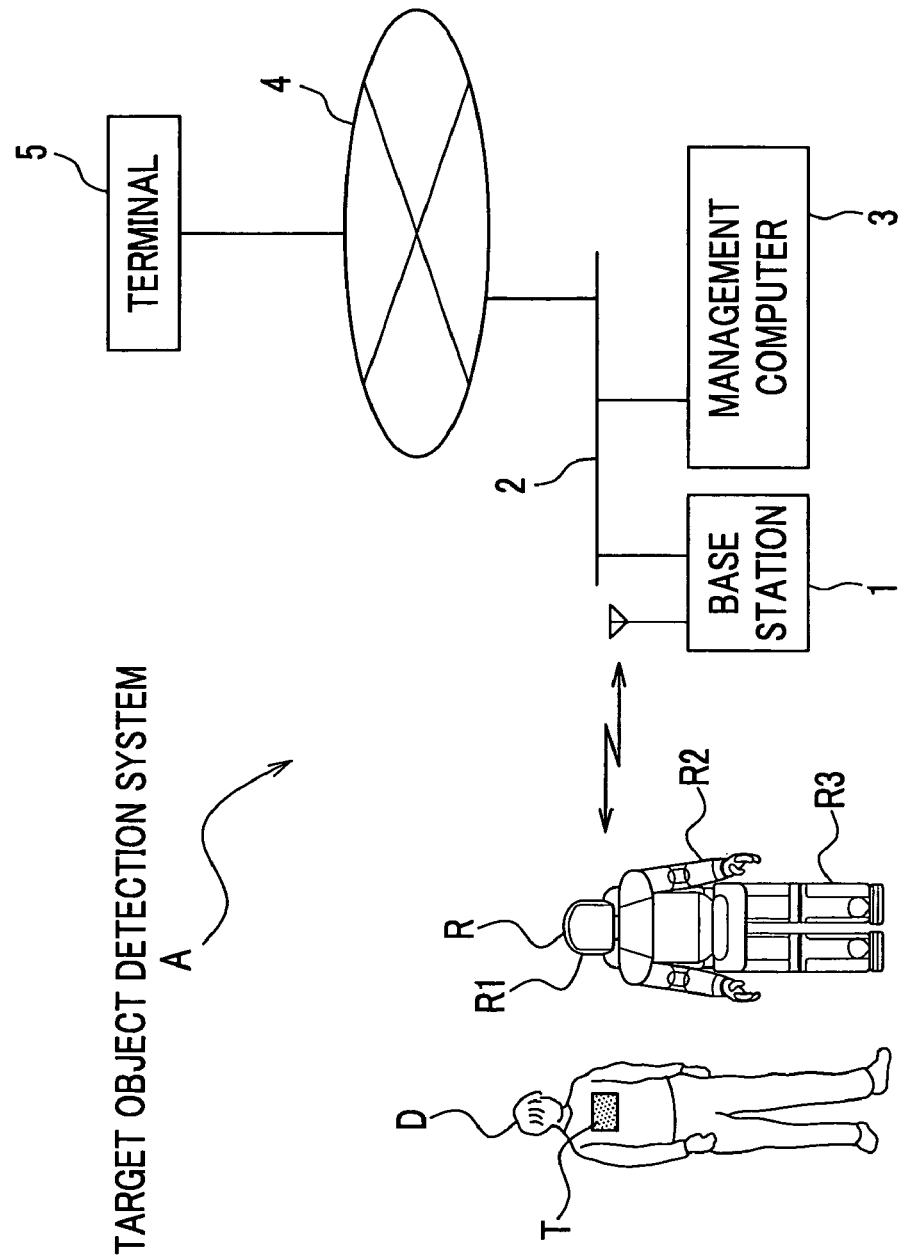
FIG. 1 is a block diagram of a target object detection system A according to the present embodiment.

As shown in FIG. 1, the target object detection system A includes a robot R, a base station 1, a management computer 3, a terminal 5, and a tag T. In this system A, the robot R communicates with the base station 1 by wireless communication. The base station 1 connects with the management computer 3 through a robot network 2. The management computer 3 connects with the terminal 5 through a network 4. The tag T is attached to the target object D. In this embodiment, the target object D corresponds to a person with the tag T In the target object detection system A, the robot R detects a presence of the target object D, e.g. a person with the tag T, and measures the position of the detected target object D. The robot R further performs a personal identification with respect to the detected target object D. That is, who is the detected target object D is detected by the robot R.

The management computer 3 performs the control of the base station 1 and controls the motion, e.g. a travel and a speech, of the robot R through the robot network 2. The management computer 3 exchanges essential information (data) with the robot R.

In this embodiment, for example, a name of a person (target object D) and a map (map information) of the area where the robot R moves around correspond to the essential information. The essential information is stored in a recording means (not shown) provided in the management computer 3.

Figure 2:
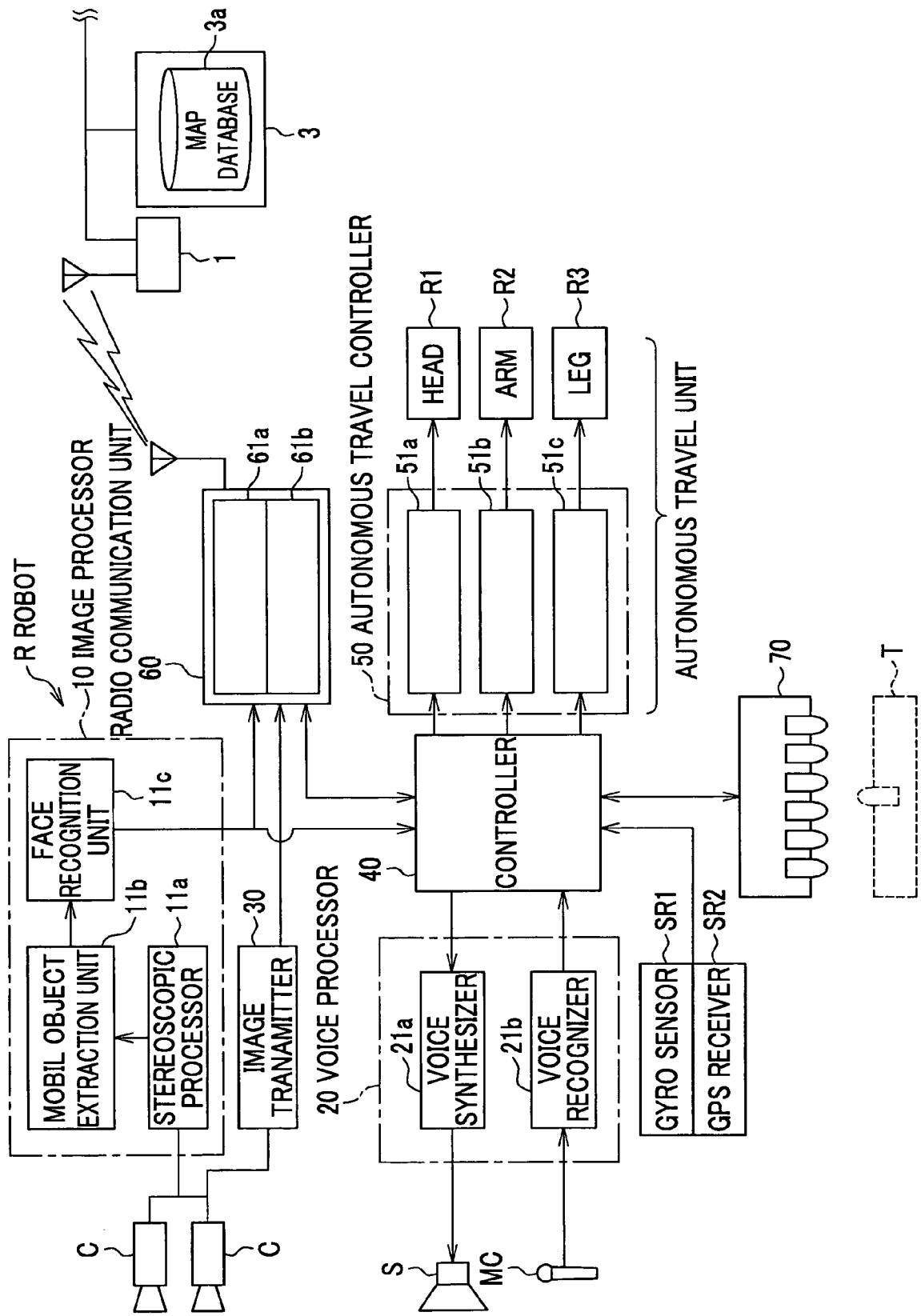
FIG. 2 is a block diagram of the robot R.

As shown in FIG. 2, map information is beforehand stored in a map database 3a of the recording means (not shown)

In this embodiment, for example, a floor plan of an office building wherein robot R conducts someone corresponds to one of contents of map information. This map information may include information which indicates the position of objects and each element in the office building, such as a position of a wall, staircase, a room, a desk, a chair, and a partition board.

The update and input of respective contents of map information can be performed using the management computer 3 and using the terminal 5 connected to the management computer through the robot network 2 and the network 4. Here, the management computer 3 corresponds to an external terminal of the robot R.

The robot network 2 connects the base station 1, the management computer 3, and the network 4 one another, and can be represented by LAN.

The terminal 5 connects with the management computer 3 through the network 4 and is used for the input and update of information, e.g. a tag T and a person (target object D) having a tag T. Here, an IC tag corresponds to the tag of the present embodiment.

Next, the construction of the robot R and the target object D (tag T) will be explained.

[Robot R]

The robot R which corresponds to the detector of the target object detection system A of this embodiment is a human-shaped autonomous mobile robot which can perform a bipedal walking.

The robot R transmits radio wave to a surrounding area of the robot R, and irradiates a light signal to search regions which are established around the robot R.

Then, the robot R computes the distance to the target object D (tag T) from the robot R, based on the field strength of the receipt signal, when a signal (receipt signal) from the target object D (tag T) has been received. Here, receipt signal is a signal which notifies the robot R that the radio wave and light signal transmitted (irradiated) from the robot R has been received by the target object D (tag T). Additionally, the robot R regards the irradiation direction of the light signal received by the target object D, as the direction of the target object D. Thereby, the robot R, based on the receipt signal, can detect the target object D and measure the position of the target object D.

As shown in FIG. 1, the robot R includes a head part R1, an arm part R2, and a leg part R3, which are respectively actuated by an actuator. The robot R is adapted to perform a bipedal walking under the control of an autonomous travel controller 50 (see FIG. 2). The detail of the bipedal walking, for example, is disclosed in Japanese unexamined patent application JP2001-62760.

As shown in FIG. 2, the robot R includes cameras C, C, a speaker S, a microphone MC, an image processor 10, a voice processor 20, an image transmitter 30, a controller 40, an autonomous travel controller 50, a radio communication unit 60, and a target detection unit 70. The robot R further includes a gyro sensor SR1 and a GPS receiver SR2 for measuring the position of the robot R.

[Camera C]

The camera C acquires images in a form of digital format. In this embodiment, for example, a color CCD (Charge-Coupled Device) camera is adopted as the camera C. Cameras C, C are arranged in a line along a lateral direction. The image acquired by the cameras C and C are supplied to the image processor 10 and the image transmitter 30. In this embodiment, the cameras C, C, the speaker S, and the microphone MC are installed within the head part R1 of the robot R.

[Image Processor 10]

The image processor 10 performs recognition of a person and an obstacle in the surrounding area, in order to recognize the condition of the surrounding area of the robot R based on the image acquired by the cameras C, C. This image processor 10 includes a stereoscopic processor 11a, a mobile object extracting unit 11b, and a face recognition unit 11c.

The stereoscopic processor 11a performs a pattern matching between images obtained from each camera C on the basis of one of two images acquired by the cameras C, C. In this embodiment, since the robot R has two cameras (a left-side camera and a right-side camera), one of two images is the image obtained from left-side camera and the other of two images is the image obtained from right-side camera. Thus, the pattern patching is performed between the image obtained from left-side camera and the image obtained from right-side camera.

Then the stereoscopic processor 11a computes a parallax between two images to generate a parallax image, and outputs a parallax image to the mobile object extracting unit 11b together with the image entered from the cameras C and C. Here, the computing of the parallax is performed between corresponding pixels in two images. In the parallax image, the distance from the robot R (camera C) to the target object is indicated by the difference of the brightness.

The mobile object extracting unit 11b extracts a mobile (moving) object from the image obtained by the camera C, based on data entered from the stereoscopic processor 11a. The reason why the extraction of the mobile object is performed is to perform the recognition of a person on the assumption that it is more likely that the moving object is a person.

The mobile object extracting unit 11b performs the pattern matching in order to extract the mobile object, and computes a distance for corresponding pixels in two images to generate a distance image. Here, the pattern matching is performed by comparing the current frame (image), which was obtained currently by the camera C, with the last frame (image), which is generated from several frames obtained prior to the acquisition of the current frame.

Then, the mobile object extracting unit 11b, based on the distance image and the parallax image, searches the pixels whose shift amount is large, from among the pixels within a predetermined distance from the cameras C, C (robot R). If such pixel exists, the mobile object extracting unit 11b considers that a person is within the pixels (distance), and extracts a mobile object from the image entered from the camera based on the distance image and the parallax image.

The face recognition unit 11*c* extracts a human body color region from the extracted mobile object, and computes position of the face of a human in consideration of a size and shape of the extracted human body color region. The position of a hand is also computed by the same method.

The position of the recognized face is supplied to the controller 40 for communicating with a person and for actuating the robot R. Additionally, the position of the recognized face is supplied to the radio communication unit 60 in order to supply to the management computer 3 through the base station 1.

[Voice Processor 20]

The voice processor 20 includes a voice synthesizer 21*a* and a voice recognizer 21*b*.

The voice synthesizer 21*a* generates voice data from text information, based on a command, which commands the robot R to have a conversation with a human or to sound a voice message and which is entered from the controller 40. Then, the voice synthesizer 21*a* outputs voice data to the speaker S. Here, the generation of voice data is, for example, performed by utilizing the correspondence between voice data and text information stored beforehand in a recording unit (not shown) The voice recognizer 21*b* generates text information from voice (sound) data, based on the correspondence between voice data and text information stored beforehand in the recording unit (not shown). Then, the voice recognizer 21*b* outputs text data to the controller 40.

The image transmitter 30 outputs image data entered from the camera C, C to the management computer 3 through the radio communication unit 60.

[Autonomous Travel Controller 50]

The autonomous travel controller 50 includes a head controller 51*a*, an arm controller 51*b*, and a leg controller 51*c*.

The head controller 51*a* actuates the head part R1 based on a command entered from the controller 40. The arm controller 51*b* actuates the arm part R2 based on a command entered from the controller 40. The leg controller 51*c* actuates a leg part R3 based on a command entered from the controller 40.

Additionally, data obtained by the gyro sensor SR1 and the GPS receiver SR2 is supplied to the controller 40, and is used for deciding the motion of the robot R. Also, the same data is supplied to the management computer 3 through the radio communication unit 60.

[Radio Communication Unit 60]

The radio communication unit 60 exchanges data with the management computer 3. The radio communication unit 60 includes a public line communication unit 61*a* and a radio communication unit 61*b*.

The public line communication unit 61*a* performs a wireless communication by using a cellular phone line or a personal handyphone system. The radio communication unit 61*b* performs a wireless communication by using a short-range wireless communication technique, e.g. a wireless local area network complying with IEEE802.11b standard.

The radio communication unit 60 performs a data exchange with the management computer 3 using one of the public line communication unit 61*a* and the radio communication unit 61*b*, when a signal which commands the robot R to communicate with the management computer 3 is entered from the management computer 3.

[Target Detection Unit 70]

The target detection unit 70 detects a presence of the target object D with the tag T within a surrounding area of the robot R, and computes the position of the target object D when the target object D exists in the surrounding area.

Figure 3:
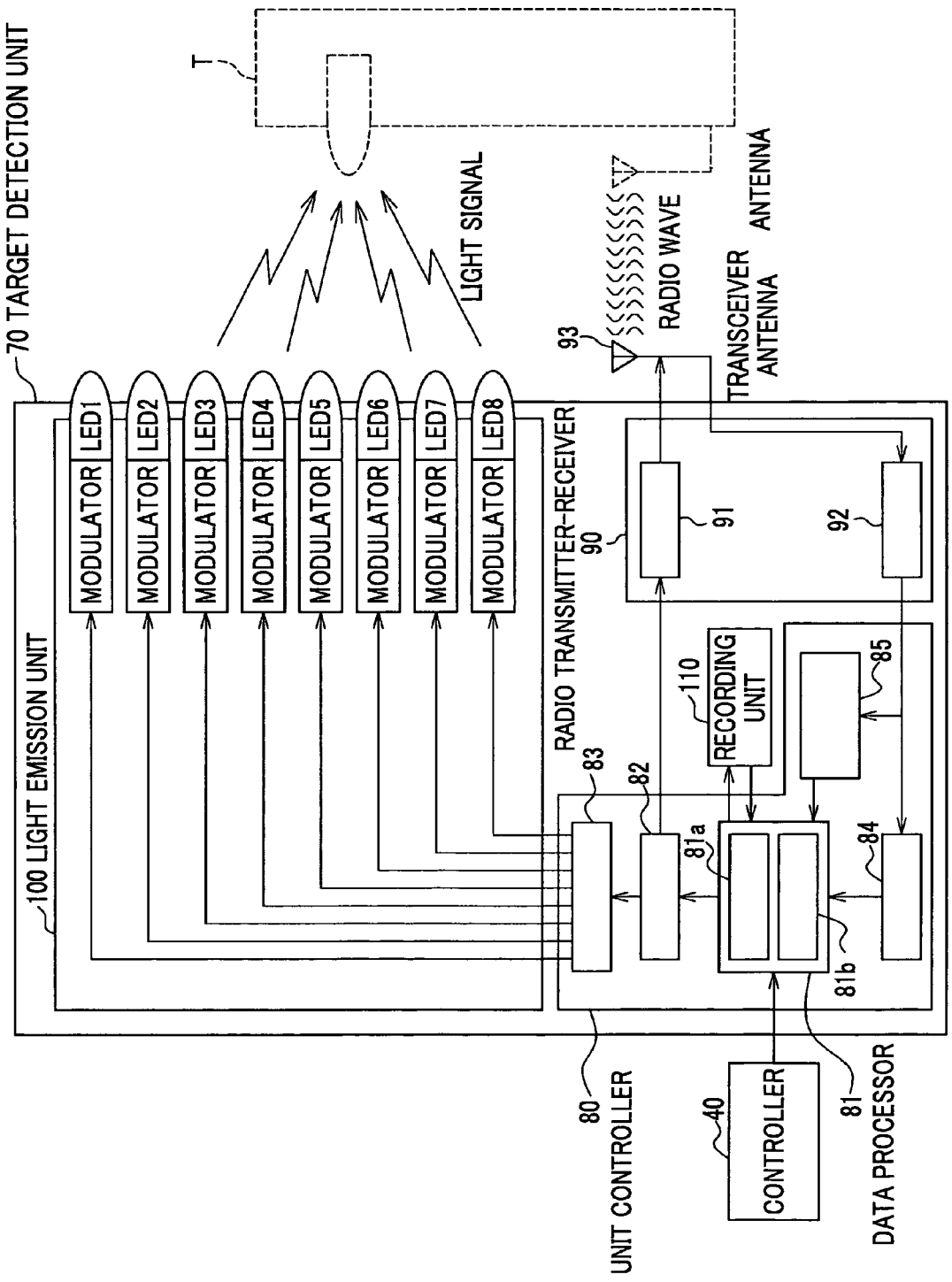
FIG. 3 is a block diagram of a target detection unit 70 of the robot R.

As shown in FIG. 3, the target detection unit 70 includes a unit controller 80, a radio transmitter-receiver 90, a light emission unit 100, and a recording unit 110.

(Unit Controller 80)

The unit controller 80 generates a search signal to be transmitted from the radio transmitter-receiver 90, and a direction check signal which is emitted as an infrared light from the light emission unit 100.

The unit controller 80, additionally, determines the position of the target object D based on a receipt signal, which is transferred from the tag T when the tag T has received the search signal.

Here, the search signal is a signal to be used for checking whether or not the target object D exists in the surrounding area of the robot R, and the direction check signal is a signal to be used for checking which direction with respect to the robot R the target object D exists in. The receipt signal is a signal which indicates that the tag T has received at least the search signal.

The unit controller 80 includes a data processor 81, an encryption unit 82, a time division unit 83, a decoder 84, and a field intensity measuring unit 85.

The data processor 81 generates the search signal and the direction check signal, and determines the position of the target object D. The data processor 81 includes a signal generator 81*a* and a position computing part 81*b*.

(Signal Generator 81*a*)

The signal generator 81*a* obtains a robot ID from the recording unit 110 at a predetermined cycle or when a signal (a transmission request signal), which requests the transmission of radio wave, is entered from the controller 40. Here, the robot ID is a unique identification number of the robot R, in which the target detection unit 70 is installed.

Then the signal generator 81*a* generates a search signal which includes the robot ID and receipt request signal. Here, the receipt request signal is a signal which commands the target object D (tag T) to generate the receipt signal when the target object D (tag T) receives the search signal.

The signal generator 81*a* generates the direction check signal, which is emitted as an infrared light signal from the light emission unit 100. The direction check signal is generated for each light emitter (LED 1 to LED 8) of the light emission unit 100, separately, and includes the robot ID and an emitter ID, which is a unique identification number for identifying the light emitter. In this embodiment, this direction check signal is also generated, when the receipt signal entered from the decoder 84 includes an emission request signal.

In the present embodiment, since a total of eight light emitters are provided on the robot R, the data processor 81 generates a total of eight direction check signal, which includes a robot ID and the emitter ID.

For example, if it is assumed that the robot ID is "02" (robot ID=02) and that the emitter ID of light emitters (from LED1 to LED8) is from "L1" to "L8", the direction check signal to be generated for the light emitter LED1 includes the robot ID whose ID is "02" and the emitter ID whose ID is "L1". Additionally, the direction check signal to be generated for the light emitter LED2 includes the robot ID whose ID is "02" and the emitter ID whose ID is "L2".

Then, the signal generator 81*a* outputs the direction check signal and the search signal to the encryption unit 82.

Here, the position computing part 81*b* of data processor 81 measures the position of the target object D based on the receipt signal transmitted from the tag T which has received the search signal. The detailed explanation of the signal processing in the position computing part 81*b* will be made later together with the signal processing in the field intensity measuring unit 85 and the decoder 84.

(Encryption Unit 82)

The encryption unit 82 encrypts the signal entered to the encryption unit 82, and outputs the encrypted signal.

To be more precise, the encryption unit 82 outputs the encrypted search signal, which is obtained by the encryption of the search signal, to the radio transmitter-receiver 90. Thereby, the encrypted search signal is modulated and is transmitted from the radio transmitter-receiver 90.

The encryption unit 82 encrypts the direction check signal entered from the data processor 81 to obtain the encrypted direction check signal, and outputs the encrypted direction check signal to the time division unit 83.

In this embodiment, the direction check signal is generated to each light emitter of the light emission unit 100.

As shown in FIG. 3, since the light emission unit 100 has a total of eight light emitters, a total of eight direction check signals are generated in the encryption unit 82 and are entered to the time division unit 83.

(Time Division Unit 83)

The time division unit 83 determines the order of the emission of light emitters (LED1-LED8) of the light emission unit 100, and the timing of the emission of each light emitter (LED 1-LED 8).

To be more specific, the time division unit 83 determines the order and timing of the emission of each light emitter (LED 1-LED 8) when the encrypted direction check signal is entered from the encryption unit 82. Then, the time division unit 83 outputs the encrypted direction check signal to the light emission unit 100 based on the order and timing which were determined.

For example, if it is determined that each light emitter is emitted at 0.5 sec interval in order of the light emitter LED1, the light emitter LED4, the light emitter LED7, the light emitter LED2, the light emitter LED5, the light emitter LED8, the light emitter LED3, and the light emitter LED6, the time division unit 83 outputs the encrypted direction check signal, at 0.5 sec interval, to the modulator of each light emitter (LED1-LED 8). That is, the time division unit 83 outputs the encrypted direction check signal, at 0.5 sec interval, in order of: the modulator of the light emitter LED 1; the modulator of the light emitter LED 4; the modulator of the light emitter LED 7; the modulator of the light emitter LED 2; the modulator of the light emitter LED 5; the modulator of the light emitter LED 8; the modulator of the light emitter LED 3; the modulator of the light emitter LED 6.

In this embodiment, a total of eight encrypted direction check signals are entered to the time division unit 83, and the light emitter to which each encrypted direction check signal is supplied is determined beforehand in the data processor 81.

The time division unit 83, therefore, checks the emitter ID included in the encrypted direction check signal when the encrypted direction check signal is entered, and outputs the encrypted direction check signal to the modulator of the light emitter, which is specified by the emitter ID, at the determined order and timing.

For example, if the emitter ID of light emitter (LED1-LED8) is from L1 to L8, the time division unit 83 supplies the encrypted direction check signal, which includes emitter ID="L1", to the modulator of the light emitter whose emitter ID is "L1". Additionally, the time division unit 83 supplies the encrypted direction check signal, which includes emitter ID="L2", to the modulator of the light emitter whose emitter ID is "L2".

(Light Emission Unit 100)

The light emission unit 100 emits a light to search regions, which are established around the robot R based on the position of the robot R.

Figure 4:
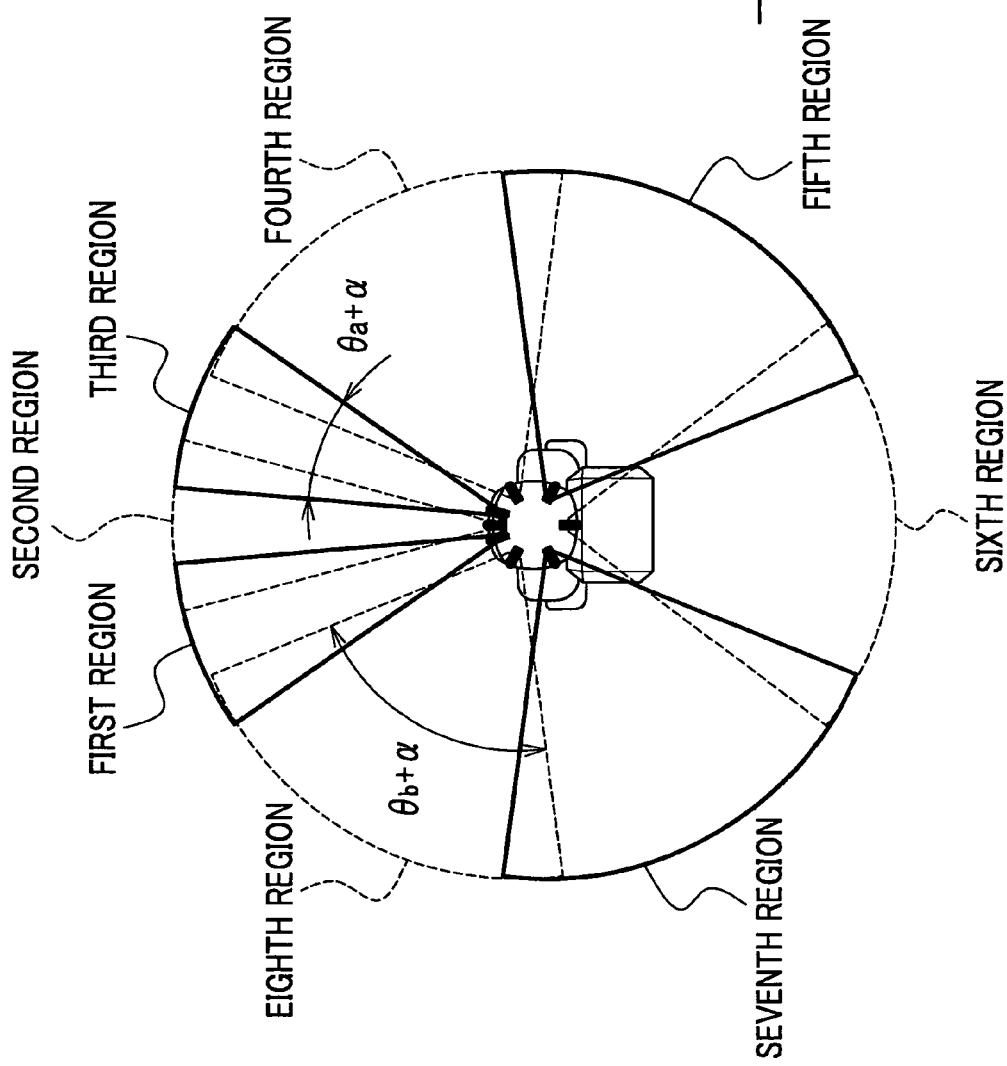
FIG. 4A is an explanatory view of a search region established around the robot R.
FIG. 4B is an explanatory view of an irradiation range in a height direction of an infrared light irradiated from the light emitter of the light emission unit 100.

Referring to FIGS. 3 and 4A, the light emission unit 100 includes a plurality of light emitters (LED1-LED8) and modulators provided to each light emitter.

The modulator modulates the encrypted direction check signal entered from the time division unit 83 to obtain a modulated signal.

The light emitter emits the modulated signal as an infrared light signal (infrared light) to the predetermined search region.

In this embodiment, the surrounding area of the robot R is divided into a plurality of search regions in order to determine the position (direction) of the target object D (see FIG. 4A). The robot R is provided with light emitting diodes, each is served as the light emitter for emitting infrared light to the search region and each is directed to the specific search region. Here, one light emitting diode is directed to one search region.

To be more precise, in the case of FIG. 4A, a total of eight search regions (from first region to eighth region) are established around the robot R. That is, the robot R is provided with a total of eight search regions in 360-degree directions of the robot R.

In other words, the fan-shaped search regions (from first region to eighth region) are established around the robot R so that the robot R is surrounded by fan-shaped search regions. The robot R is positioned at the center of the region formed by these fan-shaped search regions (from first region to eighth region).

Therefore, in the case of FIG. 4A, a total of eight light emitters are provided around the head part R1 of the robot R so that the infrared light is surely emitted toward each search region.

As can be seen from FIG. 4A, the search regions (from first region to third region) which are provided in front of the robot R are narrower than the remainders of search regions (from fourth region to eighth region). To be more precise, the angular range ($_{,,}a+\alpha$) of the search regions (from first region to third region) and the angular range ($_{,,}b+\alpha$) of the search regions (from fourth region to eighth region) satisfy the following relation. That is, $_{,,}b+\alpha>_{,,}a+\alpha$.

This is because of the following reason. That is, when the robot R detects the presence of the target object D and directs the face of the robot R to the detected target object D, if the direction of the face of the robot R does not agree with the direction of the target object, the target object D (person) may feel that the robot R is not directing his face toward the target object D.

For preventing the occurrence of such situation, it is preferable to increase the number of search regions, but is not necessarily to increase the number of the search regions along 360-degree direction. The occurrence of such situation can be prevented by only increasing the numbers of the search regions which are positioning in front of the robot R. By adopting this manner, the position detection in the front-side of the robot R can be achieved with accuracy and the numbers of the light emitter can be curbed.

Therefore, in this embodiment, the position detection with sufficient accuracy of the target object D within each search region (from first region to the third region) is enabled, by narrowing the irradiation range of an infrared light with respect to respective search regions which are located in front of the robot R.

Thus, the position detection of the person can be achieved with accuracy, if the target object D is a person and an image pickup of a face image of the person is performed by cameras C, C of the robot R. In this case, the cameras C, C of the robot R can be directed to the face of the person as the target object D. Since the result of the position detection can reflect on the motion control of the robot R and the adjustment of an angle of cameras C, C, the cameras C, C of the robot R can be directed to the face of the person as the target object D In this embodiment, additionally, in order to minimize the region excluded from the search region, i.e. to minimize a dead space in the surrounding area, the range of the search region is determined so that adjoining search regions overlap each other at edge.

In this embodiment, the output order and timing of the encrypted direction check signal from the time division unit 83 of the unit controller 80 is adjusted. This is because it is required to prevent the occurrence of an interference of an infrared light that is caused when an infrared light is irradiated to the adjoining search regions consecutively.

Figure 5:
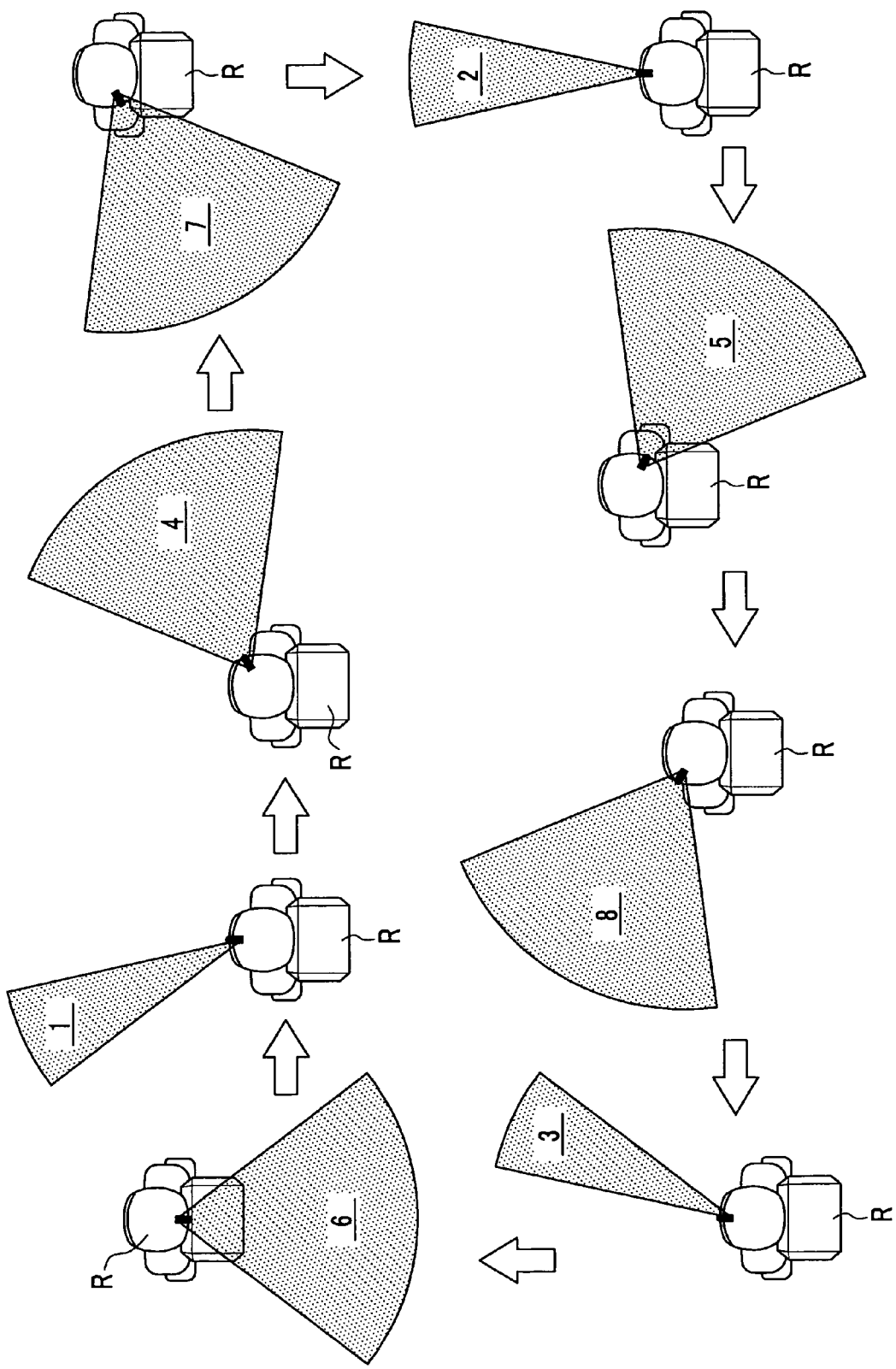
FIG. 5 is an explanatory view for explaining the order of the emission of each light emitter provided on the robot R.

Referring to FIG. 5, in this embodiment, the time division unit 83 adjusts the output order and timing of the encrypted direction check signal so that the irradiation of the infrared light is performed in order of: the first region (symbol 1 in figure); the fourth region (symbol 4 in figure); the seventh region (symbol 7 in figure); the second region (symbol 2 in figure); the fifth region (symbol 5 in figure); the eighth region (symbol 8 in figure); the third region (symbol 3 in figure); and the sixth region (symbol 6 in figure).

In this embodiment, as shown in FIG. 4B, an irradiation range in a height direction of an infrared light is determined so that the presence of a person, e.g. a person from a child to an adult, can be detected at a distance X. Here, distance X is determined based on an average distance wherein interpersonal communication is available. Thus, distance X is a distance from a robot R wherein an inter-communication between the robot R and a person can be achieved.

To be more precise, an irradiation range in a height direction of an infrared light is determined so that a height Y which corresponds to an average height of a breast of the adult person, and a height Z which corresponds to an average height of a breast of a child are surely irradiated by an infrared light. In this case, an irradiation angle in a height direction of the infrared light is denoted by $\phi$.

(Radio Transmitter-Receiver 90)

The radio transmitter-receiver 90 transmits radio wave toward a surrounding area of the robot R, and receives a receipt signal transmitted from the target object D which has received the radio wave.

The radio transmitter-receiver 90 includes a modulator 91, a demodulator 92, and a transceiver antenna 93.

The modulator 91 modulates the encrypted search signal, which is entered from the data processor 81 through the encryption unit 82, to generate a modulated signal, and transmits the modulated signal through the transceiver antenna 93.

The modulator 92 receives the modulated signal transmitted by wireless from the tag T of the target object D, and obtains the encrypted receipt signal by demodulating the modulated signal. Then, the modulator 92 outputs the encrypted receipt signal to the decoder 81 and the field intensity measuring unit 85 of the unit controller 80.

(Decoder 84)

The decoder 84 obtains the receipt signal by decoding the encrypted receipt signal, which was generated by coding the receipt signal.

In this embodiment, since the receipt signal includes at least the emitter ID, the robot ID, and a tag ID, the decoder 84 outputs these IDs to the data processor 81. Here, the tag ID is a unique identification number for identifying the tag which has transmitted the receipt signal. Additionally, if the receipt signal includes the emission request signal, the decoder 84 also outputs the emission request signal to the data processor 81.

(Field Intensity Measuring Unit 85)

The field intensity measuring unit 85 measures an intensity of the modulated signal, when the modulated signal transmitted from the tag T of the target object D is received by the radio transmitter-receiver 90.

To be more precise, the field intensity measuring unit 85 detects a power of the encrypted receipt signal, which is entered from the demodulator 92 of the radio transmitter-receiver 90, and computes an average of the detected power. Then, the field intensity measuring unit 85 outputs the computed average value as the data of the field intensity to the data processor 81.

The position computing part 81b of the data processor 81b determines the position of the target object D.

To be more specific, the position computing part 81b computes the distance to the target object D from the robot R based on the field intensity of the modulated signal, which is received in the radio transmitter-receiver 90 and is transmitted from the tag T of the target object D.

The position computing part 81b, additionally, refers to the emitter ID included in the receipt signal, and identifies the light emitter which has emitted an infrared light received by the target object D based on the emitter ID. Then, the position computing part 81b regards the direction of the search region to which the light emitter identified by the emitter ID has irradiated an infrared light, as the direction of the target object. Thereby, the position (direction) of the target object can be identified.

Here, if the light condition data is included in the receipt signal, the identification of the position of the target object is performed in consideration of the light condition data.

In this embodiment, the position computing part 81b firstly obtains the robot ID from the receipt signal entered from the decoder 84. Then, the position computing part 81b compares the obtained robot ID with the robot ID stored in the recording unit 110. If both robot IDs are the same, the position computing part 81b starts the position detection.

Figure 6:
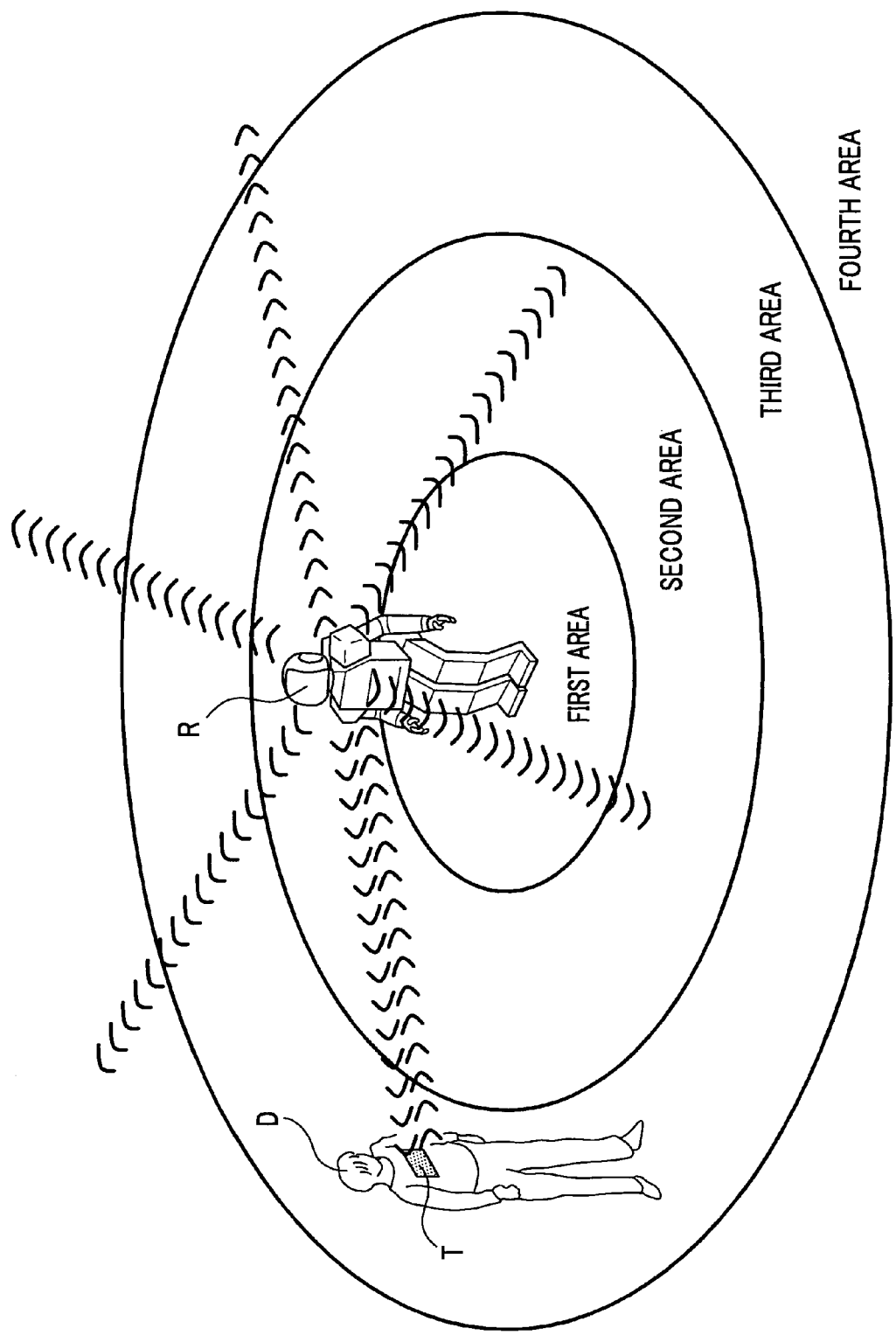

In this embodiment, as shown in FIG. 6, the surrounding area of the robot R is divided into four areas depending on the distance from the robot R. That is, a first area, a second area, a third area, and a fourth area are established around the robot R.

In this embodiment, each area is beforehand correlated with the field intensity on the basis of a value of field intensity, and a table (a distance table) which indicates the correlation between the area and the field intensity is stored in the recording unit 110.

Therefore, the position computing part 81b refers to the distance table based on the field intensity entered from the field intensity measuring unit 85, and obtains information (area information) which indicates which area among areas (from first area to fourth area) the target object D, which has the tag T that has transmitted the receipt signal exists in.

Here, for example, if the field intensity α entered from the field intensity measuring unit 85 is between threshold values γ and β (here, γ is a lower limit of the third area and β is an upper limit of the third area), the position computing part 81*b* obtains the area information which indicates the third area.

In this embodiment, the range of the transmission of the modulated signal to be transferred from the tag T is established almost within the range of the third area. Thus, if the target object D with the tag T is not within the third area, the robot R cannot detect the presence of the target object.

The position computing part 81*b* refers to the emitter ID included in the receipt signal entered from the decoder 84, and identifies the light emitter which has emitted an infrared light received by the target object D based on the emitter ID. Then, the position computing part 81*b* obtains information (direction information) which indicates the irradiation direction of the infrared light from the identified light emitter.

Figure 7:
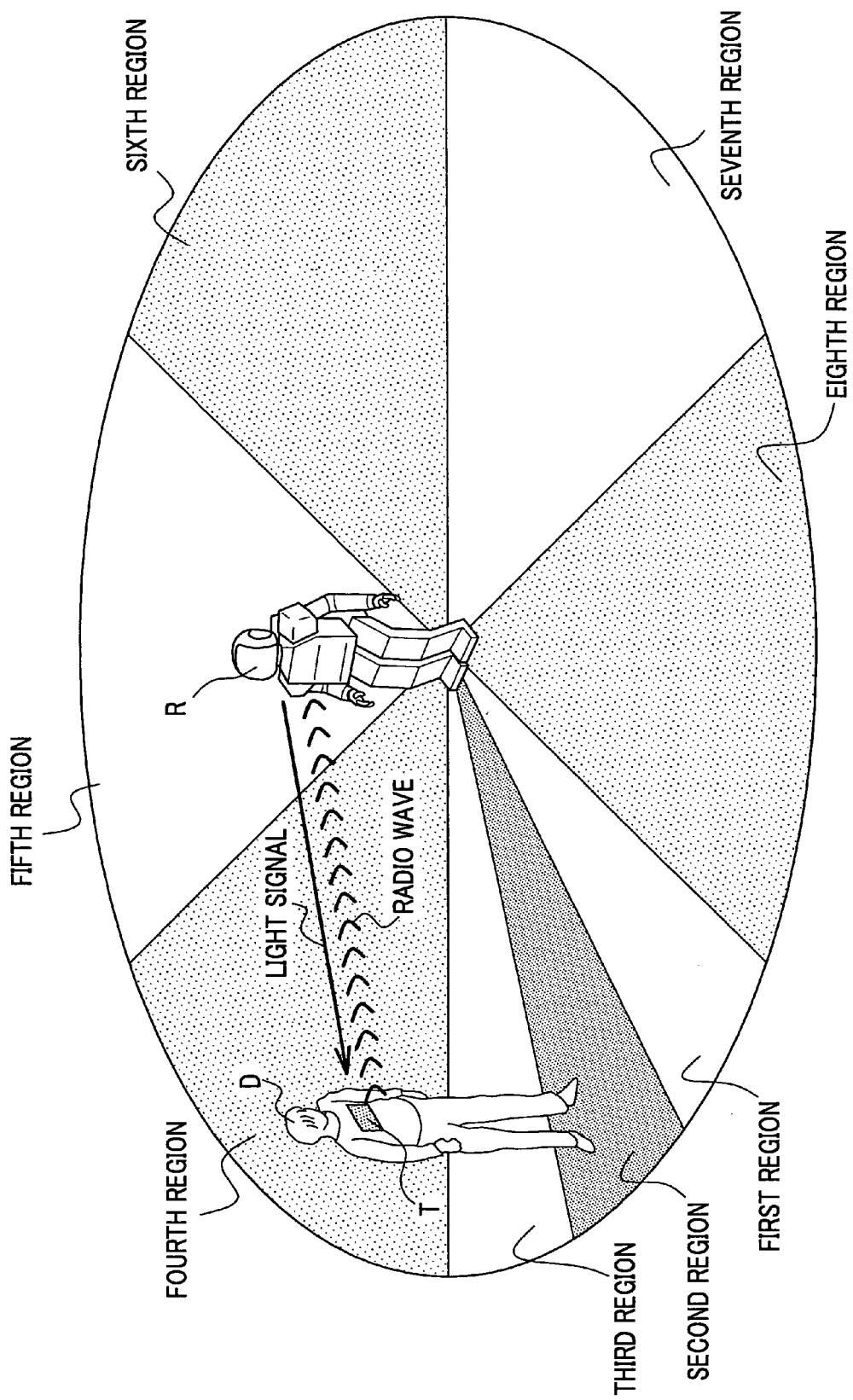
FIG. 7 is an explanatory view for explaining the generation of information (direction information) which indicates the direction of the target object.

In this embodiment, as shown in FIG. 7, a total of eight search regions (from first region to eighth region) are established in the surrounding area of the robot R, and the recording unit 110 stores a table (a direction table) which indicates the search region to which each light emitter is being directed.

Therefore, the data processor 81 refers to the direction table stored in the recording unit 110 based on the emitter ID, and recognizes the search region to which the light emitter identified by the emitter ID has irradiated an infrared light. That is, the search region to which infrared light has been irradiated is determined from among predetermined search regions (from first region to eighth region).

Then, the data processor 81 obtains information indicating the identified search region as the information (direction information) which indicates the direction of the target object D.

In this embodiment, adjoining search regions overlap each other at edge, but the overlapping edge of each search region is omitted from this FIG. 7. This omission of the overlapping edge is the same as FIG. 8.

The position computing part 81*b* basically generates information (position information) which indicates the position of the target object D from area information and direction information. Here, if the light condition data is included in the receipt signal, the position computing part 81*b* generates position information in consideration of the light condition data in addition to area information and direction information.

Figure 8:
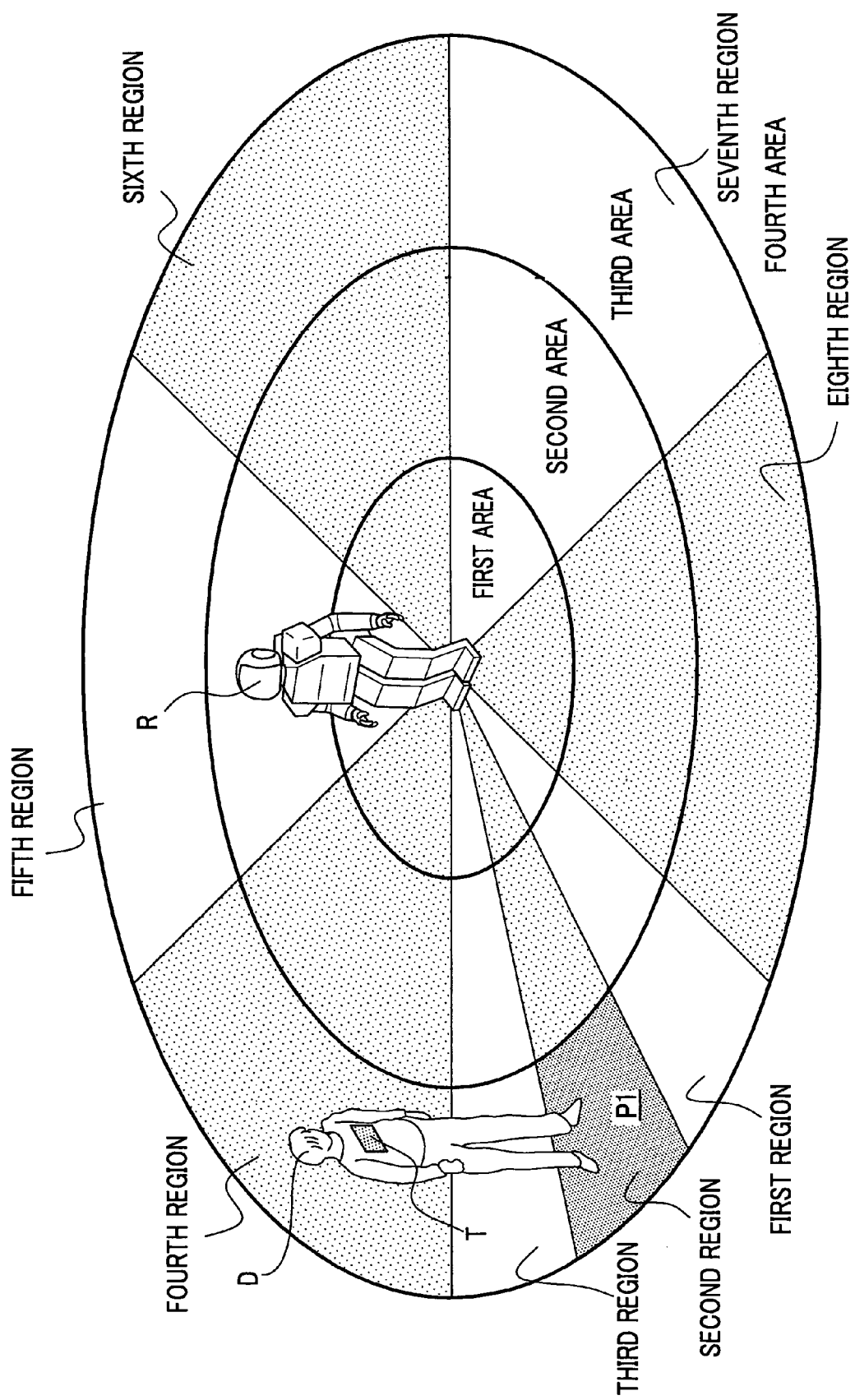
FIG. 8 is an explanatory view for determining the position of the target object D based on direction information and area information.

Here, the explanation of position information which has generated without considering the light condition data will be made, with reference to FIG. 8. FIG. 8 corresponds to a figure which is formed by the overlay of FIGS. 6 and FIG. 7.

If the content of area information is "THIRD AREA" and the content of direction information is "SECOND REGION", the data processor 81 regards the overlapping area between "THIRD AREA" and "SECOND REGION" as the position of the target object D, and generates information (position information) which indicates this overlapping area. Here, in FIG. 8 this overlapping area is denoted by a symbol P1.

As described above, the positional relation between the robot R and the target object D is determined based on the intensity of the receipt signal which has received by the robot R and the emitter ID included in the receipt signal. In other words, the direction and distance of the target object D is computed on the basis of the position of the robot R, and the position of the target object D can be determined.

Then, the position computing part 81*b* outputs the position information to the controller 40 of the robot R together with the tag ID included in the receipt signal entered from the decoder 84.

Thereby, the controller 40 of the robot R determines the motion of the robot R in consideration of the position information, and controls the motion of the autonomous travel controller 50 to actuate the robot R based on the determined motion.

In this embodiment, an autonomous travel of the robot to the front of the target object D or an image pickup of the face image of the target object D by adjusting an angle and direction of the camera C can be example as the motion of the robot R.

When the emission request signal is included in the receipt signal, the signal generator 81*a* generates the direction check signal and outputs the direction check signal to the encryption unit 82. Thereby, an infrared light is emitted from each light emitter of the light emission unit 100.

The controller 40 of the robot R transmits the tag ID to the management computer 3. Thereby, the management computer 3 refers to the recording unit (not shown) based on the tag ID when the tag ID is transferred from the robot R, and obtains information being correlated with the tag ID to perform the identification of the target object D with tag T. Then, the management computer 3 outputs the obtained information to the robot R together with a command signal which commands the robot R to make a predetermined motion. Thus, the controller 40 of the robot R controls each section, e.g. the autonomous controller 50, of the robot R based on the command signal.

[Tag T]

The tag T receives radio wave and a light signal which are transferred from the robot R, and returns the receipt signal, which indicates the receipt of the radio wave or a light signal, to the robot R.

In this embodiment, because a person who has a tag T corresponds to the target object D, radio wave and a light signal from the robot R is received by the tag T. Therefore, the explanation of the tag T will be made as follows.

Figure 9:
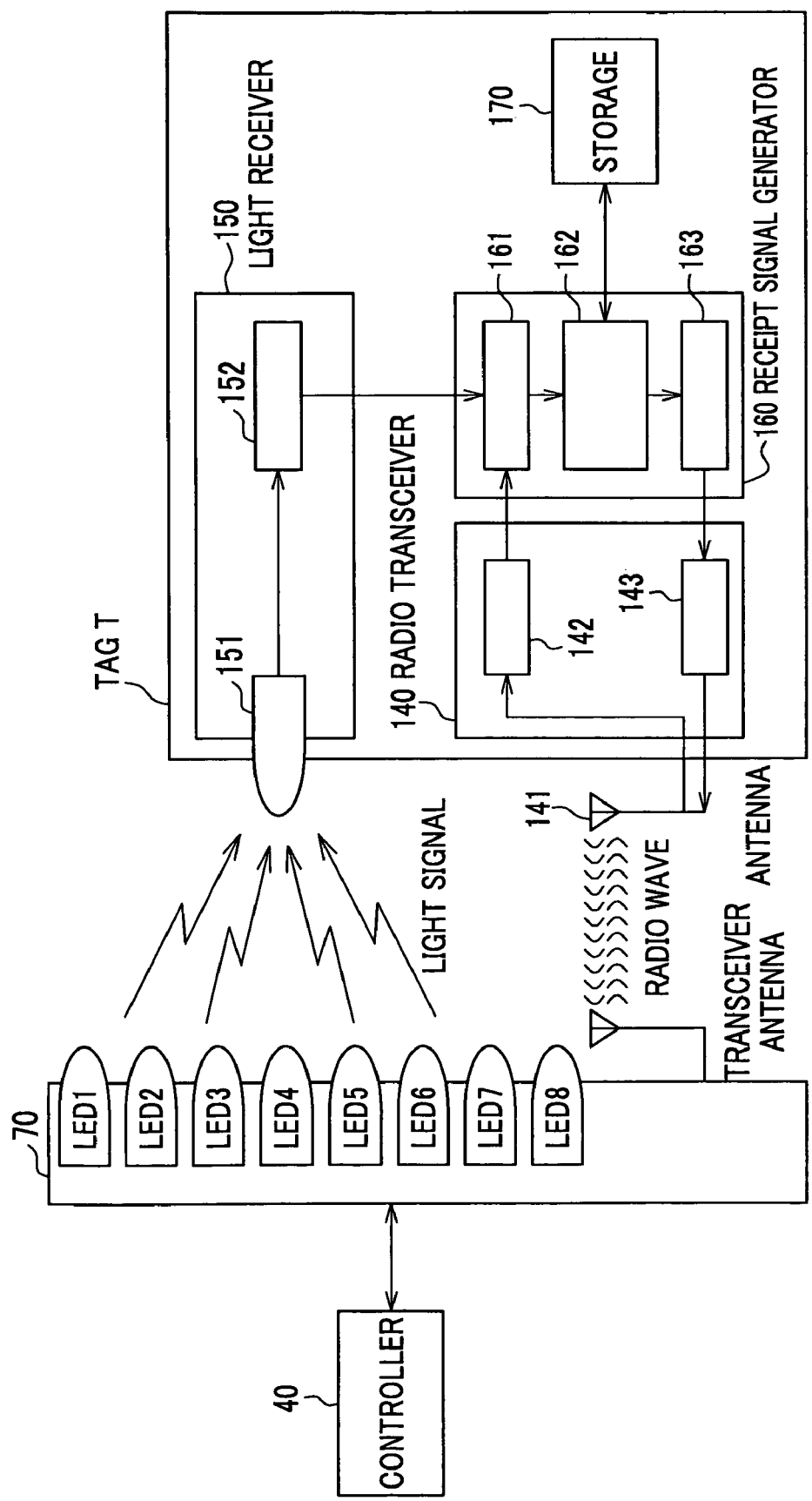
FIG. 9 is a block diagram of the tag T1 which serves as the target object D.

As shown in FIG. 9, the tag T includes a radio transceiver 140, a light receiver 150, a receipt signal generator 160, a storage 170.

(Radio Transceiver 140)

The radio transceiver 140 receives the modulated signal transferred by wireless from the robot R, and transmits by wireless the modulated signal, which is obtained by modulating the receipt signal entered from the receipt signal generator 160, to the robot R. The radio transceiver 140 includes an antenna 141, a demodulator 142, and a modulator 143.

The demodulator 142 demodulates the modulated signal, which is transferred from the robot R and is received through the antenna 141, to obtain the encrypted search signal. Then, the demodulator 142 outputs the encrypted search signal to the receipt signal generator 160.

The modulator 143 modulates the encrypted receipt signal, which is entered from an encryption unit 163 of the receipt signal generator 160, to obtain a modulated signal. Then, the modulator 143 transmits the modulated signal to the robot R by wireless through the antenna 141.

(Light Receiver 150)

The light receiver 150 receives the infrared light irradiated from the robot R.

The light receiver 150 includes an optical receiver 151 and a light demodulator 152.

The optical receiver 151 receives directly the infrared light (a infrared light signal) irradiated from the robot R. The light demodulator 152 demodulates the infrared light signal received by the optical receiver 151 to obtain the encrypted direction check signal.

To be more specific, when infrared light signal is received by the optical receiver 151, the light receiver 150 demodulates the infrared light signal to obtain the encrypted direction check signal. Then, the light receiver 150 outputs the encrypted direction check signal to the receipt signal generator 160.

(Receipt Signal Generator 160)

The receipt signal generator 160 generates a signal (receipt signal), which indicates the receipt of the search signal from the robot R.

In this embodiment, this receipt signal is generated in response to the receipt request signal included in the search signal, when the search signal (modulated signal) transferred from the robot R is received by the radio transceiver 140.

As shown in FIG. 9, the receipt signal generator 160 includes a decoder unit 161, a processor unit 162, and the encryption unit 163.

The decoder unit 161 decodes the encrypted signal to obtain the signal. That is, the decoder unit 161 decodes the encrypted search signal, which is entered from the radio transceiver 140, and the encrypted direction check signal, which is entered from the light receiver 150, to obtain the search signal and the direction check signal, respectively. Then, the decoder unit 161 outputs the search signal and the direction check signal to the processor unit 162.

The processor unit 162 generates the receipt signal. In this embodiment, the search signal includes the robot ID and the receipt request signal. Here, the robot ID is a unique identification number to specify the robot R which has transmitted the search signal. The receipt request signal is a signal which commands the target object D to perform the predetermined processing when the target object has received the search signal.

The direction check signal includes the robot ID for identifying the robot R which has emitted the direction check signal, and the emitter ID for identifying the light emitter which has emitted the direction check signal.

Thus, the processor unit 162 changes the condition of the light receiver 150 from a standby condition to an activated condition in response to the receipt request signal included in the search signal, when the search signal is entered to the processor unit 162.

When the processor unit 162 receives the direction check signal within a predetermined time after activating the light receiver 150, the processor unit 162 compares the robot ID included in the direction check signal with the robot ID included in the search signal.

The processor unit 162 obtains a unique identification number (tag ID) being assigned to the tag T from the storage 170, when the robot ID, which is included in the direction check signal, agrees with the robot ID, which is included in the search signal.

Then, the processor unit 162 generates the receipt signal in which the tag ID, the robot ID included in the search signal, and the emitter ID included in the direction check signal are included, and outputs the generated receipt signal to the encryption unit 163.

On the contrary, the processor unit 162 generates the receipt signal which further includes the emission request signal therein, if the direction check signal is not entered within a predetermined time after activating the light receiver 150 or if the robot ID of the direction check signal disagrees with the robot ID of the search signal. Then, the processor unit 162 outputs the generated receipt signal to the encryption unit 163. Here, the emission request signal is a signal which commands the robot R (detection unit) to emit an infrared light.

The encryption unit 163 encrypts the receipt signal to generate the encrypted receipt signal, and outputs the encrypted receipt signal to the radio transceiver 140.

Thereby, the encrypted receipt signal is modulated in the modulator 143 of the radio transceiver 140 and then transferred by wireless through the antenna 141.

Figure 10:
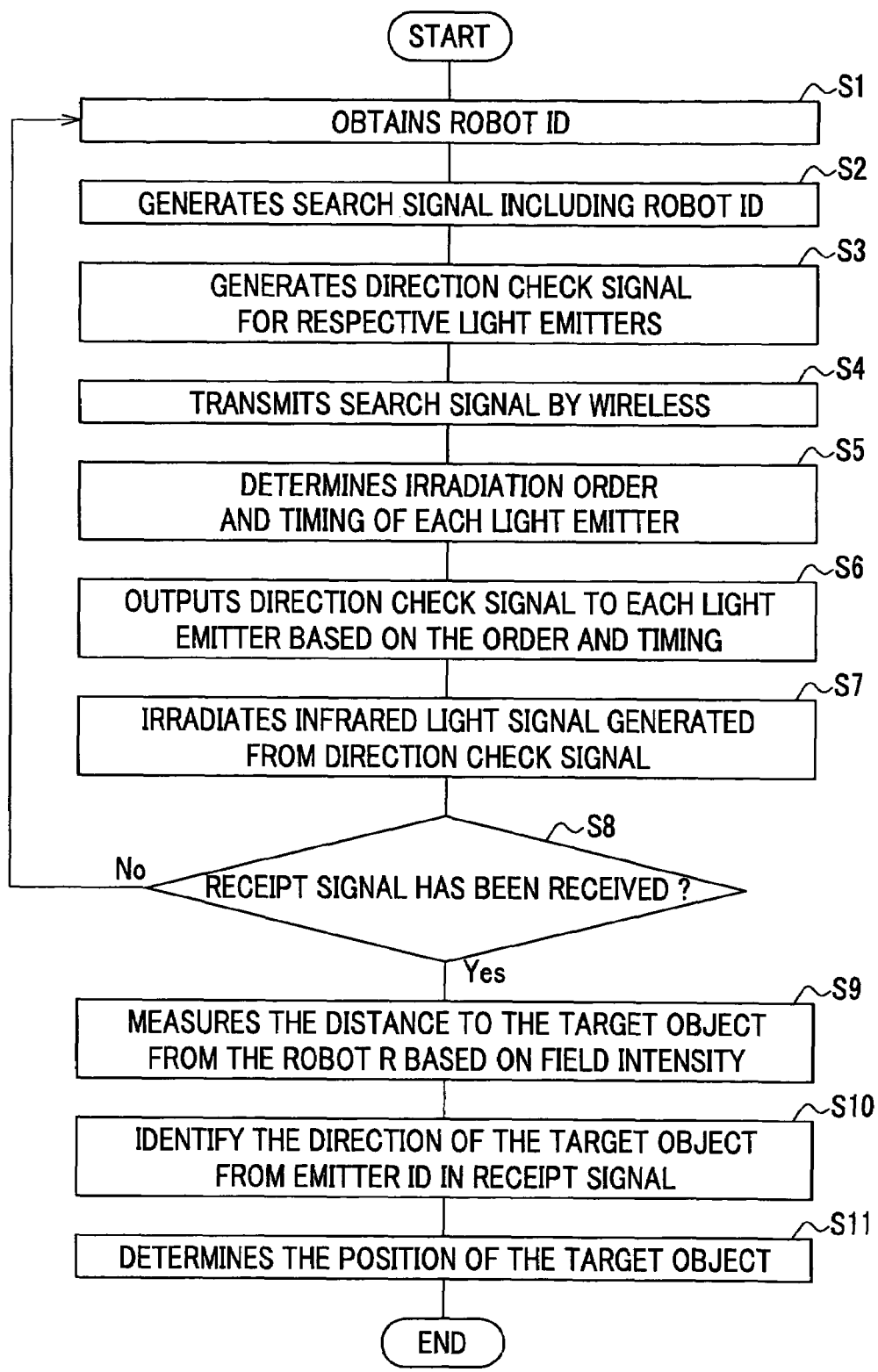
FIG. 10 is a flow chart for explaining the signal processing of the target detection unit 70 of the robot R.
Figure 11:
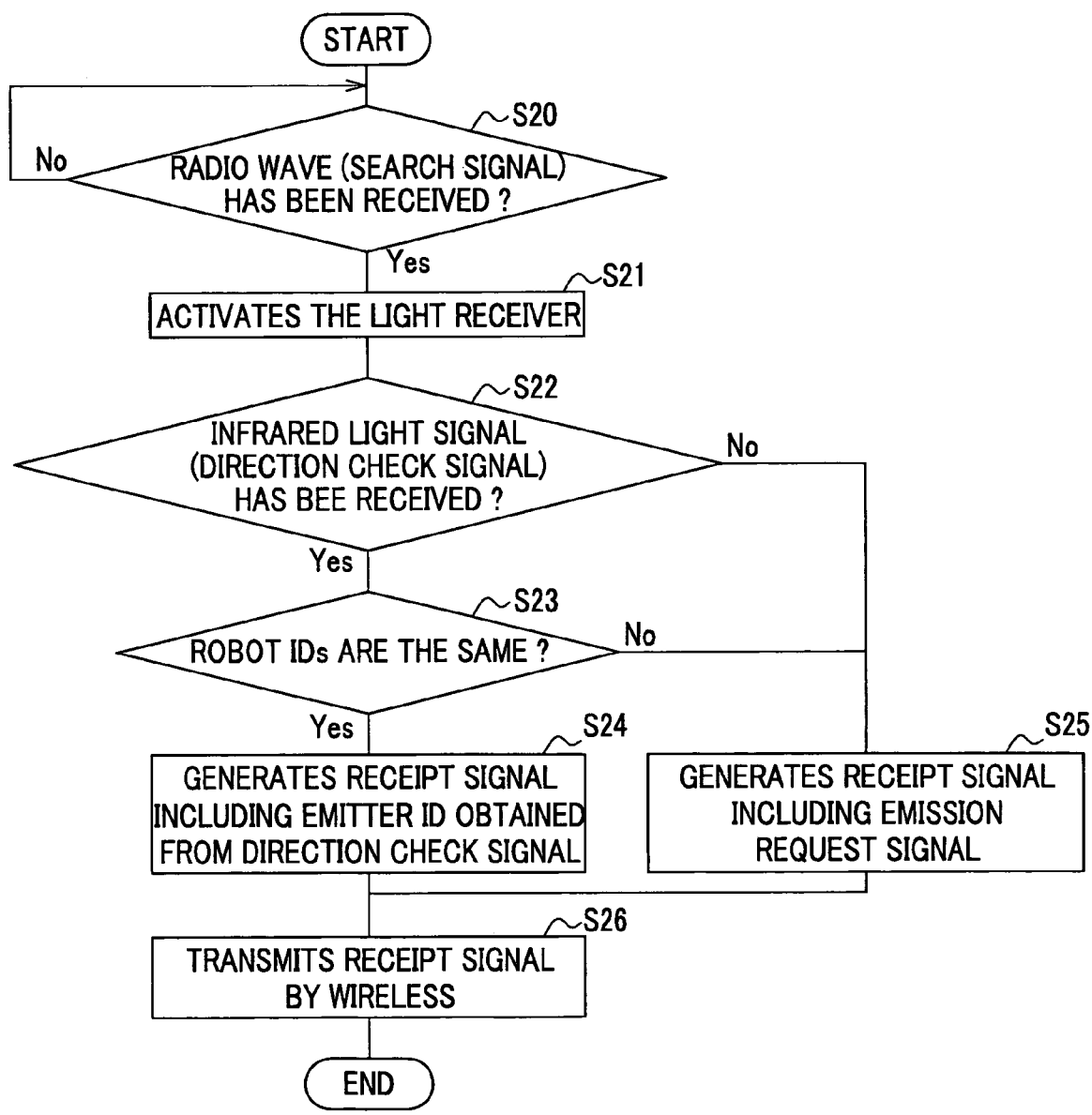
FIG. 11 is a flow chart for explaining the signal processing of the tag T1.
Figure 12:
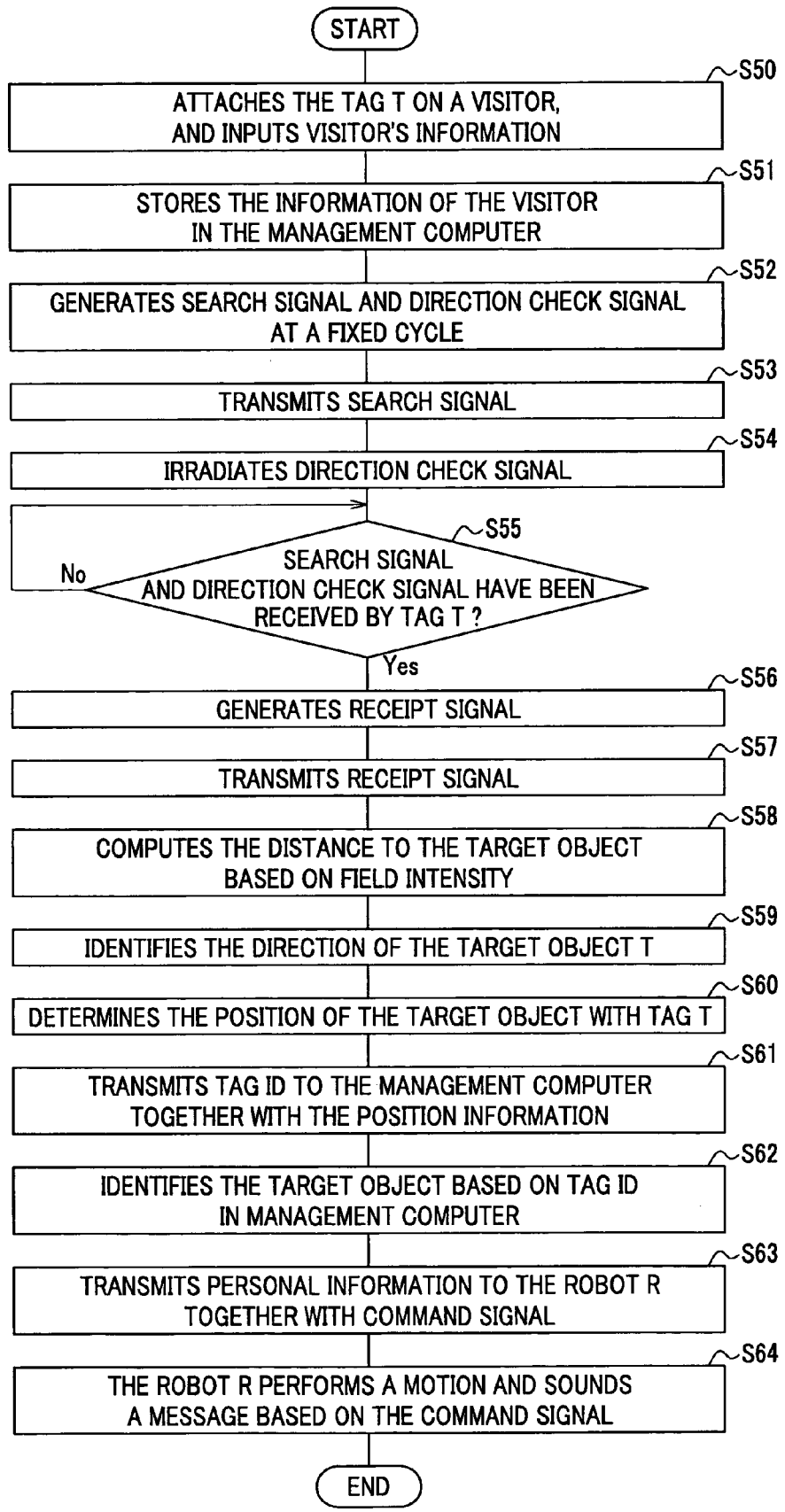
FIG. 12 is a flow chart for explaining the signal processing of the target object detection system, which is adapted to the detection of the visitor of the office.

Next, the data processing performed in the target object detection system A will be explained with reference to the block diagram of FIG. 3 and FIG. 9, and flow-charts of FIGS. 10-12.

(Signal Processing in the Target Detection Unit 70)

The signal processing of target detection unit 70 of the robot R will be explained with reference to FIG. 10.

The signal generator 81a of the unit controller 80 refers, at a predetermined cycle, to the recording unit 110, and obtains the unique identification number of the robot R, to which the unit controller 80 is being provided (Step S1). That is, the signal generator 81a obtains the robot ID from the recording unit 110.

Then, the signal generator 81a generates the search signal which includes the robot ID and receipt request signal (Step S2). Additionally, the signal generator 81a generates the direction check signal, which is irradiated as an infrared light signal from each light emitter of the light emission unit 100, for respective light emitters (Step S3). Here, the direction check signal includes the robot ID obtained in step S1 and the emitter ID to be used for identifying the light emitter which emits the direction check signal.

The encryption unit 82 of the unit controller 80 encrypts the search signal to generate the encrypted search signal, and outputs the encrypted search signal to the radio transmitter-receiver 90. Thus, the encrypted search signal is modulated by a predetermined modulation scheme to generate the modulated signal. Then, the modulated signal is transferred through the transceiver antenna 93 (Step S4). That is, the search signal is transferred by wireless.

The encryption unit 82 of the unit controller 80 encrypts the direction check signal generated in the signal generator 81a to generate the encrypted direction check signal, and then outputs the encrypted direction check signal to the time division unit 83.

The time division unit 83 determines the irradiation order and timing of each light emitter (LED 1-LED 8) of the light emission unit 100 (Step S5), when the encrypted direction check signal is entered from the encryption unit 82. Then, the time division unit 83 outputs the encrypted direction check signal to the modulator of corresponding light emitter (LED 1-LED 8) based on the determined timing (Step S6).

The modulator of each light emitter of the light emission unit 100 modulates the encrypted direction check signal by a predetermined modulation manner to obtain the infrared light signal of a predetermined wave length. Then, the infrared light signal is irradiated to the search region from the light emitter adjoining to the modulator (Step S7). Thereby, an infrared light is irradiated toward each search region established around the robot R by the determined order and timing.

The tag T generates the receipt signal (modulated signal) and transmits it by wireless, when the tag T receives the search signal (modulated signal) transmitted from the transceiver antenna 93 of the radio transmitter-receiver 90.

The demodulator 92 obtains the encrypted receipt signal by demodulating the modulated signal, when the demodulator 92 receives the modulated signal (receipt signal) transferred from the tag T. The demodulator 92 outputs the encrypted receipt signal to the decoder 84 and field intensity measuring unit 85 of the unit controller 80.

The decoder 84 of the unit controller 80 decodes the encrypted receipt signal to obtain the receipt signal, and outputs the receipt signal to the data processor 81.

The field intensity measuring unit 85 of the unit controller 80 detects a power of the encrypted receipt signal, which is entered from the demodulator 92 of the radio transmitter-receiver 90, and computes an average of the detected power. Then, the field intensity measuring unit 85 outputs the computed average value as the data of the field intensity to the data processor 81.

The position computing part 81b refers to the distance table based on the field intensity entered from the field intensity measuring unit 85, and obtains information (area information) which indicates which area among areas (from first area to fourth area) the tag T that has transmitted the receipt signal exists in (Step S9). That is, the position computing part 81b measures the distance from the robot R to the tag T based on the intensity of the field intensity.

The position computing part 81b refers to the direction table stored in the recording unit 110 based on the emitter ID, which is included in the receipt signal entered from the decoder 84. Then, the position computing part 81b obtains the information (direction information) which identifies the light emitter which has irradiated an infrared light received by the tag T.

Then, the position computing part 81b generates the position information which indicates the position of the target object D from area information and direction information (Step S11). Thus, the position of the target object D is determined.

If the receipt signal (modulated signal) transferred from the tag T has not been received by the demodulator 92 of the radio transmitter-receiver 90 (Step S8, No), the demodulator 92 keeps the standby condition till the receipt signal (modulated signal) is received.

(Signal Processing in Tag T)

Next, the signal processing to be performed in tag T which serves as the target object D will be made with reference to the block diagram of FIG. 9 and the flow chart of FIG. 11.

When radio wave (modulated signal) transferred from the robot R has been received through the antenna 141 (Step S20, Yes), the demodulator 142 of the radio transceiver 140 demodulates the modulated signal to obtain the encrypted search signal. Then, the demodulator 142 outputs the encrypted search signal to the receipt signal generator 160.

The decoder unit 161 of the receipt signal generator 160 decodes the encrypted search signal entered from the radio transceiver 140 to obtain the search signal. Then, the decoder unit 161 outputs the search signal to the processor unit 162.

The processor unit 162 of the receipt signal generator 160 changes the condition of the light receiver 150 from a standby condition to an activated condition in response to the receipt request signal included in the search signal (Step S21).

When the optical receiver 151 of the light receiver 150 receives the infrared light signal irradiated from the robot R within a predetermined time after activating the light receiver 150 (Step S22, Yes), the light demodulator 152 of the light receiver 150 demodulates the infrared light signal to obtain the encrypted direction check signal. Then, the light demodulator 152 outputs the encrypted direction check signal to the receipt signal generator 160.

Thus, the decoder unit 161 of the receipt signal generator 160, to obtain the direction check signal, decodes the encrypted direction check signal and outputs the direction check signal to the processor unit 162.

The processor unit 162 of the receipt signal generator 160 compares the robot ID included in the direction check signal with the robot ID included in the search signal.

If both robot IDs agree each other (Step S23), the processor unit 162 generates the receipt signal. Prior to the generation of the receipt signal, the processor unit 162 refers to the storage 170 and obtains an unique identification number (tag ID) assigned to the tag T.

Then, the processor unit 162 generates the receipt signal which includes the tag ID, the robot ID included in the search signal, and the emitter ID included in the direction check signal, and the processor unit 162 outputs the generated receipt signal to the encryption unit 163.

Here, the processor unit 162 generates the receipt signal which further includes the emission request signal therein, if the direction check signal is not entered within a predetermined time after activating the light receiver 150 (Step S22, No) or if the robot ID of the direction check signal disagrees with the robot ID of the search signal (Step S23, No) Then, the processor unit 162 outputs the generated receipt signal to the encryption unit 163.

The modulator 143 of the radio transceiver 140, to obtain the modulated signal, modulates the encrypted receipt signal entered from the encryption unit 163, and then transmits the modulated signal by wireless through the antenna 141 (Step S26).

(The Processing in the Target Object Detection System A)

Next, the processing in the target object detection system A, which is adopted to the detection of the visitor of the office, will be explained with reference to the block diagrams of FIGS. 1, 3, and 9, the flow chart of FIG. 12.

A visitor of the office, for example, receives the tag T at the reception desk, and information, e.g. a name of the visitor and visiting section, is inputted through the terminal 5 disposed on the reception desk (Step S50).

Thus, information entered from the terminal 5 is stored in the recording unit (not shown) of the management computer 3 which connects with the terminal 5 through the network 4 (Step S51).

Then, the visitor attached the tag at the reception desk and begins to travel to the visiting section.

The controller 40 of the target detection unit 70 generates the search signal and direction check signal at a fixed cycle (Step S52), and the search signal is transferred by wireless from the radio transmitter-receiver 90 (Step S53).

The direction check signal is modulated in the light emission unit 100, and then the modulated signal is irradiated, as an infrared light signal, to the predetermined search region (Step S54).

When the tag T receives the direction check signal in addition to the search signal (Step S5, Yes), the receipt signal is generated (Step S56), and then the receipt signal is transferred by wireless (Step S57)

When the unit controller 80 receives the receipt signal transferred by wireless from the tag T, the unit controller 80 computes the distance from the robot R to the target object D based on the field intensity of the receipt signal (Step S58). The unit controller 80 identifies the light emitter which has irradiated the light signal received by the tag T. Then, the unit controller 80 regards the irradiation direction of the identified light emitter, as the direction of the target object D (Step S59). Thereby, the position of the target object D is determined (Step S60).

The unit controller 80 of the target detection unit 70 outputs the position information and tag ID, which is obtained from the receipt signal, to the controller 40 of the robot R.

The controller 40 of the robot R transmits the tag ID to the management computer 3 together with the position information (Step S61). In the management computer 3, the identification (reorganization) of the target object D (person) equipped with the tag T, to which tag ID is assigned, is performed, by searching the recording unit (not shown) based on the tag ID (Step S62). Then, the information (personal information) with regard to the identified target object D (person) is transferred to the robot R together with the command signal to be required for actuating the robot R (Step S63).

Then, the robot R performs the motion (travel) and sounds the voice message, based on the command signal entered from the management computer 3.

In the present invention, for example, the robot R performs the following motions etc. 1) the robot R moves to the front position of the target object D (person) having the tag T, and performs the image pickup of the face image of the target object D, 2) the robot R sounds a voice message such as "GOOD MORNING Mr.", and 3) the robot R sends a predetermined message to the target object D (person).

[Tag T2]

Next, the other embodiment of the tag will be explained with reference to FIG. 13.

The tag T2 of this embodiment receives radio wave and a light signal which are transferred from the robot R, and returns the receipt signal, which indicates the receipt of the radio wave or a light signal, to the robot R.

The tag T2 of this embodiment has the same construction as the tag T1 except that the receipt signal generated in this tag T2 includes the light condition information. Here, the light condition information is an information indicating the condition of the light which has been received by the tag T2.

Therefore, in the following explanations, the same reference number is used for indicating the same component as in the case of the tag T1.

Figure 13:
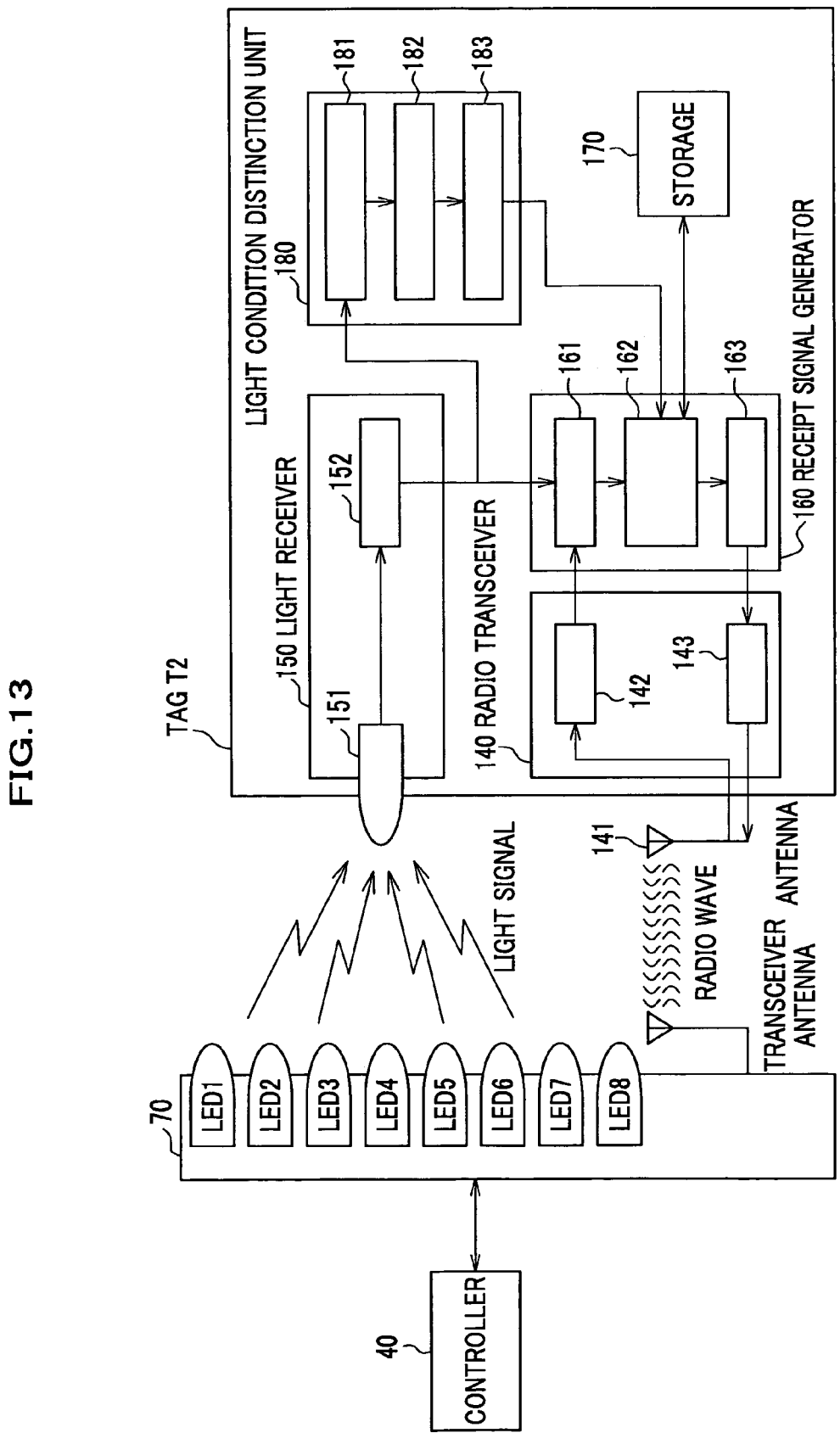
FIG. 13 is a block diagram of the tag T2 which serves as the target object D.

As shown in FIG. 13, the tag T2 includes the radio transceiver 140, the light receiver 150, the receipt signal generator 160, the storage 170, and a light condition distinction unit 180.

The tag T2 has the same construction as the tag T except that a light condition distinction unit 180 is provided. Therefore, a functions and signal processing of each component of tag T2 is the same as those of the tag T, the explanation of the tag T2 will be made for the light condition distinction unit 180 mainly, and the explanation of other part of the tag T2 will be made as appropriate.

(Light Condition Distinction Unit 180)

The light condition distinction unit 180 checks the light received by the light condition distinction unit 180 to identify the condition of the received light as either one of a direct light and a reflected light. Then, the light condition distinction unit 180 generates a light condition data which indicates the condition, e.g. a direct light or a reflected light of the received light.

The light condition distinction unit 180 includes a light intensity measuring unit 181, a light condition judgment unit 182, and a light condition data generation unit 183.

The light intensity measuring unit 181 measures an intensity of the modulated signal, when the modulated signal transferred from the robot R is received by the optical receiver To be more precise, the light intensity measuring unit 181 detects the intensity of the encrypted direction check signal, which is entered from the light demodulator 152 of the light receiver 150. Then, the light intensity measuring unit 181 outputs the data of intensity to the light condition distinction unit 182.

The light condition judgment unit 182 determines the condition of the light (modulated signal) as one of a direct light and a reflected light.

The judgment of the infrared light will be explained. Here, assuming that: the transfer power (intensity) of the infrared light irradiated from the light emitter is TP; the propagation loss of the infrared light is PL, the reflection loss of the infrared light is RL; and the receiver sensitivity (intensity) of the received infrared light at the tag T is RP. The receiver sensitivity RP can be denoted by the following formula (1).

$$RP = TP - (PL + RL) \tag{1}$$

Here, if a threshold value for determining the direct light is denoted by Rack and the relation of a following formula (2) is satisfied, the light condition judgment unit 182 judges that the light received by the tag T is a direct light.

$$RP \geq Rack \tag{2}$$

Here, the receiver sensitivity of the direct light when the distance between the robot R and the tag T corresponds to the maximum detectable range (in this embodiment, this corresponds to the distance to the outermost end of third area) Thus, if the receiver sensitivity RP is less than the threshold value (Rack), the light condition judgment unit 182 judges that the light received by the tag T is a reflected light or a light from outside the search region.

The light condition data generation unit 183 generates the light condition data based on the judgment result of the light condition judgment unit 182, and outputs the light condition data to the receipt signal generator 160.

To be more specific, the light condition data generation unit 183 generates the light condition data D1 which indicates that the infrared light signal received by the light receiver 150 is a direct light, when the receiver sensitivity RP exceeds the threshold value (RP≧Rack). On the contrary, the light condition data generation unit 183 generates the light condition data D2 which indicates that the infrared light signal received by the light receiver 150 is a reflected light, when the receiver sensitivity RP is less than the threshold value (RP<Rack).

Next, the change of the light condition depending on the positional relation between the robot R and the target object D will be explained. FIGS. 14A through 14D is an explanatory view indicating the change of the light condition.

Figure 14A:
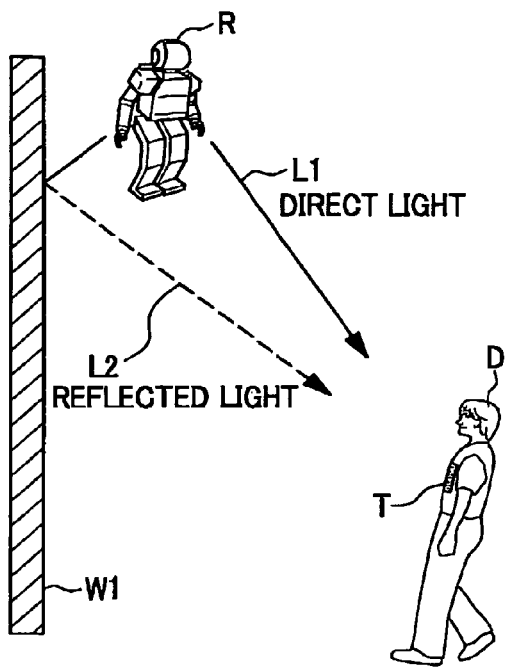
FIG. 14A is an explanatory view indicating the change of the light condition.

FIG. 14A indicates the case where the tag T2 cannot receive neither of a direct light L1 and reflected light L2 due to the long-distance separation of the robot R and target object D.

In this case, since the target object D does not exist in the search region, the robot R cannot detect the target object D.

Figure 14B:
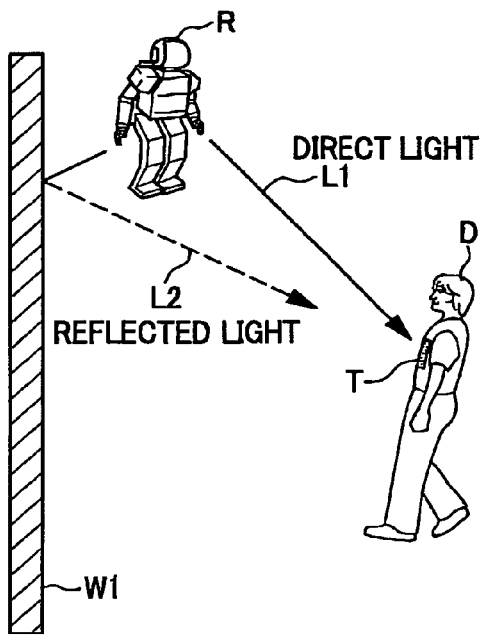
FIG. 14B is an explanatory view indicating the change of the light condition.

FIG. 14B is the case where the tag T2 can receive only a direct light L1 but cannot receive a reflected light L2 which is reflected by a wall W1.

The irradiation of the infrared light from each light emitter is a time-shared transmission, to prevent the occurrence of the receipt error due to the simultaneous receipt of a plurality of infrared light. Therefore, in the case of FIG. 14B a plurality of infrared light are received by the tag T2 at almost the same time but not the same time.

In this case, the tag T2 generates the receipt signal including the light condition data D1 when the tag T2 receives a direct light L1. Thus, the direction of the search area, which is assigned to the light emitter that has irradiated the direct light L1, is regarded as the direction of the target object D.

Figure 14C:
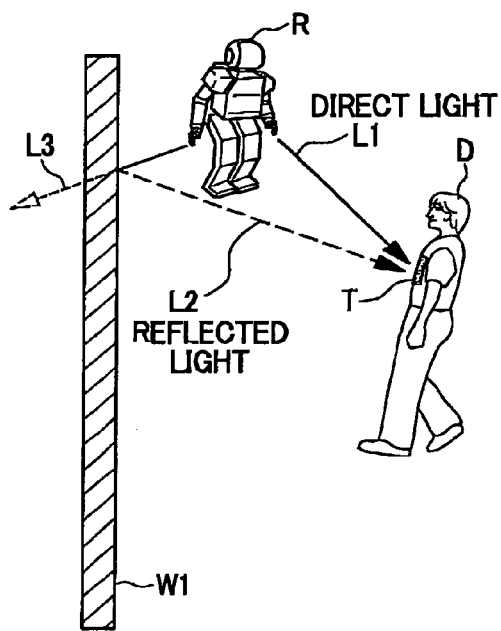
FIG. 14C is an explanatory view indicating the change of the light condition.

FIG. 14C is the case where the target object D exists in the vicinity of the robot R and the tag T2 can receive both of a direct light L1 and a reflected light L2 which are irradiated from the robot R.

In this case, the tag T2 generates the receipt signal including the light condition data D1, and transmits it to the robot R. Thus, the direction of the search region, which is assigned to the light emitter that has irradiated the direct light L1, is regarded as the direction of the target object D.

The direction of the search region, which is assigned to the light emitter that has irradiated the reflected light L2, is not regarded as the direction of the target object D. That is, since the direction L3 (see FIG. 14C) is not regarded as the direction of the target object D, the occurrence of the error in judgment can be prevented. Thus, the tag T2 may generate the receipt signal including the light condition data D2 when the reflected light L2 is received by the tag T2.

Figure 14D:
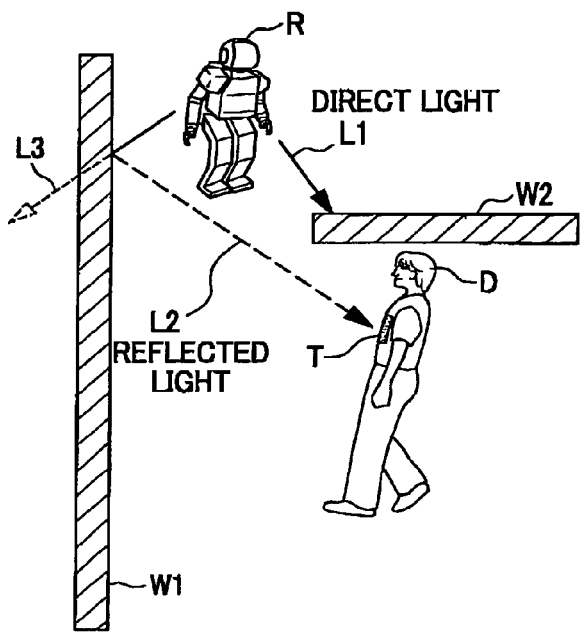
FIG. 14D is an explanatory view indicating the change of the light condition.

FIG. 14D is the case where the tag T can receive only a reflected light L2 but cannot receive a direct light L1 due to the interruption by a wall W1.

In this case, the tag T2 generates the receipt signal including the light condition data D2, and transmits it to the robot R. Thus, it is judged that the target object D does not exist in the direction of the search region, which is assigned to the light emitter that has irradiated the reflected light L2. That is, since the direction L3 (see FIG. 14D) is not regarded as the direction of the target object D, the occurrence of the error in judgment can be prevented.

The processor unit 162 of the receipt signal generator 160 generates the receipt signal including the light condition data, when the light condition data is entered from the light condition distinction unit 180. Thereby, the receipt signal including the light condition data is transferred to the robot R through the antenna 141.

(Processing in Target Object Detection System Adopting the Tag T2)

Figure 15:
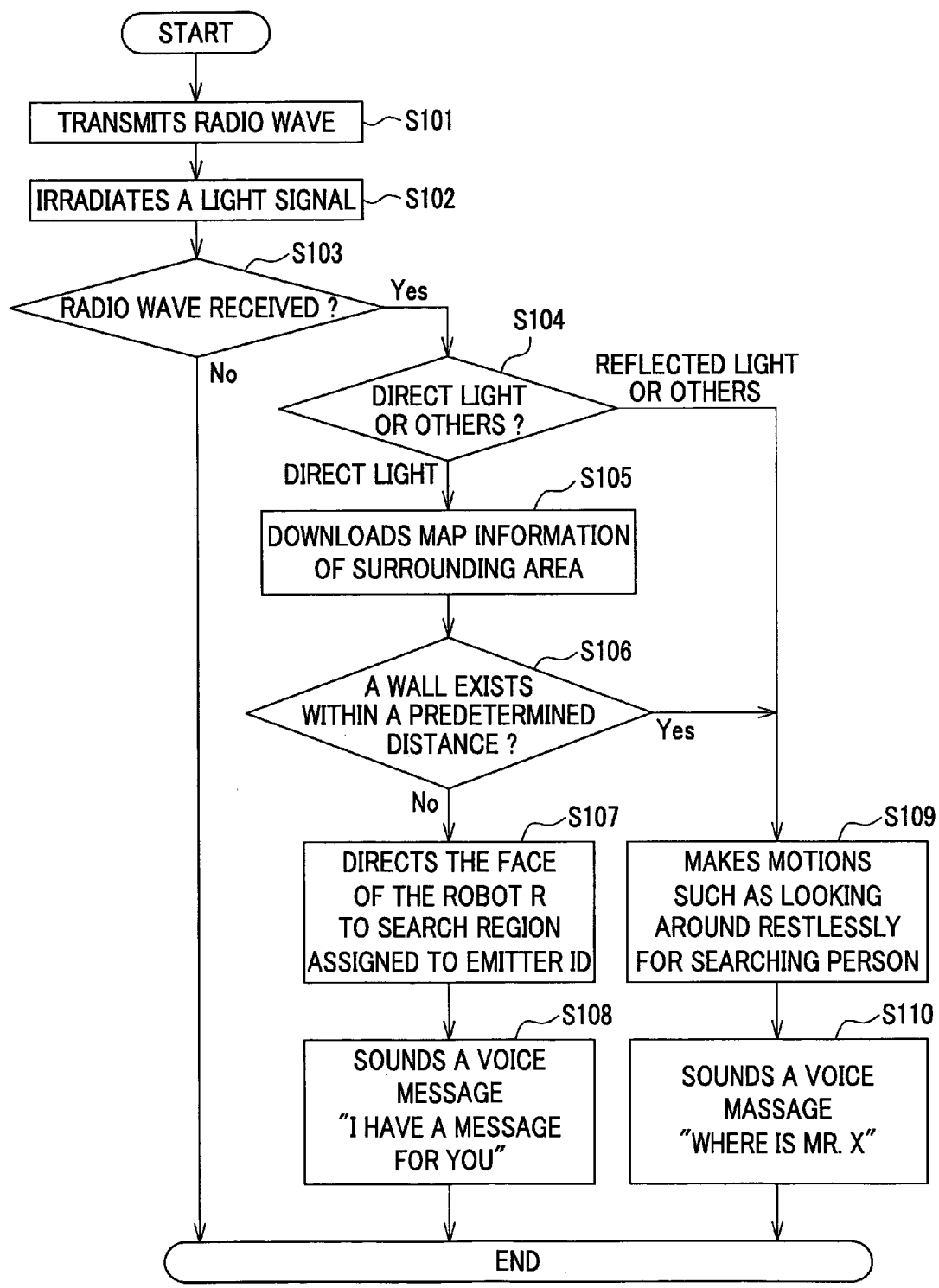
FIG. 15 is a flow chart for explaining the signal processing of the robot R.
Figure 16:
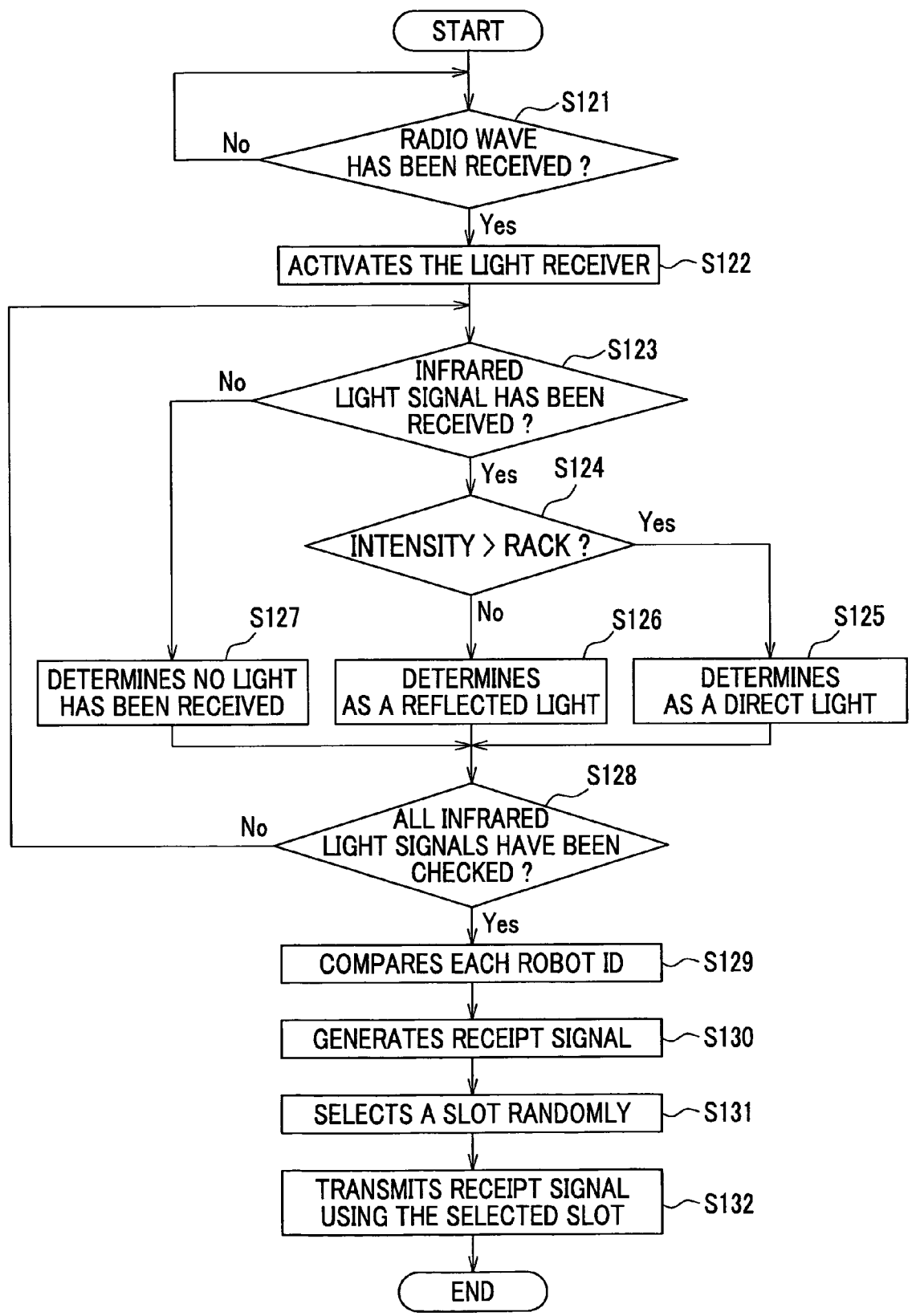
FIG. 16 is a flow chart for explaining the signal processing of the tag T2.

Next, the processing in the target object detection system A adopting the tag T2 will be made with reference to the block diagrams of FIGS. 3 and 13, and the flow charts of FIGS. 15 to 16.

The signal generator 81*a* of the unit controller 80 refers, at a predetermined cycle, to the recording unit 110, and obtains a unique identification number (robot ID) of the robot R, to which the unit controller 80 is being provided.

Then, the signal generator 81*a* generates the search signal which includes the robot ID and receipt request signal. Additionally, the signal generator 81*a* generates the direction check signal, which is irradiated as an infrared light signal from each light emitter of the light emission unit 100, for respective light emitters.

Here, the direction check signal includes the robot ID obtained in step S1 and the emitter ID to be used for identifying the light emitter which emits the direction check signal.

The encryption unit 82 of the unit controller 80 encrypts the search signal to generate the encrypted search signal, and outputs the encrypted search signal to the radio transmitter-receiver 90. Thus, the encrypted search signal is modulated by a predetermined modulation scheme to generate the modulated signal. Then, the modulated signal is transferred through the transceiver antenna 93 (Step S101). That is, the radio wave is transferred by wireless.

The encryption unit 82 of the unit controller 80 encrypts the direction check signal generated in the signal generator 81*a* to generate the encrypted direction check signal, and then outputs the encrypted direction check signal to the time division unit 83.

The time division unit 83 determines the irradiation order and timing of each light emitter (LED 1-LED 8) of the light emission unit 100, when the encrypted direction check signal is entered from the encryption unit 82. Then, the time division unit 83 outputs the encrypted direction check signal to the modulator of corresponding light emitter (LED 1-LED 8) based on the determined timing.

The modulator of each light emitter of the light emission unit 100 modulates the encrypted direction check signal by a predetermined modulation manner to obtain the infrared light signal of a predetermined wave length. Then, the infrared light signal is irradiated to the search region from the light emitter adjoining to the modulator (Step S102). Thereby, an infrared light is irradiated toward each search region established around the robot R by the planned order and timing.

The tag T2 generates the receipt signal (modulated signal) and transmits it by wireless, when the tag T2 receives the search signal (modulated signal) transmitted from the transceiver antenna 93 of the radio transmitter-receiver 90.

The demodulator 92 obtains the encrypted receipt signal by demodulating the modulated signal, when the demodulator 92 receives the modulated signal (receipt signal) transferred from the tag T2. The demodulator 92 outputs the encrypted receipt signal to the decoder 84 and field intensity measuring unit 85 of the unit controller 80.

The decoder 84 of the unit controller 80 decodes the encrypted receipt signal to obtain the receipt signal, and outputs the receipt signal to the data processor 81.

The field intensity measuring unit 85 of the unit controller 80 detects a power of the encrypted receipt signal, which is entered from the demodulator 92 of the radio transmitter-receiver 90, and computes an average of the detected power. Then, the field intensity measuring unit 85 outputs the computed average value as the data of the field intensity to the data processor 81.

The position computing part 81*b* refers to the distance table based on the field intensity entered from the field intensity measuring unit 85, and obtains information (area information) which indicates which area among areas (from first area to fourth area) the tag T2 that has transmitted the receipt signal exists in.

The position computing part 81*b* refers to the direction table stored in the recording unit 110 based on the emitter ID, which is obtained from the receipt signal entered from the decoder 84. Then, the position computing part 81*b* obtains the information (direction information) which identifies the light emitter which has irradiated an infrared light received by the tag T2.

Then, the position computing part 81b makes a judgment with regard to the light (infrared light signal) received by the tag T2 based on the light condition data included in the receipt signal (Step S104).

If the light condition data D1 is included in the receipt signal, the position computing part 81b considers that the light received by the tag T is a direct light and the tag T is in the search region. Then, the position computing part 81b downloads map information of the surrounding area of the robot R from the map database 3a in the management computer 3 (Step S105).

The position computing part 81b obtains direction information which indicates orientation of the robot R from the gyro sensor SR1. Here, in this embodiment, direction information is being added to the map information. Thereby, the information, which indicates the orientation and position of the robot R in the surrounding area identified by map information, is generated.

the position computing part 81b identifies the search region, to which the emitter ID included in the receipt signal is being assigned, and checks whether or not a wall exists within a predetermined distance d of the identified search region (Step S106).

If wall exists in the identified search region (Step S106, Yes), the position computing part 81b considers as a reflected light the light received by the tag T2. If not (Step S106, No), the position computing part 81b considers as a direct light the light received by the tag T2.

The reason why the position computing part 81b checks the existence of the wall is: since the intensity of the reflected light may exceed a threshold value (Rack) if a wall exists in the vicinity of the robot R, this may cause an error in judgment of the type of the light received by the tag T2; and since there is little possibility that the target object D exists between the robot R and the wall if a wall exists in the vicinity of the robot R, this may cause a some kind of error in judgment.

In this embodiment, as described above, the checking of whether or not the light received by the tag T2 is either of a direct light and a reflected light is performed in the robot R in addition to the tag T2. Thereby, an accurate detection can be achieved. Here, a value of the predetermined distance d is variable as appropriate.

If it is judged in step S106 that the light is a direct light, the position computing part 81b determines the position of the target object D based on area information and direction information, and generates position information which indicates the determined position.

Then, position information and the tag ID obtained from the receipt signal are supplied to the controller 40 of the robot R.

The controller 40 of the robot R transmits the tag ID to the management computer 3. The management computer 3, when the tag ID is transferred from the robot R, refers to the recording unit (not shown) based on the tag ID, and obtains information being correlated with the tag ID. Then, the management computer 3 performs the identification of the target object D (person) based on the obtained information. The management computer 3 outputs the obtained information to the robot R together with a command signal which commands the robot R to make a predetermined motion.

The robot R moves the head part R1 to direct the face to the search region assigned to the emitter ID received by the tag T2 (Step S107). Then, the robot R sounds a voice message, such as "I have a message for you", and makes an action in response to the command signal (Step S108).

If it is judged in step S106 that the light received by the tag T2 is a reflected light or it is judged in step S104 that the light received by the tag T2 is the light from outside the search region, the position computing part 81b generates direction information which indicates that the target object D does not exist in the search region assigned to the emitter ID. If it is judged that the tag T2 has not received the light, the position computing part 81b generates direction information which indicates that the direction of the target object cannot be determined.

Then, the position computing part 81b generates the position information from area information and direction information. Here, since the direction of the target object D has not been determined, the position information to be generated indicates that the target object D exists within a predetermined distance in the search area but the direction of the target object D cannot be determined. The unit controller 80 of the target detection unit 70 outputs the position information and the tag ID, which is obtained from the receipt signal, to the controller 40 of the robot R.

When the position information is entered to the controller 40, the robot R actuates the head part R1 to make a motion such as looking around restlessly for searching a person (Step S109). Thereby, the person around the robot R is notified that the robot R is searching for a person.

Additionally, the person around the robot R is notified that the robot R is searching for a person by sounding a voice message, such as "Is Mr. Kato there?".

If the receipt signal (modulated signal) transferred from the tag T2 has not been received by the demodulator 92 of the radio transmitter-receiver 90 (Step S103, No), the demodulator 92 keeps the standby condition till the receipt signal (modulated signal) is received.

(Signal Processing in Tag T2)

Next, the signal processing to be performed in tag T2 which serves as the target object D will be made with reference to the block diagram of FIG. 13 and the flow chart of FIG. 16.

When radio wave (modulated signal) transferred from the robot R has been received through the antennal 141 (Step S121, Yes), the demodulator 142 of the radio transceiver 140 demodulates the modulated signal to obtain the encrypted search signal. Then, the demodulator 142 outputs the encrypted search signal to the receipt signal generator 160.

The decoder unit 161 of the receipt signal generator 160 decodes the encrypted search signal entered from the radio transceiver 140 to obtain the search signal. Then, the decoder unit 161 outputs the search signal to the processor unit 162.

The processor unit 162 of the receipt signal generator 160 changes the condition of the light receiver 150 from a standby condition to an activated condition in response to the receipt signal included in the search signal (Step S122).

When the optical receiver 151 of the light receiver 150 receives the infrared light signal irradiated from the robot R within a predetermined time after activating the light receiver 150 (Step S123, Yes), the light demodulator 152 of the light receiver 150 demodulates the infrared light signal to obtain the encrypted direction check signal. Then, the light demodulator 152 outputs the encrypted direction check signal to the receipt signal generator 160 and the light condition distinction unit 180.

Thus, the decoder unit 161 of the receipt signal generator 160, to obtain the direction check signal, decodes the encrypted direction check signal and outputs the direction check signal to the processor unit 162.

The light intensity measuring unit 181 of the light condition distinction unit 180 detects the intensity of the encrypted direction check signal, which is entered from the light demodulator 152 of the light receiver 150. Then, the light intensity measuring unit 181 outputs the data of intensity to the light condition judgment unit 182.

The light condition judgment unit 182 compares the data of intensity, which is entered from the light intensity measuring unit 181, with the threshold value (Rack) (Step S124).

If the intensity is not less than the threshold value (Rack) (Step S124, Yes), the light condition data generation unit 183 determines that the light received by the light receiver 150 is a direct light from within the search region (Step S125), and generates the light condition data D1.

If the intensity is below the threshold value (Rack) (Step S124, No), the light condition data generation unit 183 determines that the light received by the light receiver 150 is a reflected light or the light from outside the search region (Step S126). Then, the light condition data generation unit 183 generates the light condition data D2. In this embodiment, this judgment is performed for all infrared light signals received by the tag T2.

When the judgment for all infrared light signals is terminated (Step S128, Yes), the processor unit 162 of the receipt signal generator 160 compares the robot ID included in the direction check signal (radio wave) with the robot ID included in the search signal (infrared light).

The processor unit 162 correlates signals having the same robot ID each other. Thereby, the occurrence of the error in a signal processing can be prevented, even if the tag T2 has a communication with a plurality of robots, simultaneously.

Then, the processor unit 162 generates the receipt signal if the robot ID being included in the direction check signal has agreed with the robot ID being included in the search signal.

Prior to the generation of the receipt signal, the processor unit 162 refers to the storage 170 and obtains an unique identification number (tag ID) assigned to the tag T2.

Then, the processor unit 162 generates the receipt signal which includes the light condition signal, the tag ID, the robot ID included in the search signal, and the emitter ID included in the direction check signal, and the processor unit 162 outputs the generated receipt signal to the encryption unit 163 (Step S130).

If only one infrared light signal having the robot ID has been received, the processor unit 162 generates the receipt signal with regard to this infrared light. That is, the processor unit 162 generates the receipt signal which includes the robot ID of the infrared light.

If a plurality of infrared light signals have been received and one of infrared light signals is regarded as a direct light, the processor unit 162 generates the receipt signal with regard to the infrared light signal which is regarded as a direct light.

Additionally, the processor unit 162 generates the receipt signal with regard to the infrared light signal which was received at the earliest time, when a plurality of infrared light signals, each having the same robot ID, is received, and the condition of each infrared light signal was judged as the reflected light or the light from outside the search region. Here, the generation manner of the receipt signal is not limited to the above described embodiment, the receipt signal may be generated for all infrared light signal received by the tag T2.

The processor 172 selects a transmission slot randomly for each receipt signal (Step S131).

Here, the reason why the transmission slot is randomly selected for each receipt signal is: if the tag T2 has a communication with a plurality of robots, it is required to prevent the occurrence of collision of the receipt signal for transmitting the receipt signal efficiently.

Then the modulator 143 of the radio transceiver 140, to obtain the modulated signal, modulates the encrypted receipt signal entered from the encryption unit 163, and then transmits the modulated signal by wireless through the antenna 141 (Step S132).

Here, the processor unit 162 generates the receipt signal which further includes the emission request signal therein, if the direction check signal is not entered within a predetermined time after activating the light receiver 150 or if the robot ID of the direction check signal disagrees with the robot ID of the search signal. Then, the processor unit 162 outputs the generated receipt signal to the encryption unit 163.

Then the modulator 143 of the radio transceiver 140, to obtain the modulated signal, modulates the encrypted receipt signal entered from the encryption unit 163, and then transmits the modulated signal by wireless through the antenna 141.

[Tag T3]

Next, another embodiment of the tag will be explained with reference to FIG. 17.

The tag T3 of this embodiment receives radio wave and a light signal which are transferred from the robot R, and returns the receipt signal, which indicates the receipt of the radio wave or a light signal, to the robot R.

The tag T3 of this embodiment has the same construction of the tag T1 and tag T2 except that the tag T3 is adopted to reduce a power consumption.

Figure 17:
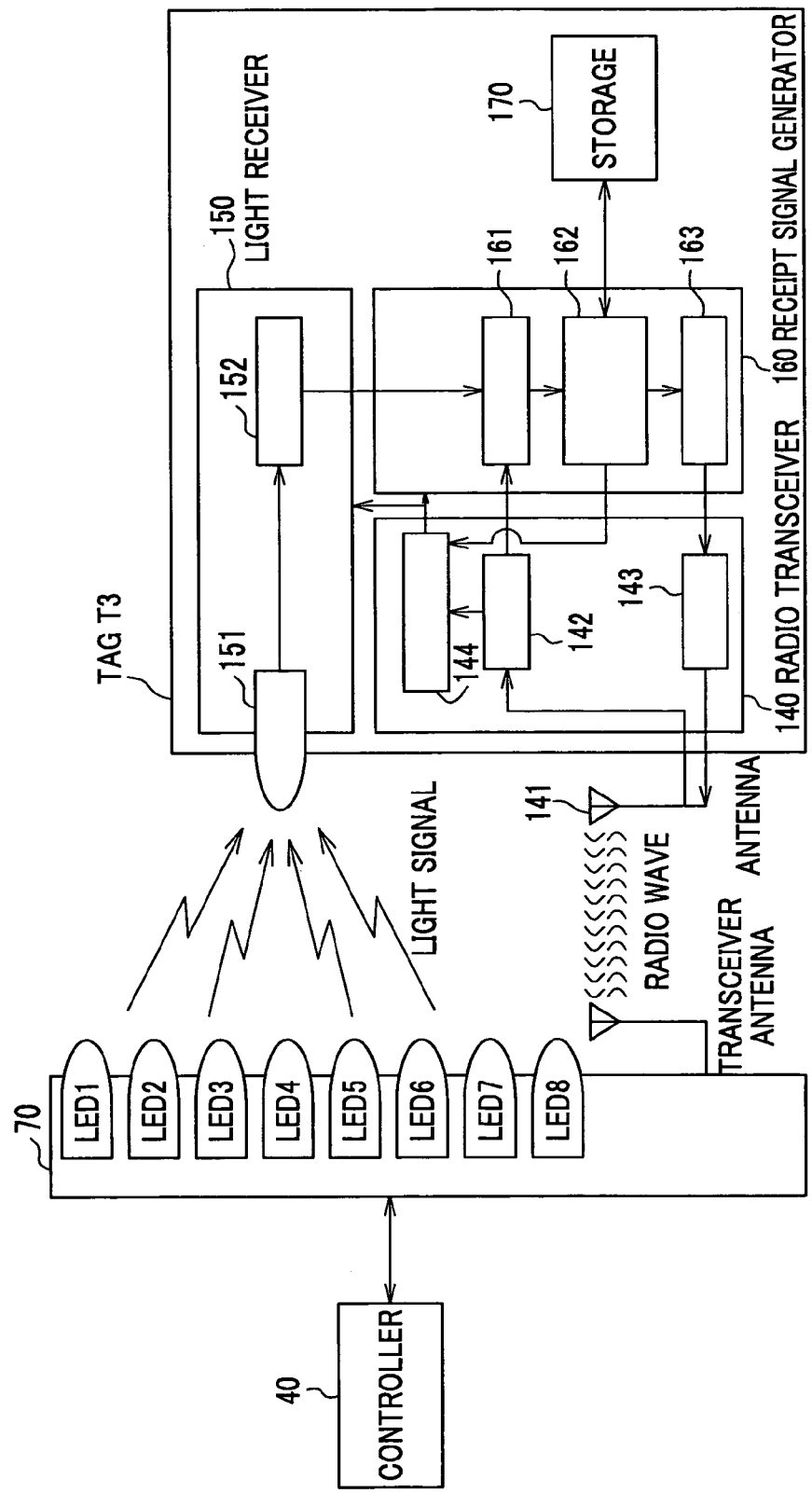
FIG. 17 is a block diagram of a tag T3 which serves as the target object D.

As shown in FIG. 17, the tag T3 includes the radio transceiver 140, the light receiver 150, the receipt signal generator 160, and the storage 170.

In the tag T3, the light receiver 150 and receipt signal generator 160 of the tag T3 are adapted to be turned on, when the radio transceiver 140 receives the radio wave transferred from the robot R. Additionally, the light receiver 150 and receipt signal generator 160 are adapted to be shut down, when the radio transceiver 140 dose not receive the radio wave within a predetermined time.

That is, in the tag T3 of this embodiment, the condition of the light receiver 150 and receipt signal generator 160 is changed between a standby condition and an activated condition in consideration of the reception condition of radio wave.

(Radio Transceiver 140)

The radio transceiver 140 receives the modulated signal transferred from the robot R by wireless, and modulates the receipt signal generated in the receipt signal generator 160 to generates the modulated signal (modulated receipt signal), and transmits the modulated receipt signal to the robot R by wireless. The radio transceiver 140 includes a antenna 141, a demodulator 142, and a modulator 143.

The radio transceiver 140 additionally controls a start/stop of the light receiver 150 and receipt signal generator 160.

The radio transceiver 140 includes a antenna 141, a demodulator 142, a modulator 143, and a start-stop controller 144.

The demodulator 142 decodes the modulated signal, which is transferred from the robot R and is received through the antenna 141, to obtain the encrypted search signal. Then, the demodulator 142 outputs the encrypted search signal to the receipt signal generator 160. The demodulator 142 prior to the demodulation of the modulated signal, outputs a signal (accept signal) which indicates the modulated signal has been received by the radio transmitter 140 to the start-stop controller 144.

The modulator 143 modulates the encrypted receipt signal, which is entered from an encryption unit 163 of the receipt signal generator 160, to obtain a modulated signal. Then, the modulator 143 transmits the modulated signal to the robot R by wireless through the antenna 141.

The start-stop controller 144 generates a control signal which controls the ON/OFF of the light receiver 150 and receipt signal generator 160.

To be more specific, the start-stop controller 144 generates a start-signal which activates the light receiver 150 and the receipt signal generator 160 when the modulated signal transmitted from the robot R is received by the radio transceiver 140 and the accept signal is entered from the demodulator 142. Then, the start-stop controller 144 outputs the start-signal to the light receiver 150 and receipt signal generator 160.

When a time-out signal is entered from the receipt signal generator 160, the start-stop controller 144 generates a stop-signal which changes the condition of the light receiver 150 and receipt signal generator 160 to the standby condition.

Then, the start-stop controller 144 outputs the stop-signal to the light receiver 150 and receipt signal generator 160.

In this embodiment, the activation and standby of the light receiver 150 and receipt signal generator 160 is controlled based on the start-signal and stop-signal. This is because to reduce power consumption of the tag T3 by activating the light receiver 150 and the receipt signal generator 160 as necessary.

(Light Receiver 150)

The light receiver 150 receives the infrared light irradiated from the robot R. The light receiver 150 includes an optical receiver 151 and a light demodulator 152.

The optical receiver 151 receives directly the infrared light (a infrared light signal) irradiated from the robot R. The light demodulator 152 demodulates the infrared light signal received by the light receiver 150 to obtain the encrypted direction check signal. Then, the light receiver 150 outputs the encrypted direction check signal to the receipt signal generator 160.

In this embodiment, to reduce power consumption of the tag T3 in which the light receiver 150 is installed, the light receiver 150 is adapted to be allowed to be changed between the activated condition and the standby condition. To be more precise, the condition of the light receiver 150 is changed to the activated condition from the standby condition, when the start-signal is entered from the start-stop controller 144. Thereby, the light receiver 150 can receive the infrared light irradiated from the robot R.

On the contrary, the condition of the light receiver 150 is changed to the standby condition from the activated condition, when the stop-signal is entered from the start-stop controller 144. Thereby, the light receiver 150 can not receive the infrared light irradiated from the robot R even if the infrared light has reached to the optical receiver 151.

(Receipt Signal Generator 160)

The receipt signal generator 160 generates a signal (receipt signal), which indicates the receipt of the search signal.

In this embodiment, this receipt signal is generated in response to the receipt request signal included in the search signal, when the search signal (modulated signal) transferred from the robot R is received by the radio transceiver 140.

Additionally, the receipt signal generator 160 commands the start-stop controller 144 to generate a stop-signal by which the condition of the light receiver 150 and receipt signal generator 160 is changed to the standby condition from the activated condition.

As shown in FIG. 17, the receipt signal generator 160 includes a decoder unit 161, a processor unit 162, and the encryption unit 163.

The decoder unit 161 decodes the encrypted signal to obtain the signal. That is, the decoder unit 161 decodes the encrypted search signal, which is entered from the radio transceiver 140, and the encrypted direction check signal, which is entered from the light receiver 150, to obtain the search signal and the direction check signal, respectively. Then, the decoder unit 161 outputs the search signal and the direction check signal to the processor unit 162.

The processor unit 162 generates the receipt signal when the search signal and direction check signal are entered from the decoder unit 161. The processor unit 162 generates a signal (time-out signal) which command the start-stop controller 144 to generate the stop-signal when signal (the search signal and the direction check signal) is not entered within a second predetermined time after generating the receipt signal.

In this embodiment, the search signal includes the robot ID and the receipt request signal. Here, the robot ID is a unique identification number to specify the robot R which has transmitted the search signal. The receipt request signal is a signal which commands the target object D that has received the search signal to perform a predetermined processing.

The direction check signal includes the robot ID for identifying the robot R which has emitted the direction check signal, and the emitter ID for identifying the light emitter which has emitted the direction check signal.

When the processor unit 162 receives the direction check signal within a first predetermined time after receiving the search signal, the processor unit 162 compares the robot ID included in the direction check signal with the robot ID included in the search signal.

Here, the first predetermined time is determined based on the time lag between the search signal transferred from the radio transmitter-receiver 90 of the robot R and the infrared light signal which was irradiated at last from the light emission unit 100 of the robot R.

The processor unit 162 obtains a unique identification number (tag ID) being assigned to the tag T from the storage 170, when the robot ID, which is included in the direction check signal, agrees with the robot ID, which is included in the search signal.

Then, the processor unit 162 generates the receipt signal in which the tag ID, the robot ID included in the search signal, and the emitter ID included in the direction check signal are included, and outputs the generated receipt signal to the encryption unit 163.

On the contrary, the processor unit 162 generates the receipt signal which further includes the emission request signal therein, if the direction check signal is not entered within a predetermined time after receiving the search signal or if the robot ID of the direction check signal disagrees with the robot ID of the search signal. Then, the processor unit 162 outputs the generated receipt signal to the encryption unit 163. Here, the emission request signal is a signal which commands the robot R (detection unit) to emit an infrared light.

The processor unit 162 generates the time-out signal, if the search signal is not entered within a second predetermined time after generating the receipt signal. Then, the processor unit 162 outputs the generated time-out signal to the start-stop controller 144.

Here, the time-out signal is a signal which commands the start-stop controller 144 to generate a stop-signal. Here, the stop-signal is a signal for changing the condition of the light receiver 150 and receipt signal generator 160 to the standby condition from the activated condition.

In this embodiment, the condition of the light receiver 150 and receipt signal generator 160 is changed to the standby condition from the activated condition in order to reduce the energy combustion of the tag T3, when the position detection of the target object D having the tag T3 is not required.

To be more specific, in the present embodiment, radio wave (search signal) is transmitted from the radio transmitter-receiver 90 of the robot R at a predetermined cycle T1, and the range of the transmission is limited within a range of the third area.

Therefore, if the tag T3 cannot receive the radio wave transmitted from the robot R, the position of the target object D having the tag T3 is in the fourth area in FIG. 6. In this case, the position where the target object D is in is not the area (first area to third area) wherein the position of the target object has to be detected.

Therefore, the standby condition of the light receiver 150 and receipt signal generator 160 is kept till the target object D having the tag T3 is detected within a range of areas (from first area to third area).

In this embodiment, the processor unit 162 of the tag T3 generates the time-out signal, if the search signal is not entered within a second predetermined time after generating the receipt signal. This is because it is judged that the target object D is not in a range of areas (from first area to third area). Here, it is preferable that the second predetermined time is longer than the cycle (a predetermined time interval T1) of the transmission of radio wave from the robot R.

In this embodiment, the time interval from the generation of the receipt signal to the input of next search signal is determined as the time to be compared with the second threshold value. This time is substantially the same as the time interval from the transmission of the receipt signal to the receipt of radio wave (search signal) transmitted from the robot R by wireless.

The encryption unit 163 encrypts the receipt signal to generate the encrypted receipt signal, and outputs the encrypted receipt signal to the radio transceiver 140. Thereby, the encrypted receipt signal is modulated in the modulator 143 of the radio transceiver 140 and then transferred by wireless through the antenna 141.

In this embodiment, to reduce the power consumption of the tag T3 in which the receipt signal generator 160 is installed, the condition of the receipt signal generator 160 is adapted to be changed between the activated condition and the standby condition.

To be more precise, the condition of the receipt signal generator 160 is changed to the activated condition from the standby condition, when the start-signal is entered from the start-stop controller 144. On the contrary, the condition of the receipt signal generator 160 is changed to the standby condition from the activated condition, when the stop-signal is entered from the start-stop controller 144.

(Signal Processing in Tag T3)

Figure 18:
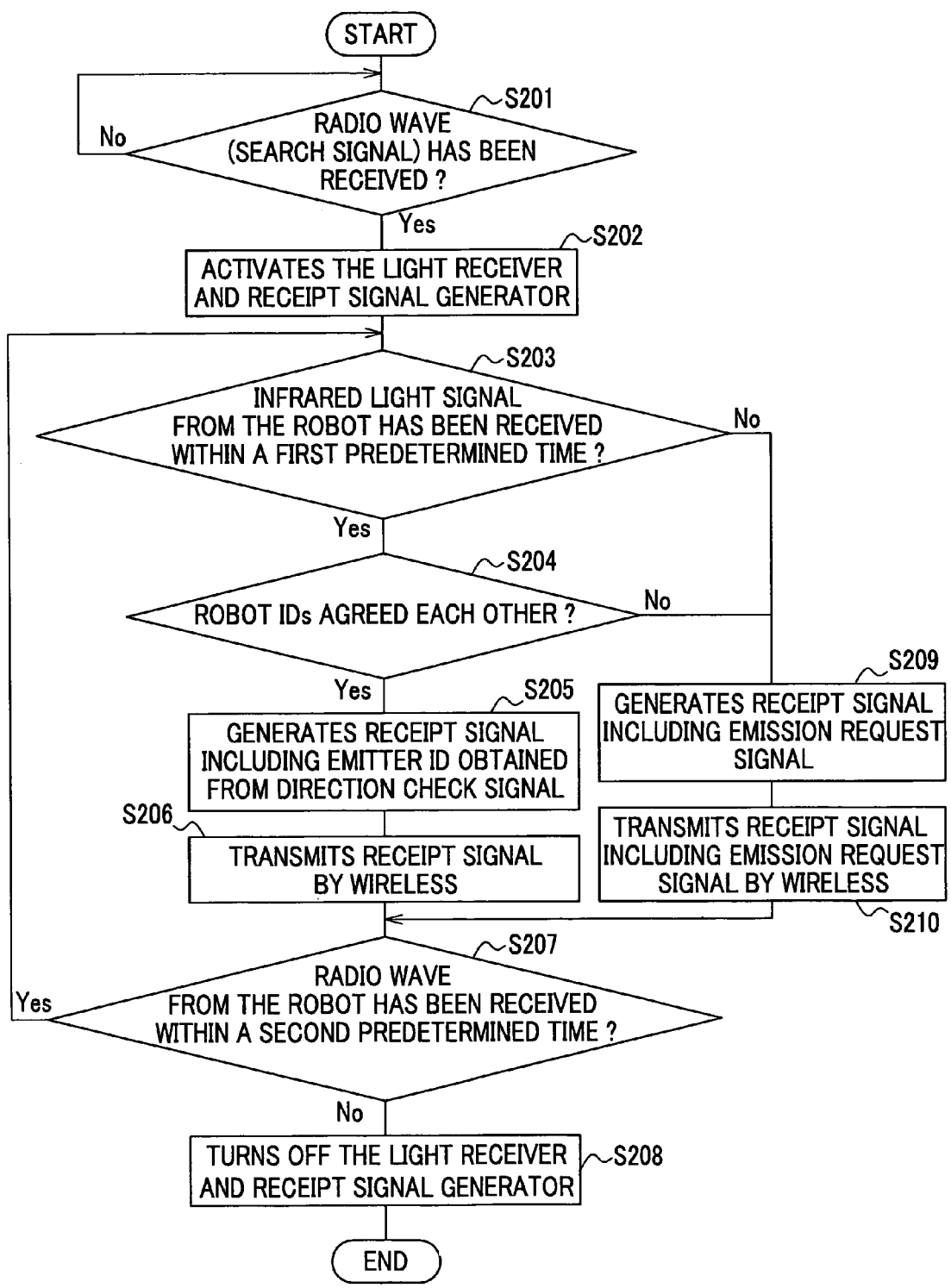
FIG. 18 is a flow chart for explaining the signal processing of the tag T3.

Next, the signal processing to be performed in tag T3 which serves as the target object D will be made with reference to the block diagram of FIG. 17 and the flow chart of FIG. 18.

When radio wave (modulated signal) transferred from the robot R has been received through the antenna 141 (Step S201, Yes), the demodulator 142 of the radio transceiver 140 demodulates the modulated signal to obtain the encrypted search signal. Then, the demodulator 142 outputs the encrypted search signal to the receipt signal generator 160.

In this occasion, the start-stop controller 144 of the radio transceiver 140 generates the start-signal, when the start-stop controller 144 of the radio transceiver 140 receives the accept signal from the demodulator 142. Then, the start-stop controller 144 outputs the start-signal to the light receiver 150 and receipt signal generator 160 to change the condition of them to the activated condition from the standby condition (Step S202).

The decoder unit 161 of the receipt signal generator 160 decodes the encrypted search signal entered from the radio transceiver 140 to obtain the search signal. Then, the decoder unit 161 outputs the search signal to the processor unit 162.

When the optical receiver 151 of the light receiver 150 receives the infrared light signal irradiated from the robot R within a first predetermined time after entering the search signal to the processor unit 162 of the receipt signal generator 160 (Step S203, Yes), the light demodulator 152 of the light receiver 150 demodulates the infrared light signal to obtain the encrypted direction check signal. Then, the light demodulator 152 outputs the encrypted direction check signal to the receipt signal generator 160.

Thus, the decoder unit 161 of the receipt signal generator 160, to obtain the direction check signal, decodes the encrypted direction check signal and outputs the direction check signal to the processor unit 162.

The processor unit 162 of the receipt signal generator 160 compares the robot ID included in the direction check signal with the robot ID included in the search signal (Step S204).

If both robot IDs agree each other (Step S204, Yes), the processor unit 162 refers to the storage 170 and obtains an unique identification number (tag ID) assigned to the tag T3.

Then, the processor unit 162 generates the receipt signal which includes the tag ID, the robot ID included in the search signal, and the emitter ID included in the direction check signal (Step S205), and the processor unit 162 outputs the generated receipt signal to the encryption unit 163.

The modulator 143 of the radio transceiver 140, to obtain the modulated signal, modulates the encrypted receipt signal entered from the encryption unit 163, and then transmits the modulated signal (receipt signal) by wireless through the antenna 141 (Step S206).

If the radio transceiver 140 receives the radio wave transferred from the robot R within a second predetermined time after transmitting the receipt signal by wireless, the signal processing of steps from S203 to S206 is repeated.

On the contrary, if the radio transceiver 140 does not receive the radio wave transferred from the robot R within a second predetermined time after transmitting the receipt signal by wireless (Step s207, No), the start-stop controller 144 generates the stop-signal in response to the time-out signal. Then, the start-stop controller 144 outputs the stop-signal to the light receiver 150 and receipt signal generator 160 to change the condition of them form the activated condition to the standby condition (Step S208).

The processor unit 162 generates the receipt signal including the emission request signal (Step S209), when the direction check signal has not been received by the light receiver 150 within a first predetermined time after activating the light receiver 150 (Step S203, No) or when the robot ID of the direction check signal disagrees with the robot ID of the search signal (Step S204, No).

The receipt signal is then encrypted in the encryption unit 163 and is supplied to the radio transceiver 140. The modulator 143 of the radio transceiver 140, to obtain the modulated signal, modulates the encrypted receipt signal entered from the encryption unit 163, and then transmits the modulated signal by wireless through the antenna 141 (Step S210).

The start-stop controller 144 generates the stop-signal in response to the time-out signal entered from the processor unit 162, when the radio transceiver 140 does not receive next radio wave within a second predetermined (Step S207, No). Then, the start-stop controller 144 outputs the stop-signal to the light receiver 150 and receipt signal generator 160 to change the condition of them to the standby condition from the activated condition (Step S208).

Thereby, the light receiver 150 and receipt signal generator 160 of the tag T3 are activated when the radio transceiver 140 receives the radio wave transferred from the robot R, i.e. the light receiver 150 and receipt signal generator 160 of the tag T3 are activated if required and are disabled if not. Thus, the life time of the tag T3 can be extended by decreasing the power consumption.

Therefore, since the life time of the tag T3 can be increased, the time to be used for the travel of the robot R can be increased and improves the freedom (flexibility) of the travel of the robot (detector).

(The Processing in the Target Object Detection System a Adopting the Tag T3)

Next, the processing in the target object detection system A, which adopts the tag T3, will be explained with reference to the block diagrams of FIGS. 3 and 17, the flow chart of FIGS. 19 through 22.

In the following explanation, the explanation will be made under the assumption that the receipt signal generated in the receipt signal generator 160 does not includes the emission request signal.

Figure 19:
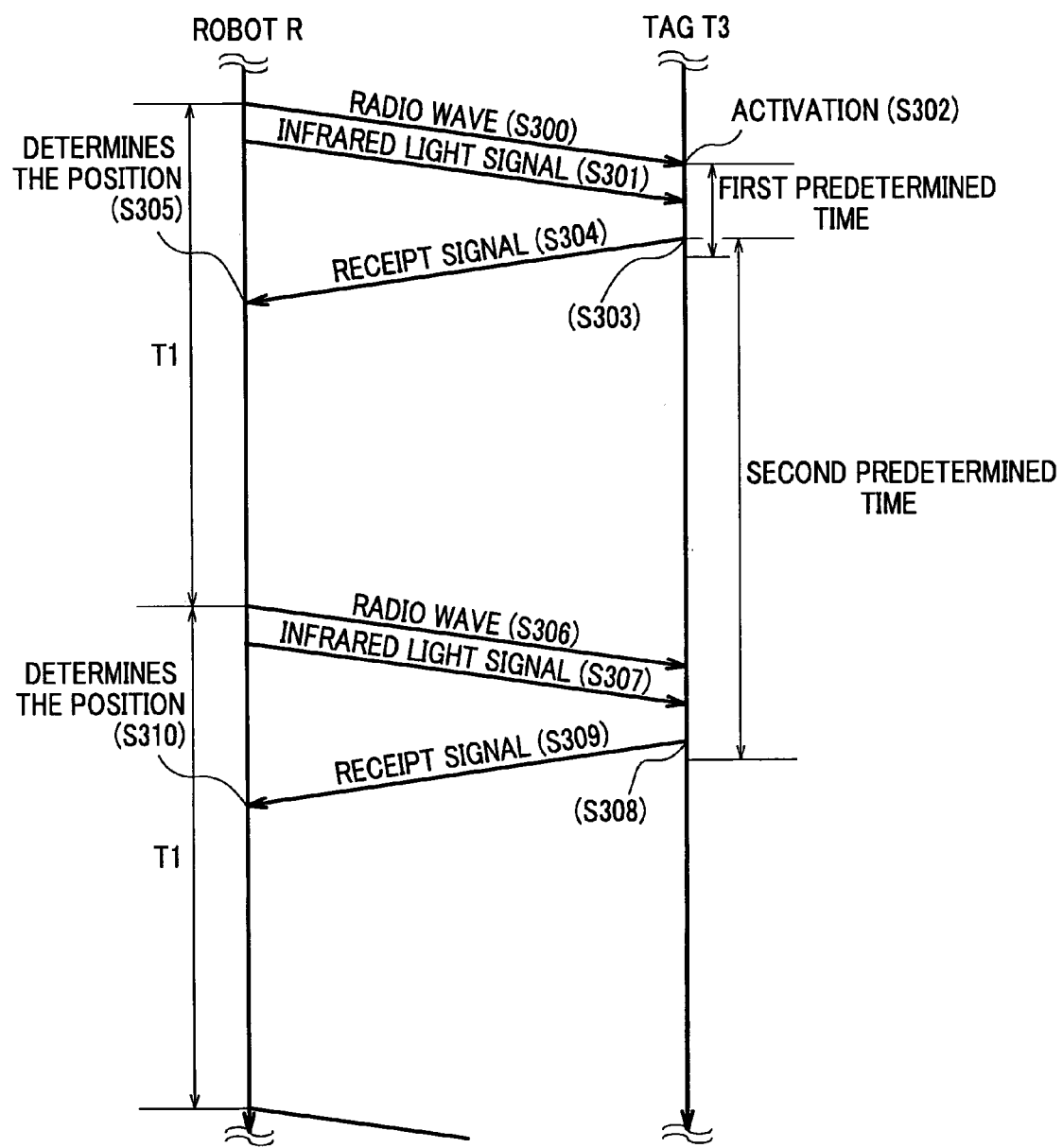
FIG. 19 is a sequence chart for explaining the signal exchange between the robot R and tag T3 which are included in the target object detection system A.
Figure 20:
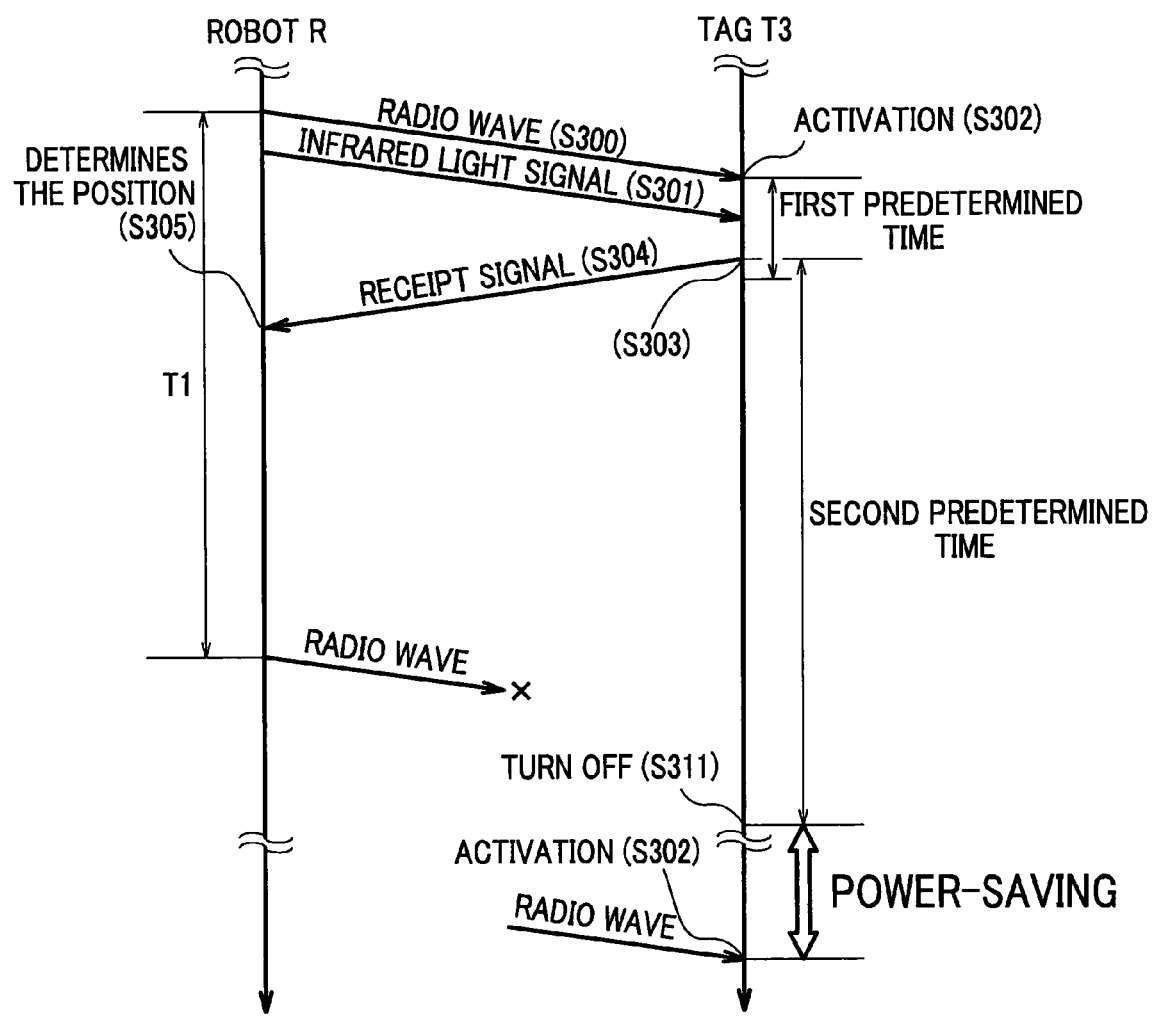
FIG. 20 is a sequence chart for explaining the signal exchange between the robot R and tag T3 which are included in the target object detection system A.

Firstly, as shown in FIG. 19, radio wave (search signal) is transmitted from the radio transmitter-receiver 90 (Step S300), and an infrared light signal is irradiated from each light emitter of the light emission unit 100 toward corresponding search region (Step S301).

The light receiver 150 and receipt signal generator 160 of the tag T3 is activated, when the radio transceiver 140 of the tag T3 receives the radio wave (search signal) transferred from the robot R (Step S302).

The receipt signal is generated in the tag T3 (Step S303) when the infrared light signal irradiated from the robot R is received by the light receiver 150 within a first predetermined time after the activation of the light receiver 150 and receipt signal generator 160 of the tag T3. Then, the receipt signal is transferred by wireless to the robot R after the predetermined processing of the receipt signal (Step S304).

The data processor 81 of the robot R determines the position of the tag T3 which has generated the receipt signal, when the receipt signal transferred from the tag T3 is received by the radio transceiver-receiver 90 of the robot R (Step S305).

The robot R transmits radio wave (search signal) by wireless (Step S306) when a predetermined first time T1 has passed after receiving the radio wave (search signal), and irradiates the infrared light signal to the corresponding search region (Step S307).

The tag T3 keeps the activated condition of the light receiver 150 and receipt signal generator 160, when next radio wave (search signal) transferred from the robot R has received within the first predetermined time after receiving the prior radio wave (search signal). Then, the receipt signal is again generated (step S308), and is transferred by wireless to the robot R after the predetermined processing of the receipt signal (Step S309). The position detection of the tag T3 is performed again (Step S310), when the robot R receives the receipt signal.

In this embodiment, the robot R repeats at a fixed cycle T1 the transmission of radio wave (search signal) and infrared light signal.

Therefore, the tag T3 repeats the generation of the receipt signal and the transmission of it as long as the tag T3 can receive radio wave newly transmitted from the robot R within a second predetermined time after transmitting the receipt signal and the tag T can receive the infrared light irradiated from the robot R within a first predetermined time after receiving radio wave. Thus, the robot R repeats the position detection of the tag T3 in response to the receipt signal.

As shown in FIG. 19, however, if the radio wave newly transmitted from the robot R is not received by the tag T3 within a second predetermined time after the transmission of the receipt signal (S304), the condition of the light receiver 150 and receipt signal generator 160 of the tag T3 are changed to the standby condition (S311). The standby condition is continued till next radio wave transmitted from the robot R is received.

(The Processing in the Target Object Detection System

Next, the processing in the target object detection system A, which adopts the tag T3, will be explained under the assumption that the receipt signal generated in the receipt signal generator includes the emission request signal.

Figure 21:
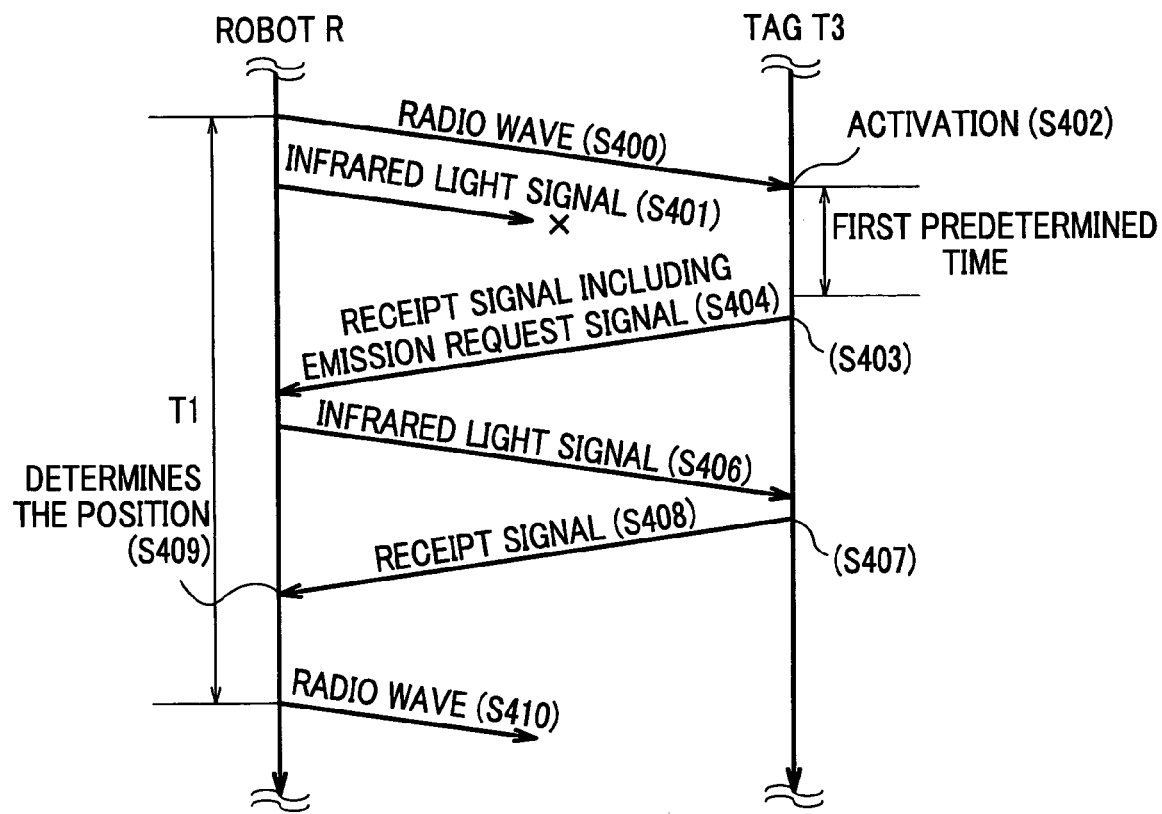
FIG. 21 is a sequence chart for explaining the signal exchange between the robot R and tag T3 which are included in the target object detection system A.

As shown in FIG. 21, radio wave (search signal) is transmitted from the radio transmitter-receiver 90 (Step S400), and an infrared light signal is irradiated from each light emitter of the light emission unit 100 toward corresponding search region (Step S401).

The light receiver 150 and receipt signal generator 160 of the tag T3 is activated, when the radio transceiver 140 of the tag T3 receives the radio wave (search signal) transferred from the robot R (Step S402).

The receipt signal including the emission request signal is generated in the tag T3 (Step S403), when the infrared light signal irradiated from the robot R is not received by the light receiver 150 within a first predetermined after the activation of the light receiver 150 and receipt signal generator 160 of the tag T3. Then, the receipt signal is transferred by wireless to the robot R after the predetermined processing of the receipt signal (Step S403).

The data processor 81 of the robot R generates the direction check signal, when the receipt signal including the emission request signal is received by the radio transmitter-receiver 90 of the robot R. Then, the direction check signal is irradiated to the predetermined search regions as an infrared light signal after the predetermined processing (Step S406).

The tag T3 generates the receipt signal (Step S407), when the infrared light signal newly irradiated from the robot R after transmitting the receipt signal including the emission request signal is received. Then the tag T3 transmits the receipt signal to the robot R after the predetermined processing (Step S408).

The data processor 81 of the robot R determines the position of the tag T3 which has generated the receipt signal (Step S409), when the receipt signal is received by the radio transmitter-receiver 90 of the robot R.

The robot R repeats the transmission of radio wave (search signal) at a fixed cycle T1 (Step S410). Thus, the processing of steps from S301 to S310 (see FIG. 19) and the processing following to S403 are repeated, as appropriate.

Figure 22:
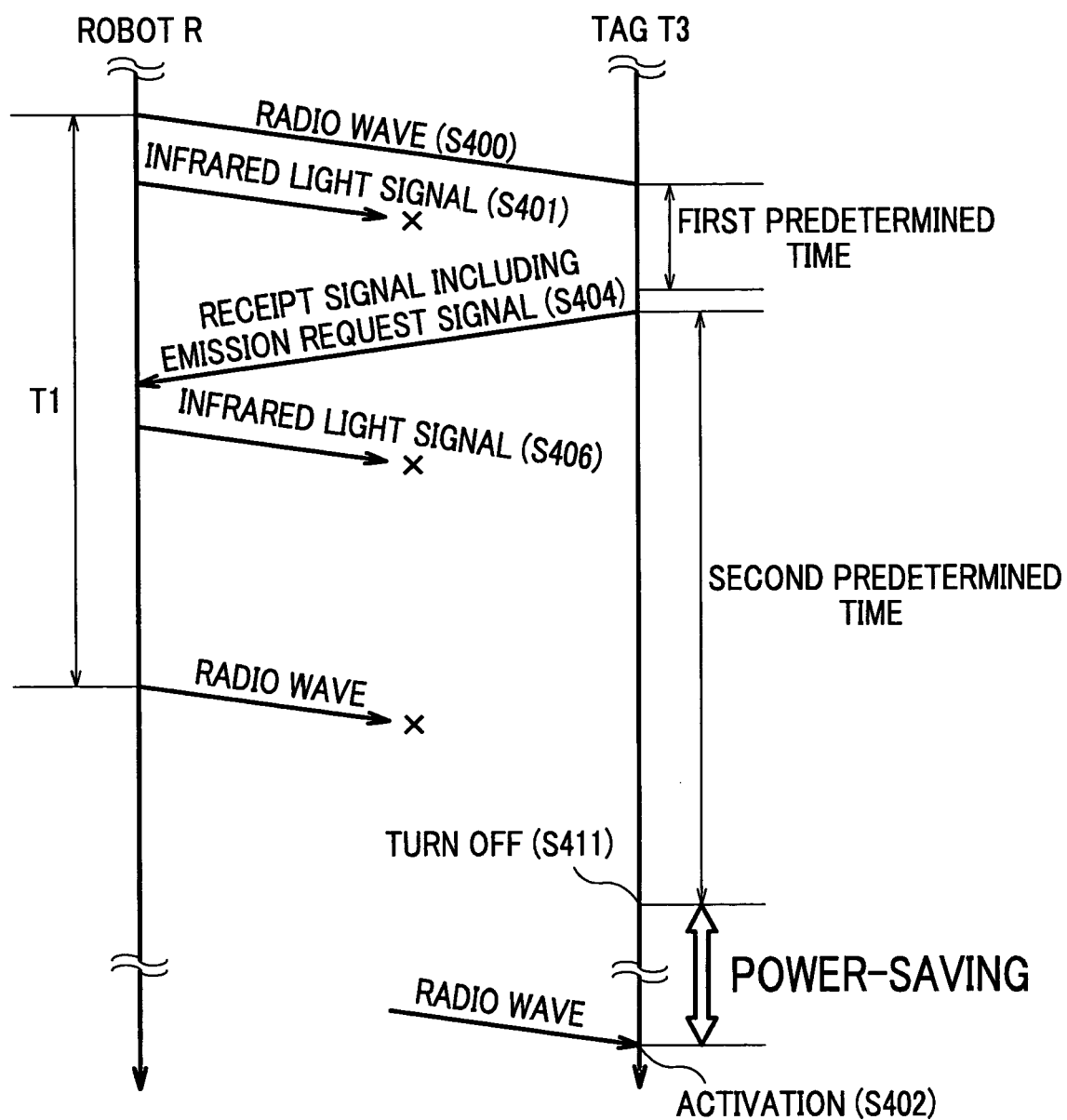
FIG. 22 is a sequence chart for explaining the signal exchange between the robot R and tag T3 which are included in the target object detection system A.

In the present embodiment, as shown in FIG. 22, the light receiver 150 and receipt signal generator 160 are stopped if both following conditions are satisfied (Step S411). That is; (1) the tag T3 does not receive the infrared light signal newly irradiated from the robot R within the second predetermined time after transmitting the receipt signal including the emission request signal, and (2) the tag T3 does not receive the radio wave (search signal) transferred from the robot R.

Then, the standby condition of the light receiver 150 and receipt signal generator 160 are continued till next radio wave transferred from the robot R is received. Thereby, the power combustion of the tag T3 can be reduced.

[Tag T4]

Next, the fourth embodiment of the tag will be explained with reference to FIG. 23.

The tag T4 of this embodiment receives radio wave and light signal which are transferred from the robot R, and returns the receipt signal, which indicates the receipt of radio wave or light signal, to the robot R.

The tag T4 of this embodiment has the same construction as the tags (T1-T3) except that the tag T4 transmits the receipt signal to the robot R using a slot selected from among a plurality of slots which are established for allowing time-sharing.

In the above embodiments, a total of eight search regions (from first region to eighth region) are established around the robot R. But in this embodiment, for ease of explanation, the explanation of the tag T4 will be made under the assumption that a total of six search regions (from first region to sixth regions) are established around the robot R.

Figure 23:
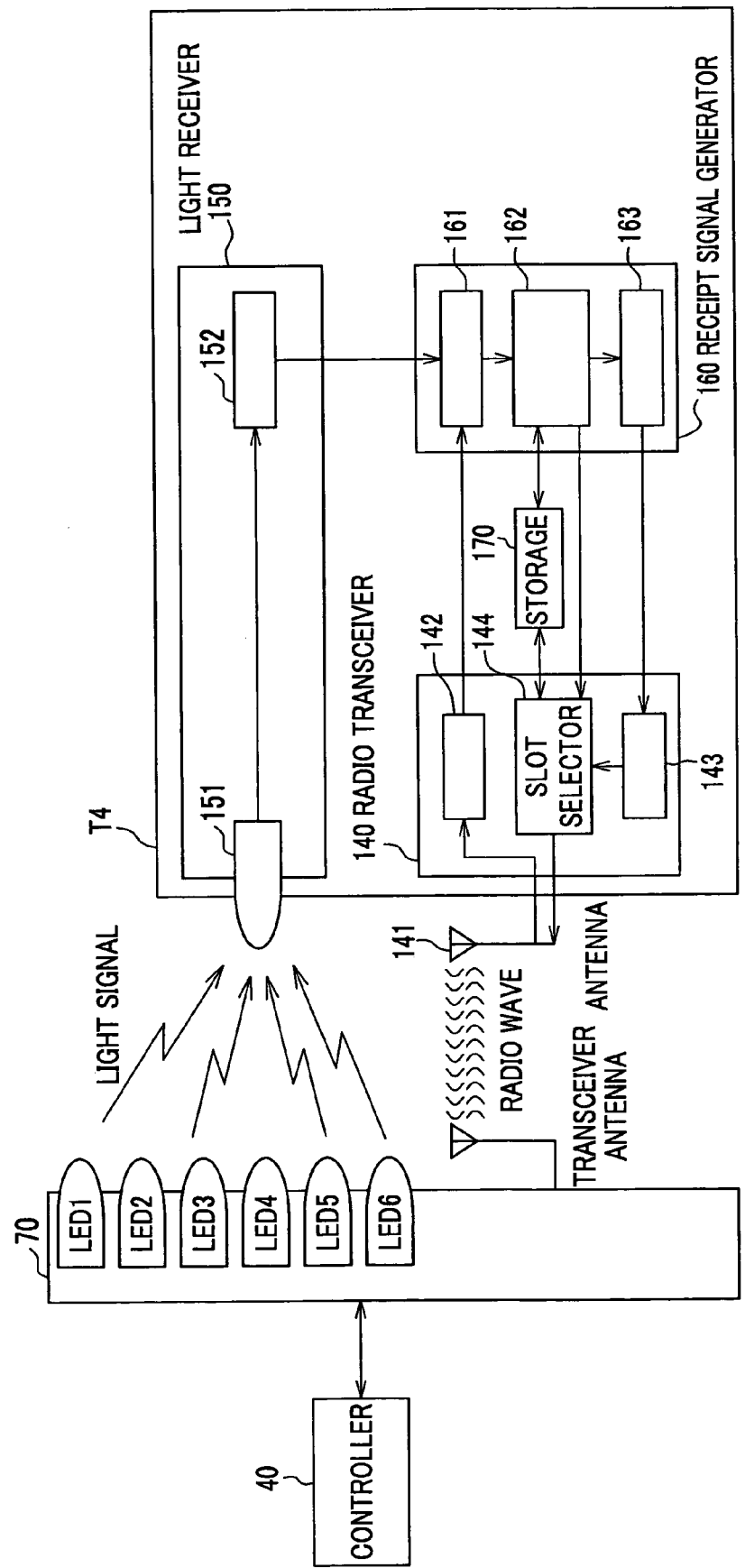
FIG. 23 is a block diagram of a tag T4 which serves as the target object D.

Therefore, in FIG. 23 for explaining the tag T4, a total of six light emitter is disposed in the target detection unit 70.

As shown in FIG. 23, the tag T4 includes the radio transceiver 140, the light receiver 150, the receipt signal generator 160, and the storage 170.

(Radio Transceiver 140)

The radio transceiver 140 receives the modulated signal transferred from the robot R by wireless, and modulates the receipt signal generated in the receipt signal generator 160 to generates the modulated signal (modulated receipt signal), and transmits the modulated receipt signal to the robot R by wireless. The radio transceiver 140 includes a antenna 141, a demodulator 142, a modulator 143, and a slot selector 144.

The demodulator 142 decodes the modulated signal, which is transferred from the robot R and is received through the antenna 141, to obtain the encrypted search signal. Then, the demodulator 142 outputs the encrypted search signal to the receipt signal generator 160.

The modulator 143 modulates the encrypted receipt signal, which is entered from an encryption unit 163 of the receipt signal generator 160, to obtain a modulated signal. Then, the modulator 143 outputs the modulated signal to the slot selector 144.

The slot selector 144, which will be explained later in detail, transmits the modulated signal by wireless through the antenna 141. In this occasion, the transmission of the modulated signal is performed at the timing being assigned to the selected slot using a slot selected from among a plurality of slots which are established for allowing time-sharing.

(Light Receiver 150)

The light receiver 150 receives the infrared light irradiated from the robot R. The light receiver 150 includes an optical receiver 151 and a light demodulator 152.

The optical receiver 151 receives directly the infrared light (a infrared light signal) irradiated from the robot R. The light demodulator 152 demodulates the infrared light signal received by the light receiver 150 to obtain the encrypted direction check signal, and outputs the encrypted direction check signal to the receipt signal generator 160.

(Receipt Signal Generator 160)

The receipt signal generator 160 generates a signal (receipt signal), which indicates the receipt of the search signal from the robot R. In this embodiment, this receipt signal is generated in response to the receipt request signal included in the search signal, when the search signal (modulated signal) transferred from the robot R is received by the radio transceiver 140.

As shown in FIG. 23, the receipt signal generator 160 includes a decoder unit 161, a processor unit 162, and the encryption unit 163.

The decoder unit 161 decodes the encrypted search signal, which is entered from the radio transceiver 140, and the encrypted direction check signal, which is entered from the light receiver 150, to obtain the search signal and the direction check signal, respectively. Then, the decoder unit 161 outputs the search signal and the direction check signal to the processor unit 162.

The processor unit 162 generates the receipt signal. In this embodiment, the search signal includes the robot ID and the receipt request signal. Here, the robot ID is a unique identification number to specify the robot R.

The direction check signal includes the robot ID for identifying the robot R which has emitted the direction check signal, and the emitter ID for identifying the light emitter which has emitted the direction check signal.

Thus, the processor unit 162 changes the condition of the light receiver 150 from a standby condition to an activated condition in response to the receipt request signal included in the search signal, when the search signal is entered to the processor unit 162.

When the processor unit 162 receives the direction check signal within a predetermined time after activating the light receiver 150, the processor unit 162 compares the robot ID included in the direction check signal with the robot ID included in the search signal.

The processor unit 162 obtains a unique identification number (tag ID) being assigned to the tag T from the storage 170, when the robot ID, which is included in the direction check signal, agrees with the robot ID, which is included in the search signal.

Then, the processor unit 162 generates the receipt signal in which the tag ID, the robot ID included in the search signal, and the emitter ID included in the direction check signal are included, and outputs the generated receipt signal to the encryption unit 163.

On the contrary, the processor unit 162 generates the receipt signal which further includes the emission request signal therein, if the direction check signal is not entered within a predetermined time after activating the light receiver 150 or if the robot ID of the direction check signal disagrees with the robot ID of the search signal. Then, the processor unit 162 outputs the generated receipt signal to the encryption unit 163. Here, the emission request signal is a signal which commands the robot R (detection unit) to emit an infrared light.

In this embodiment, the processor unit 162 outputs the emitter ID, which is the same as the emitter ID being included in the receipt signal, to the slot selector 144, when the processor unit 162 outputs the receipt signal to the encryption unit 163.

The encryption unit 163 encrypts the receipt signal to generate the encrypted receipt signal, and outputs the encrypted receipt signal to the radio transceiver 140.

Thereby, the encrypted receipt signal is modulated in the modulator 143 of the radio transceiver 140 and then transferred by wireless through the antenna 141. In this occasion, the transmission of the modulated signal is performed at the timing being assigned to the selected slot using a slot selected from among a plurality of slots which are established for allowing time-sharing.

(Transmission Timing of the Receipt Signal)

In this embodiment, the transmission timing of the modulated signal to be transmitted from the radio transceiver 140 is determined in the slot selector 144.

The determination of the transmission timing will be explained with reference to FIGS. 24 and 25.

Here, as described above, for ease of explanation, the determination of the transmission timing will be explained under the assumption that a total of six search regions(from first region to sixth regions) are established around the robot R.

Figure 24:
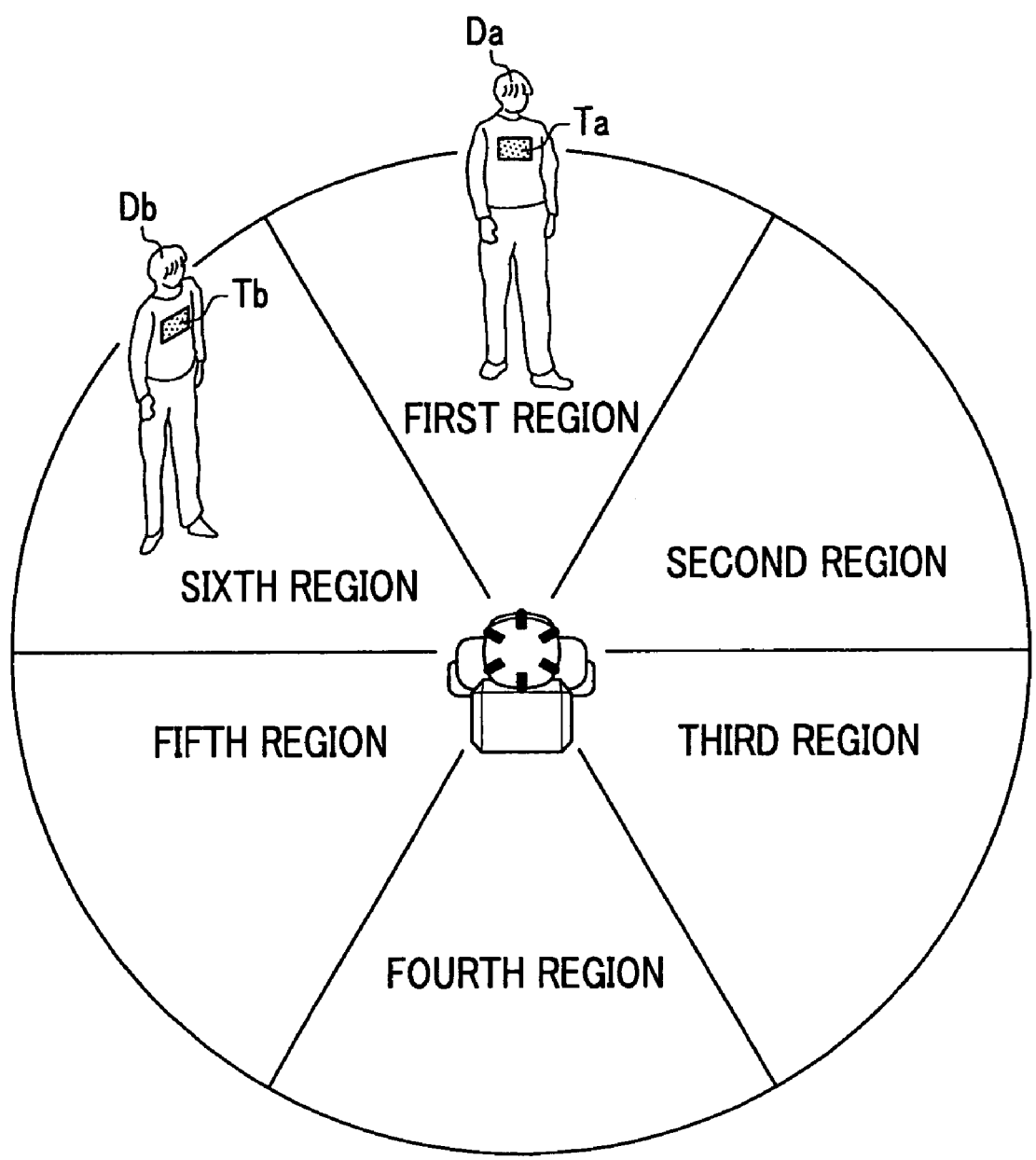
FIG. 24 is an explanatory view of the selection of the slot by the slot selector 144 in the case where a plurality of target objects D is within a surrounding area of the robot R.

Referring to FIG. 24, the tag Ta in the first region generates the receipt signal by a data processing as described above, when the tag Ta receives the radio wave and light signal which are transferred from the robot R.

Figure 25:
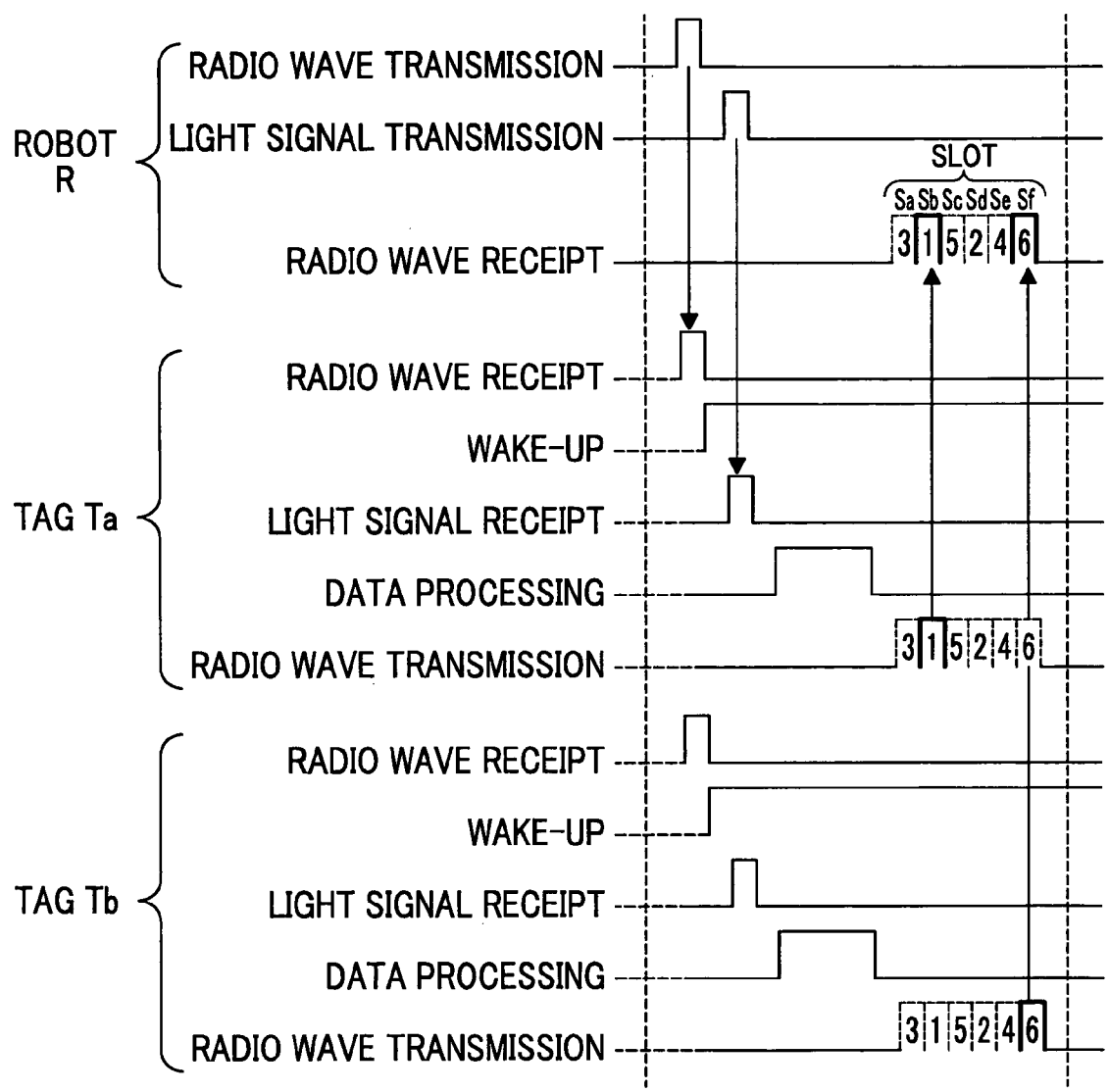
FIG. 25 is an explanatory view showing the slot, which is used when the receipt signal is transmitted from each tag of FIG. 24.

In this embodiment, as shown in FIG. 25, a plurality of slots (Sa-Sf), which are used when the receipt signal is transmitted, are established for allowing time-sharing.

Slots (Sa-Sf) are respectively correlated with emitter IDs, which are the unique identification number for identifying the light emitter (LED1-LED6) of the light emission unit 100 of the robot R. A table (timing table)which indicates the correlation of them is stored in the storage 170 of the tag T4 (see FIG. 23).

Figure 26:
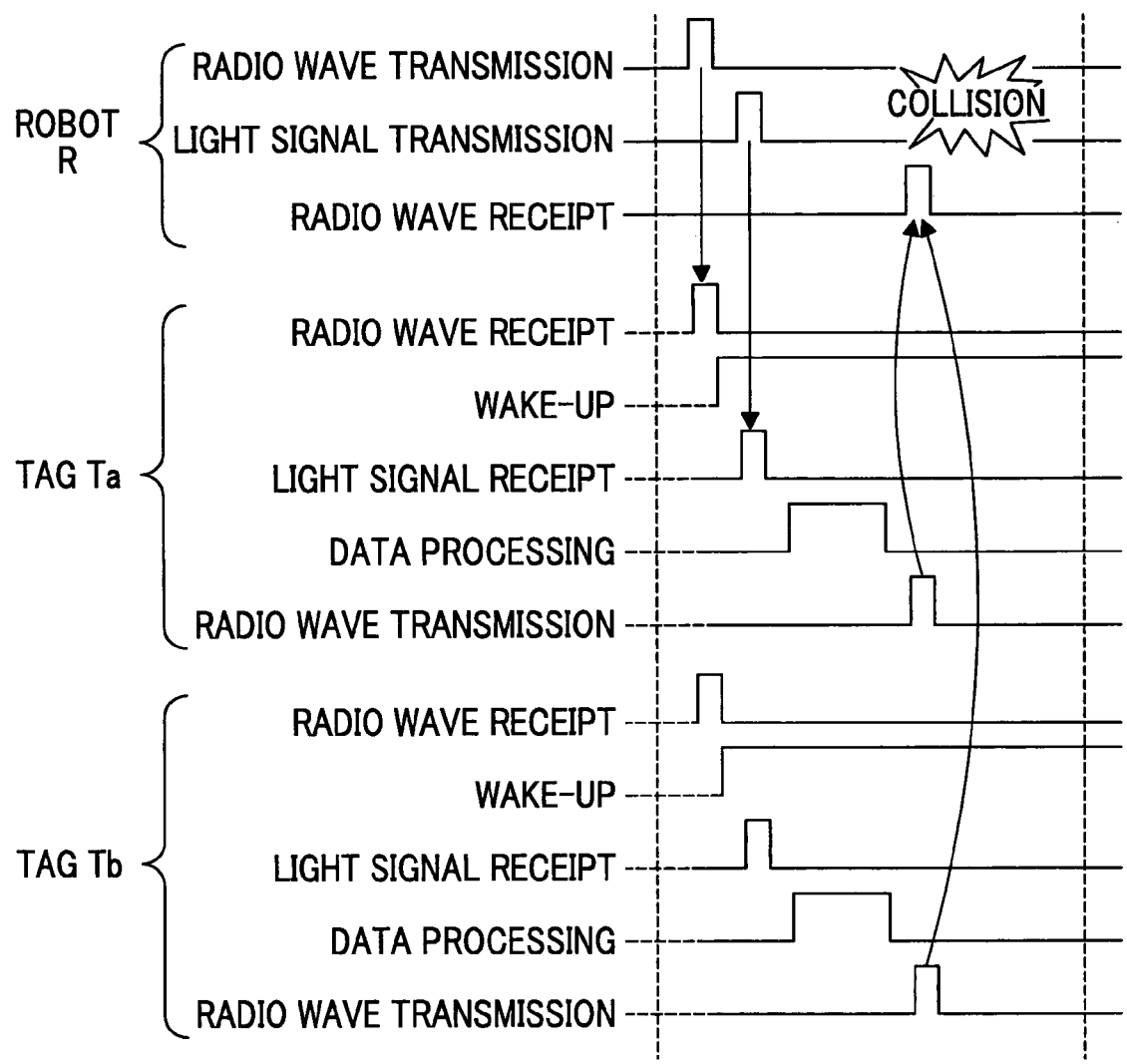
FIG. 26 is an explanatory view of the occurrence of the collision of the receipt signal in the case that the slot to be used for the transmission of the receipt signal is not specifically determined.

In this embodiment, L1, L2, L3, L4, L5, and L6 are used as the emitter ID for identifying the light emitter. In the case of FIG. 25, L1, L2, L3, L4, L5, and L6 are simply shown by symbol 1, 2, 3, 4, 5, and 6, respectively. This simple transcription of emitter ID is also used in FIG. 26, FIG. 29, and FIG. 30.

As described above, the receipt signal generated in the tag T4 includes the emitter ID. Here, emitter ID is an unique identification number for identifying the light emitter of the robot R that has irradiated an infrared light signal received by the light receiver 150 of the tag T4.

Thus, the slot selector 144 of the tag Ta refers to the timing table based on the emitter ID, and obtains information (slot information) with regard to the slot being allocated to the emitter ID.

Then, the slot selector 144 transmits the modulated signal through the antenna 141 at the timing indicated in the slot information.

Here, the term "timing" denotes the start point (start time of the transmission) of the signal to be transmitted through the slot.

Here, the explanation of this embodiment will be made with reference to FIG. 24 under the assumption that slots Sa, Sb, Sc, Sd, Se, and Sf are respectively correlated with emitter IDs L1, L2, L3, L4, L5, and L6, and that the emitter ID included in the receipt signal is L1.

The slot selector 144 refers to the timing table of the storage 170 based on the emitter ID (emitter ID=L1), and acquires the slot information indicating which slot is assigned to the emitter ID whose emitter ID is L1.

In this embodiment, since the slot Sb is assigned to the emitter ID whose emitter ID is L1, the slot selector 144 obtains the slot information indicating that the slot to be used is slot Sb. Then, the slot selector 144 transmits the modulated signal (receipt signal) at the timing being assigned to the slot Sb.

In this embodiment, slots (Sa-Sf) are respectively correlated with the emitter IDs (L1-L6) which are the unique identification number for identifying the light emitters (LED1-LED6). Here, light emitter is prepared for each search region (from first region to sixth region) which are established around the robot R.

Therefore, each slot (Sa-Sf) and each search region (from first region to sixth region) establishes one-on-one relationship.

In this embodiment, the slot differs from region to region, and the search signal generated by the tag Ta and the search signal generated by the tag Tb are respectively transmitted using the slot Sb and the slot Sf. Therefore, the occurrence of the collision of the receipt signals can be prevented, and thus the loss of the data due to the collision of the receipt signal can be prevented, even if the target object Da having the tag Ta is in the first region and the target object Db having the tag Tb is in the second region.

Figure 27:
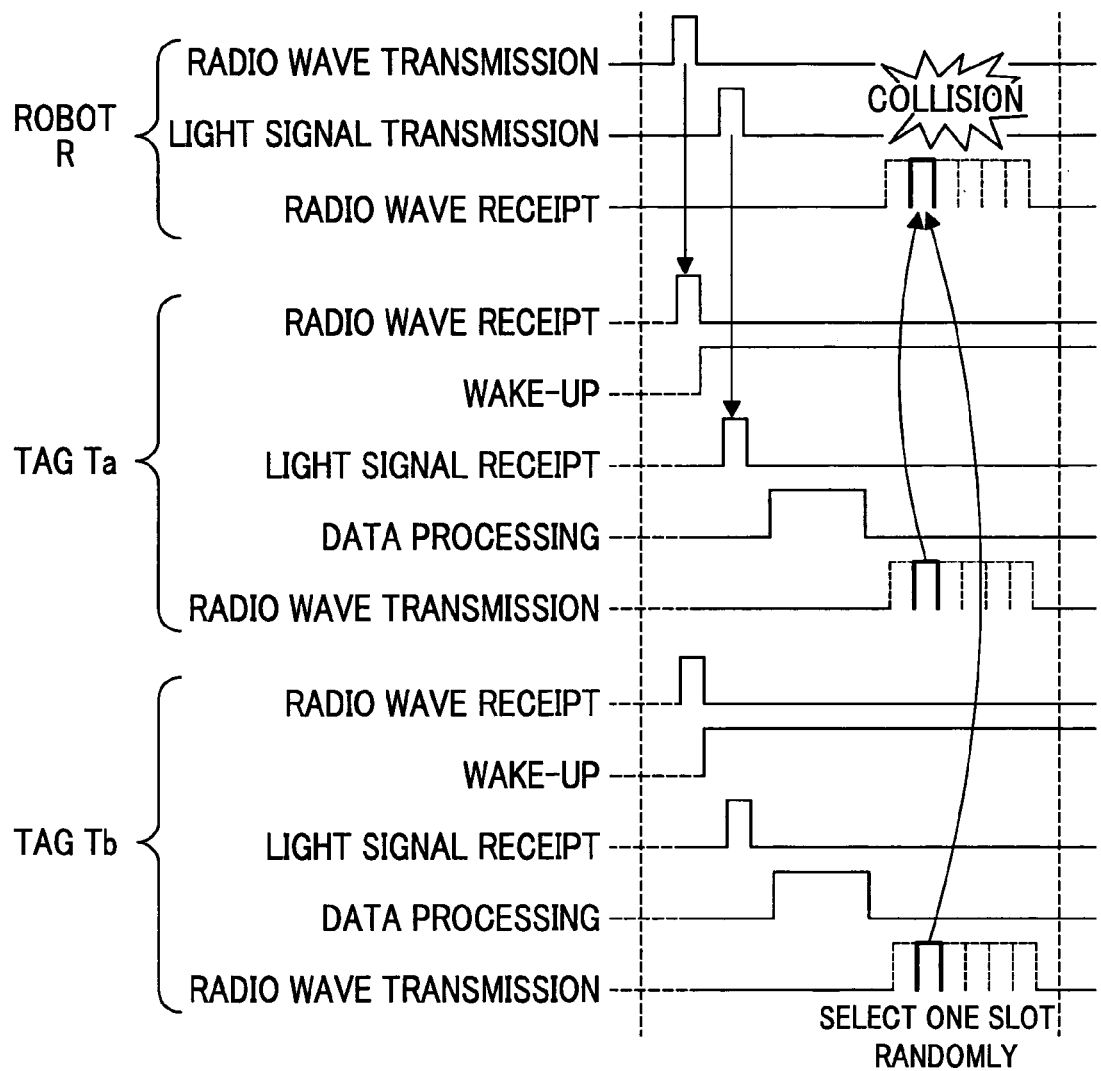
FIG. 27 is an explanatory view of the occurrence of the collision of the receipt signal in the case that the slot to be used for the transmission of the receipt signal is determined under a whole area method.

On the contrary, the overlap of the slot, which is used for transmitting by wireless the receipt signal from tags Ta and Tb, may occur, if the slot to be used at the time of the transmission of the receipt signal is not determined (see FIG. 26) or if the slot is selected randomly from among a plurality of slots which are established beforehand and transmits the modulated signal using the selected slot (see FIG. 27). Here, the latter method is called as "WHOLE AREA METHOD".

In this case, a probability of the occurrence of the collision between the receipt signals from the tags Ta and tb may increase.

As described above, in the present embodiment, each tag Ta and Tb transmits the receipt signal by wireless at the timing assigned to the slot which is selected based on the emitter ID included in the direction check signal, when the direction check signal is received by the tags Ta and Tb. Thereby the occurrence of the collision of the receipt signal is prevented.

In other words, the collision of the receipt signal is prevented by transmitting the receipt signal at the timing which is assigned to the region where the tags Ta and Tb are in.

This transmission method is so called as "AREA SEGMENTATION METHOD". Here, the difference in the collision rate of the receipt signal between the area segmentation method and the hole area method is shown in FIG. 28.

Figure 28:
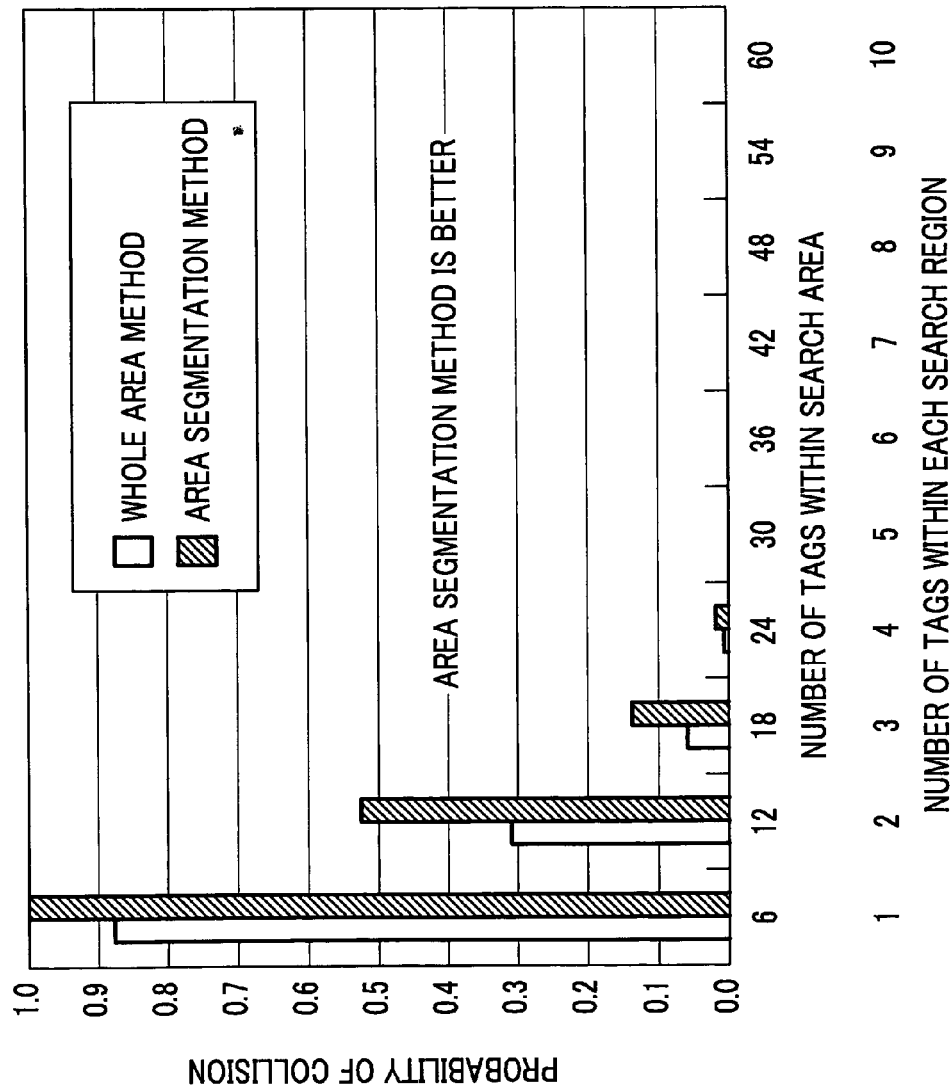
FIG. 28 is a graph for comparing the probability of the occurrence of the collision of the receipt signal between the whole area method and area segmentation method.

FIG. 28 is a graph for comparing the probability of the occurrence of the collision of the receipt signal between the whole area method and area segmentation method. The first line in the label of the lateral axis denotes the total number of tags within search area, and the second line in the label of the lateral axis denotes the total number of tags within each search region (from first region to sixth region).

Here, the search area is the area where the robot R can detect the presence of the tag. In this embodiment, the range from first area to third area corresponds to the search area.

The vertical axis of this graph denotes probability of the prevention of the collision of the receipt signal. Therefore, in this graph, the collision does not occur with ease as the probability approaches to 1.0, and the collision occurs with ease as the probability approaches to 0.0.

As can be seen from FIG. 28, the probability of the occurrence of the collision increases as increasing the total numbers of the tag within the search area. But, in the case of the area segmentation method, the probability of the occurrence of the collision is smaller than the case of the whole area method.

(Signal Processing in Tag T4)

Next, the signal processing to be performed in tag T4 which serves as the target object D will be made with reference to the block diagram of FIG. 23 and the flow chart of FIG. 29.

When radio wave (modulated signal) transferred from the robot R has been received through the antenna 141 (Step S500, Yes), the demodulator 142 of the radio transceiver 140 demodulates the modulated signal to obtain the encrypted search signal. Then, the demodulator 142 outputs the encrypted search signal to the receipt signal generator 160.

The decoder unit 161 of the receipt signal generator 160 decodes the encrypted search signal entered from the radio transceiver 140 to obtain the search signal. Then, the decoder unit 161 outputs the search signal to the processor unit 162.

The processor unit 162 of the receipt signal generator 160 changes the condition of the light receiver 150 from a standby condition to an activated condition in response to the receipt request signal included in the search signal (Step S501).

When the optical receiver 151 of the light receiver 150 receives the infrared light signal irradiated from the robot R within a predetermined time after activating the light receiver 150 (Step S502, Yes), the light demodulator 152 of the light receiver 150 demodulates the infrared light signal to obtain the encrypted direction check signal. Then, the light demodulator 152 outputs the encrypted direction check signal to the receipt signal generator 160.

Thus, the decoder unit 161 of the receipt signal generator 160, to obtain the direction check signal, decodes the encrypted direction check signal and outputs the direction check signal to the processor unit 162.

The processor unit 162 of the receipt signal generator 160 compares the robot ID of the direction check signal with the robot ID of the search signal.

If both robot IDs agree each other (Step S503, Yes), the processor unit 162 generates the receipt signal. Prior to the generation of the receipt signal, the processor unit 162 refers to the storage 170 and obtains an unique identification number (tag ID) assigned to the tag T4.

Then, the processor unit 162 generates the receipt signal which includes the tag ID, the robot ID included in the search signal, and the emitter ID included in the direction check signal, and the processor unit 162 outputs the generated receipt signal to the encryption unit 163 (Step S504).

Here, the processor unit 162 generates the receipt signal which further includes the emission request signal therein (Step S505), if the direction check signal is not entered within a predetermined time after activating the light receiver 150 (Step S502, No) or if the robot ID of the direction check signal disagrees with the robot ID of the search signal (Step S503, No). Then, the processor unit 162 outputs the generated receipt signal to the encryption unit 163.

In this occasion, the processor unit 162 outputs the emitter ID, which is the same as the emitter ID being included in the receipt signal, to the slot selector 144, when the processor unit 162 outputs the receipt signal, which is generated in step S504 or step S505, to the encryption unit 163.

The modulator 143 of the radio transceiver 140, to obtain the modulated signal, modulates the encrypted receipt signal entered from the encryption unit 163, and then outputs the modulated signal to the slot selector 144.

The slot selector 144 refers to the timing table based on the emitter ID, and obtains information (slot information) with regard to the slot being assigned to the emitter ID.

Then, the slot selector 144 determines the slot which is assigned by the slot information as the slot to be used at the time of the transmission of the modulated signal (step S506). Thus, the slot selector 144 transmits the modulated signal entered from the modulator 143 using the determined slot at the timing indicated in the slot information (step S507).

[Target Detection Unit 200]

The other embodiment of the target detection unit of the target object detection system A will be explained with reference to FIG. 30.

The target detection unit 200 of this embodiment has the same construction of the target detection unit 70 except the construction of the data processor 81.

Therefore, in the following explanations, the same reference number is used for indicating the same component as the target detection unit 70, and the explanation of the target detection unit 200 will be made for the data processor 81 mainly, and that of the other part of the target detection unit 200 will be made, as appropriate.

The data processor 81 further includes a tag counter 81c and a slot number adjustor 81d in addition to the signal generator 81a and the position computing part 81b.

The tag counter 81c and the slot number adjustor 81d is provided in order to adjust the number of the slot to be used for the transmission of the modulated signal so that the collision of modulated signals from each tag can be prevented, when a plurality of target objects D having the tag are within the surrounding area of the robot R.

Figure 31A:
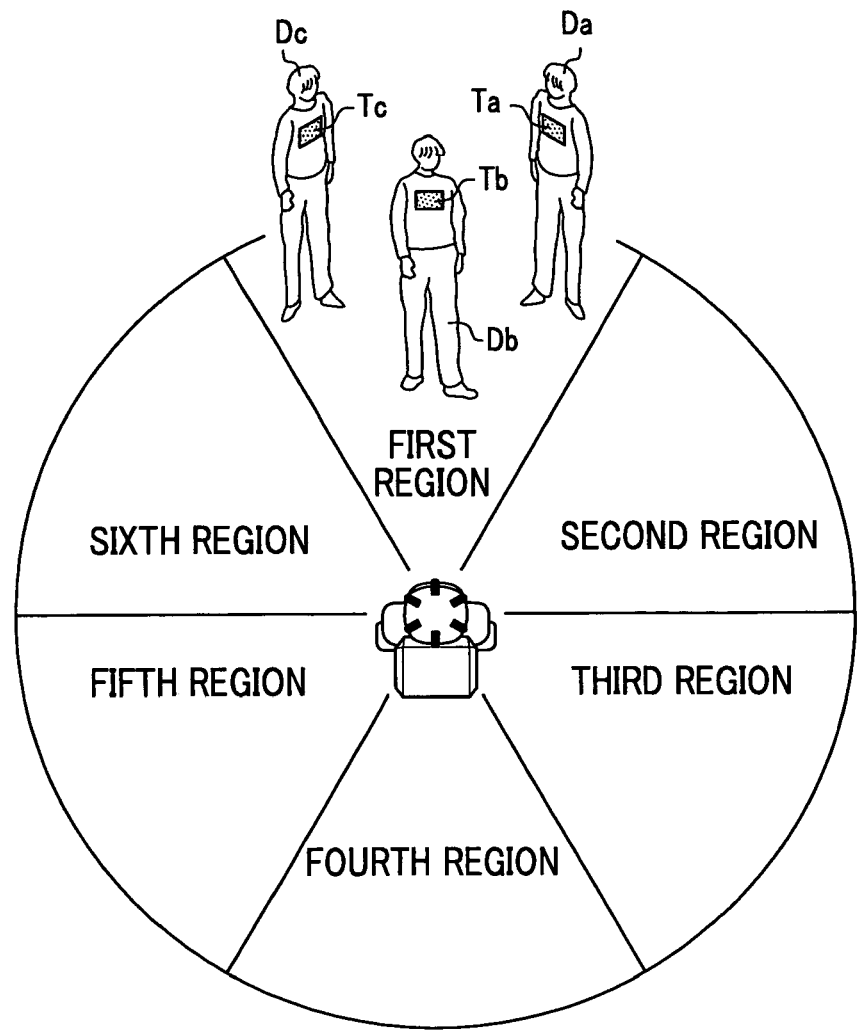
FIG. 31A is an explanatory view showing the case where a plurality of target objects is within the specific search region established around the robot R.

To be more specific, as shown in FIG. 31A, the probability of the occurrence of the collision of the receipt signal to be transferred from each tag may increase, when a plurality of tags exist in the same search region, e.g. first region.

Therefore, the target detection unit 200 is equipped with the tag counter 81c and the slot number adjustor 81d for increasing or decreasing the number of the slot to be assigned to each search area (from first region to sixth region). This is because if the number of the slot to be assigned to each search area is adjustable the probability of the occurrence of the collision of the receipt signal can be decreased even if a plurality of tags are within the same search region.

(Tag Counter 81C)

The tag counter 81c counts the number of tags for each search region based on the emitter ID included in the receipt signal, when a plurality of receipt signal are entered to the data processor 81 from the decoder 84.

In this embodiment, the emitter ID of light emitters LED1, LED2, LED3, LED4, LED5, and LED6 is L1, L2, L3, L4, L5, and L6, respectively.

Therefore, the tag counter 81*c* counts the numbers of the receipt signal including the emitter ID whose emitter ID is "L1". The same processing is performed for the remainder of emitter IDs.

Then, the tag counter 81*c* generates the information (tag number information), which indicates how many receipt signals are included in each emitter ID, and outputs the tag number information to the slot number adjustor 81*d*.

In the case of FIG. 31A, for example, three target objects (Da-Dc) equipped with the tag are in the first region and no target object is in the other regions. Thus, a total of three receipt signals are entered to the tag counter 81*c*.

Therefore, the tag counter 81*c* generates the tag number information which indicates that three receipt signals are in the emitter ID whose emitter ID is "L1" and no receipt signal is in the emitter ID whose emitter ID is L2, L3, L4, L5, and L6.

(Slot Number Adjustor 81*d*)

The slot number adjustor 81*d* adjusts the number of the slot to be assigned to each light emitter based on the tag number information entered from the tag counter 81*c*.

The slot number adjustor 81*d* refers to the timing table in the recording unit 110 when the tag number information is entered from the tag counter 81*c*, and obtains the information (slot assignment information) which indicates how many slots are assigned to each emitter ID.

The slot number adjustor 81*d* obtains a number N of the slot to be assigned to each emitter ID from the slot assignment information, and obtains a number M of the receipt signal existing in each emitter ID from tag number information. Then, the slot number adjustor 81*d* compares the number M with the number N for each emitter ID.

To be more precise, the slot number adjustor 81*d* checks whether or not the formula (3) is satisfied.

$$M \geq (N/2) \quad (3)$$

The slot number adjustor 81*d* increases the number N of slot being assigned to the emitter ID which satisfies the formula (1). Then, the slot number adjustor 81*d* decreases the number N of slot being assigned to the emitter ID which do not satisfy the formula (1) by the same number as the increased number of the slot.

In this embodiment, the increased number of the slot is the same as the decreased number of the slot, and total number of the slot is maintained.

When increasing the number of the slot, it is preferable that a group of slots to be assigned to the specific light emitter is composed of a plurality of slots which are the time-consecutive slots.

Here, the number and procedure of increasing/decreasing of the slot is not limited to the above described embodiment. For example, following manner can be adoptable: (1) the number of the slot increases or decreases two at a time; (2) the number of increasing is larger than the number of decreasing.

Here, the adjustment of the number of the slot will be explained with reference to the case of FIG. 31A.

Figure 31B:
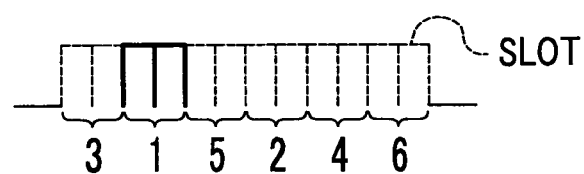
FIG. 31B is an explanatory view showing the slots which are assigned to each search area (emitter ID).
Figure 32:
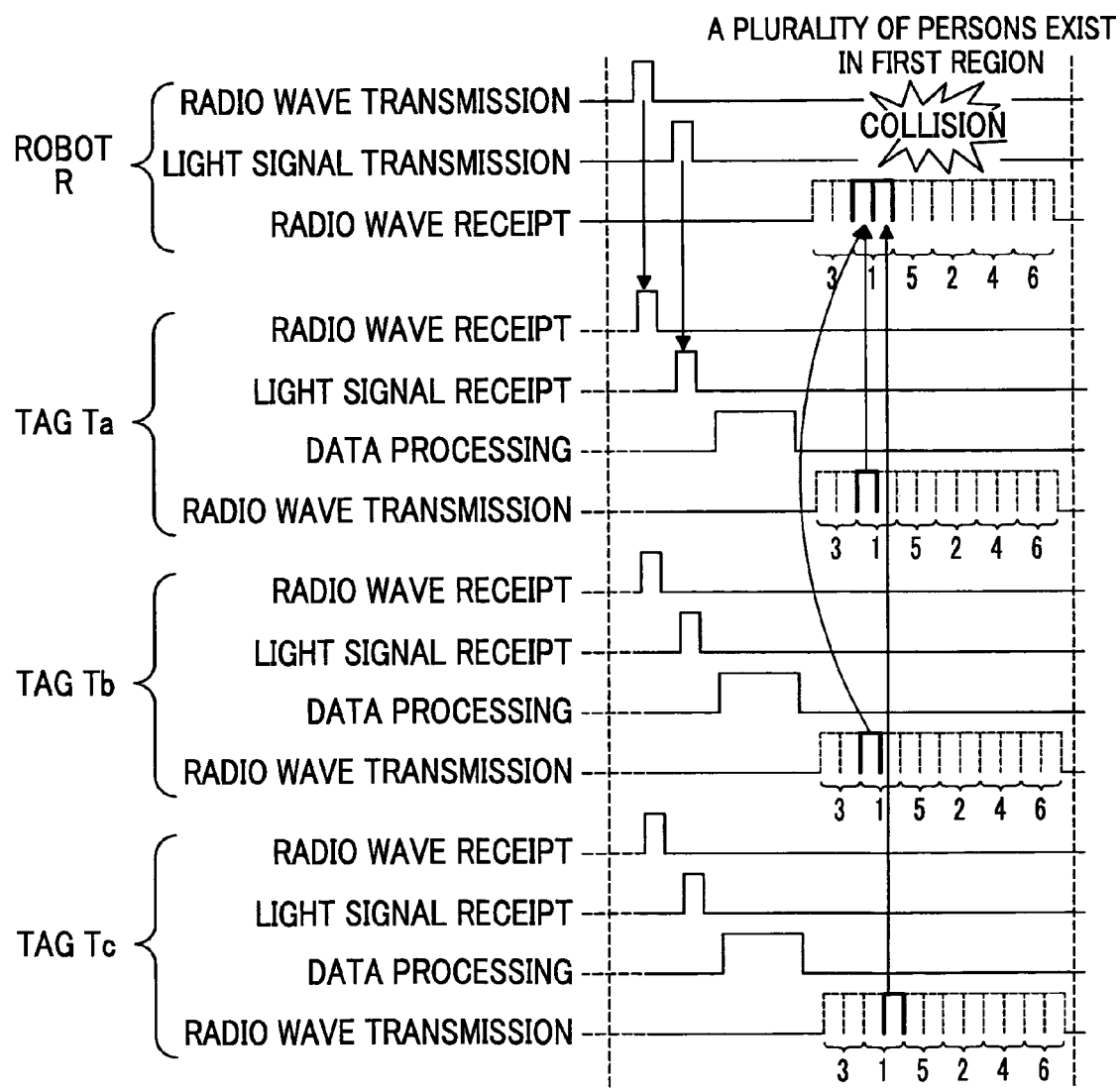
FIG. 32 is an explanatory view of the occurrence of the collision of the receipt signal at the time when each tag in FIG. 31A transmits the receipt signal by wireless.

FIG. 31A is an explanatory view showing the case where a plurality of target objects are within the specific search area established around the robot R. FIG. 31B is an explanatory view for explaining the slot being assigned to each search area (emitter ID). FIG. 32 is an explanatory view for explaining the collision of the receipt signal that may arise in the case of FIG. 31A.

Here, in FIG. 31B and FIG. 32, the emitter IDs (L1, L2, L3, L4, L5, and L6) of identifying each light emitter are simply indicated as symbols (1, 2, 3, 4, 5, and 6), respectively.

As shown FIG. 31A, a total of three tags (Ta, Tb, and Tc) are within the first region, and the tag which satisfies the formula (1) is emitter ID whose ID is "L1". Therefore, the slot number adjustor 81*d* increase the number of the slot to be assigned to the emitter ID whose ID is "L1".

Referring to FIG. 31B, two slots are assigned to each emitter ID, and the slots, which are assigned to the emitter ID whose ID is "L3" or "L5", are assigned to the emitter ID adjoining to the emitter ID whose ID is "L1".

Here, one slot is decreased from the number of the slot assigned to the emitter ID whose ID is "L3" and "L5", respectively, if it is assumed that two slots are added to the slot assigned to the emitter ID whose ID is "L1". Thereby, two slots are added to the emitter ID whose ID is "L1".

Here, since the relation between slot and each emitter ID is changed by adjusting the number of the slot to be assigned to the emitter ID, the slot number adjustor 81*d* updates slot assignment information which indicates the relation between each emitter ID and slots. Thereby, the timing table in the recording unit 110 is also updated based on the slot assignment information.

The slot number adjustor 81*d* generates the signal (slot change signal) which commands the tag to update the timing table stored in the storage of the tag to the newly generated timing table. Then, the slot number adjustor 81*d* outputs the slot change signal to the signal generator 81*a*.

(Signal generator 81*a*)

The signal generator 81*a* generates the search signal and the direction check signal at a predetermined cycle.

The signal generator 81*a* generates the direction check signal which includes a slot change signal in addition to the emitter ID when the direction check signal is generated, if the slot change signal is entered from the slot number adjustor.

Thereby, the direction check signal including the slot change signal is irradiated as an infrared light signal from the light emitter of the light emission unit 100.

Referring to FIG. 23, when the direction check signal including the slot change signal is received by the light receiver 150 of the tag T4, the slot change signal is obtained after the predetermined processing of the signal and is supplied to the processor unit 162 of the tag T4. Thus, the processor unit 162, in response to the slot change signal, updates the timing table stored in the storage 170 to the new one.

Thereby, the slot selector 144 of the tag T4 transmits the modulated signal by wireless using the slot assigned by the newly updated timing table.

Figure 33:
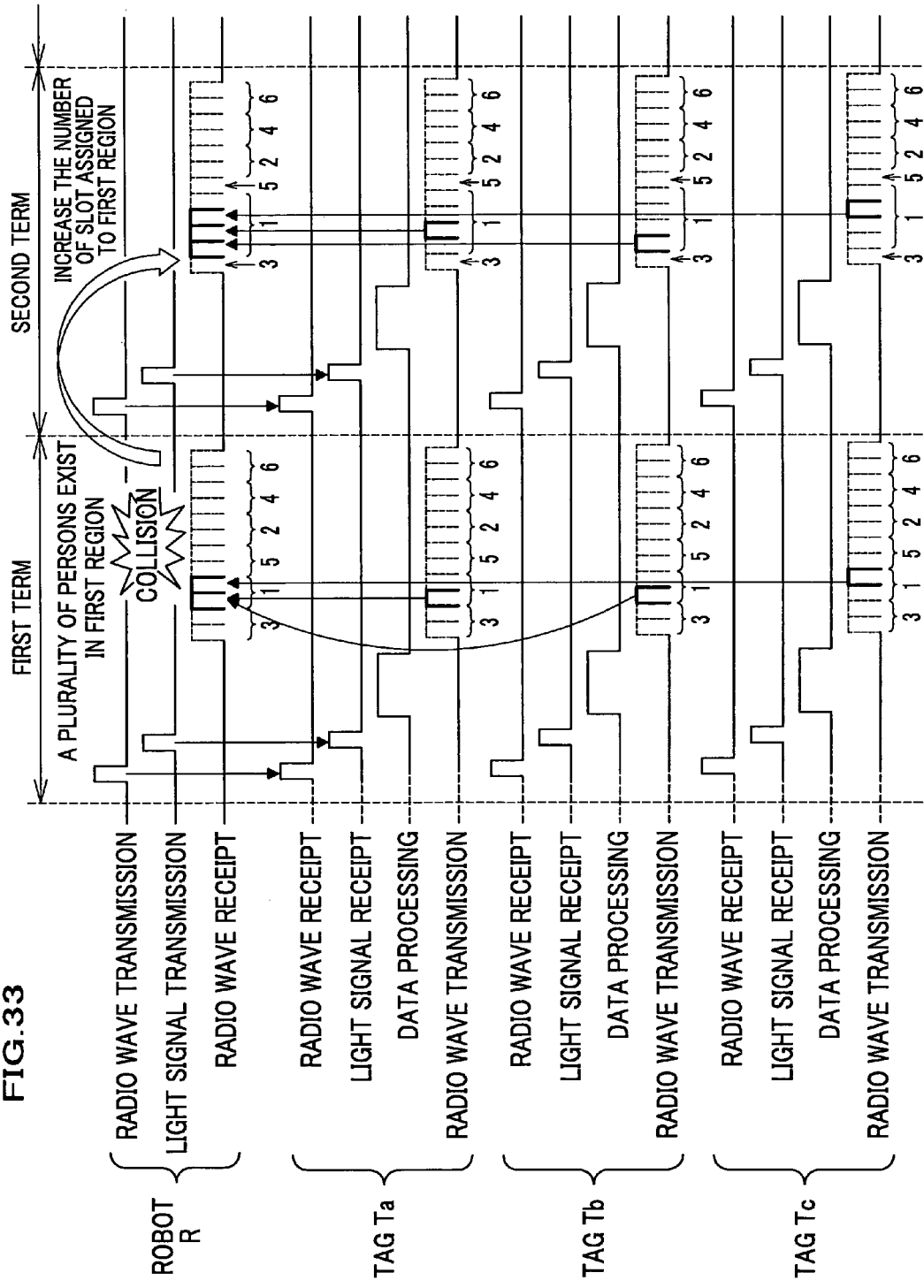
FIG. 33 is an explanatory view showing the adjustment of the slot performed by the slot number adjustor 81*d*.

As shown in FIG. 33, in this embodiment, the robot R repeats the transmission of radio wave and light signal at a predetermined interval (term).

In this embodiment, the number of the slot to be assigned to the first region is increased by the above described processing (see first term), if a plurality of tags are within the first region and the collision of the receipt signal transmitted from each tags (Ta, Tb, Tc) has arisen. Thus, the probability of the collision of the receipt signal from each tag (Ta, Tb, Tc) can be decreased in the next term (see second term).

(Signal Processing in the Target Detection Unit and Tag T4)

Next, the signal processing in the target detection unit 200 of the robot R and the signal processing in the tag T4 which has received the direction check signal generated in the target detection unit 200 will be explained with reference to FIGS. 34 to 36.

Here, the signal processing in the target detection unit 200 is almost the same as that of the above described target detection unit 70. Therefore, in the present embodiment, the explanation which is the same as those have been made in FIG. 10 will be given briefly.

Figure 34:
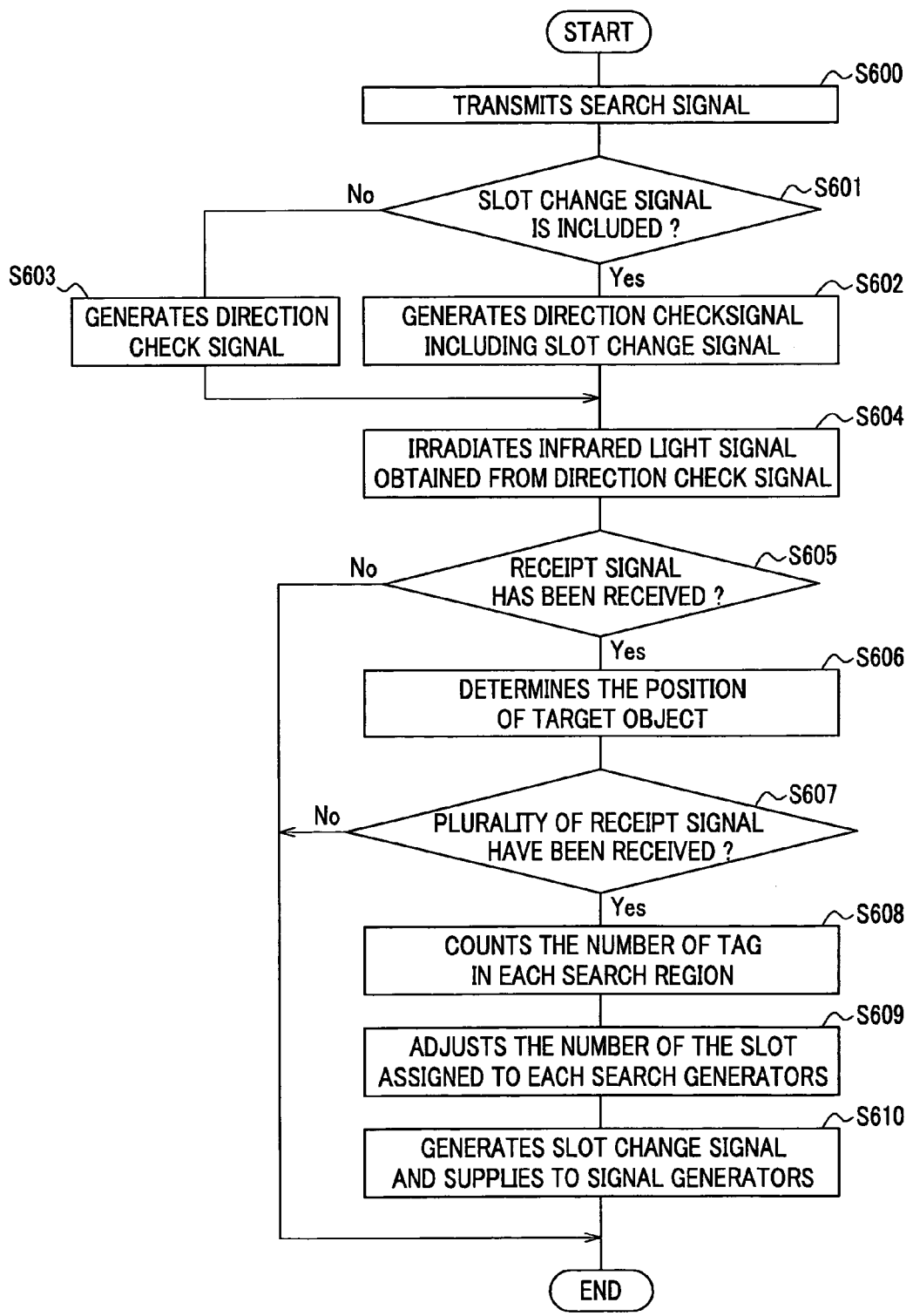
FIG. 34 is a flow chart showing the signal processing of the target detection unit 70 of the robot R.

As shown in FIG. 30 and FIG. 34, the signal generator 81*a* of the unit controller 80 generates the search signal at a predetermined time interval. The generated search signal is transmitted from the radio transmitter-receiver 90 by wireless after the predetermined processing in the unit controller 80 (Step S600).

Next, the signal generator 81*a* generates the direction check signal. In this occasion, the signal generator 81*a* generates the direction check signal including the slot change signal (Step S602), if the slot change signal has been entered from the slot number adjustor 81*d* (Step S601, Yes). On the contrary, the signal generator 81*a* generates the direction check signal without including the slot change signal (Step S603), if the slot change signal has not been entered from the slot number adjustor 81*d* (Step S601, No).

Then, the generated direction check signal is irradiated from each light emitter of the light emission unit 100 after the predetermined processing in the unit controller 80 (Step S604).

The tag T4 generates the receipt signal when the search signal (modulated signal) from the radio transmitter-receiver 90 and the infrared light signal (direction check signal) from the light emission unit 100 have been received. Then, the tag T4 generates the modulated signal by the predetermined processing of the receipt signal and transmits it by wireless.

The receipt signal obtained by the predetermined processing of the modulated signal is entered to the data processor 81 of the unit controller 80, when the modulated signal transmitted from the tag T4 is received by the radio transmitter-receiver 90 (Step S605, Yes).

The position computing part 81*b* of the data processor 81 determines the position of the tag T4 which has transmitted the receipt signal (Step S606).

Then, the tag counter 81*c* of the data processor 81*b* counts the number of the receipt signal for each emitter ID based on the emitter ID included in the receipt signal (Step S608), if a plurality of receipt signals are entered to the data processor 81 (Step S607, Yes).

The slot number adjustor 81*d* of the data processor 81 adjusts the number of the tag being assigned to each search region based on the number of the tags in each search region (from first area to sixth area)(Step S609).

Then, the slot number adjustor 81*d* generates the signal (slot change signal) which commands the tag T4 to update the timing table stored in the storage 170 of the tag to the newly generated timing table including the result of the processing in Step S609. Then, the slot number adjustor 81*d* outputs the slot change signal to the signal generator 81*a* (Step S610). Thereby, the slot change signal will be included in the next direction check signal to be generated in the signal generator 81*a*.

Next, the signal processing in the tag T4 that is performed when the tag T4 has received the direction check signal from the target detection unit 200 will be made with reference to FIG. 23 and FIG. 35.

Figure 29:
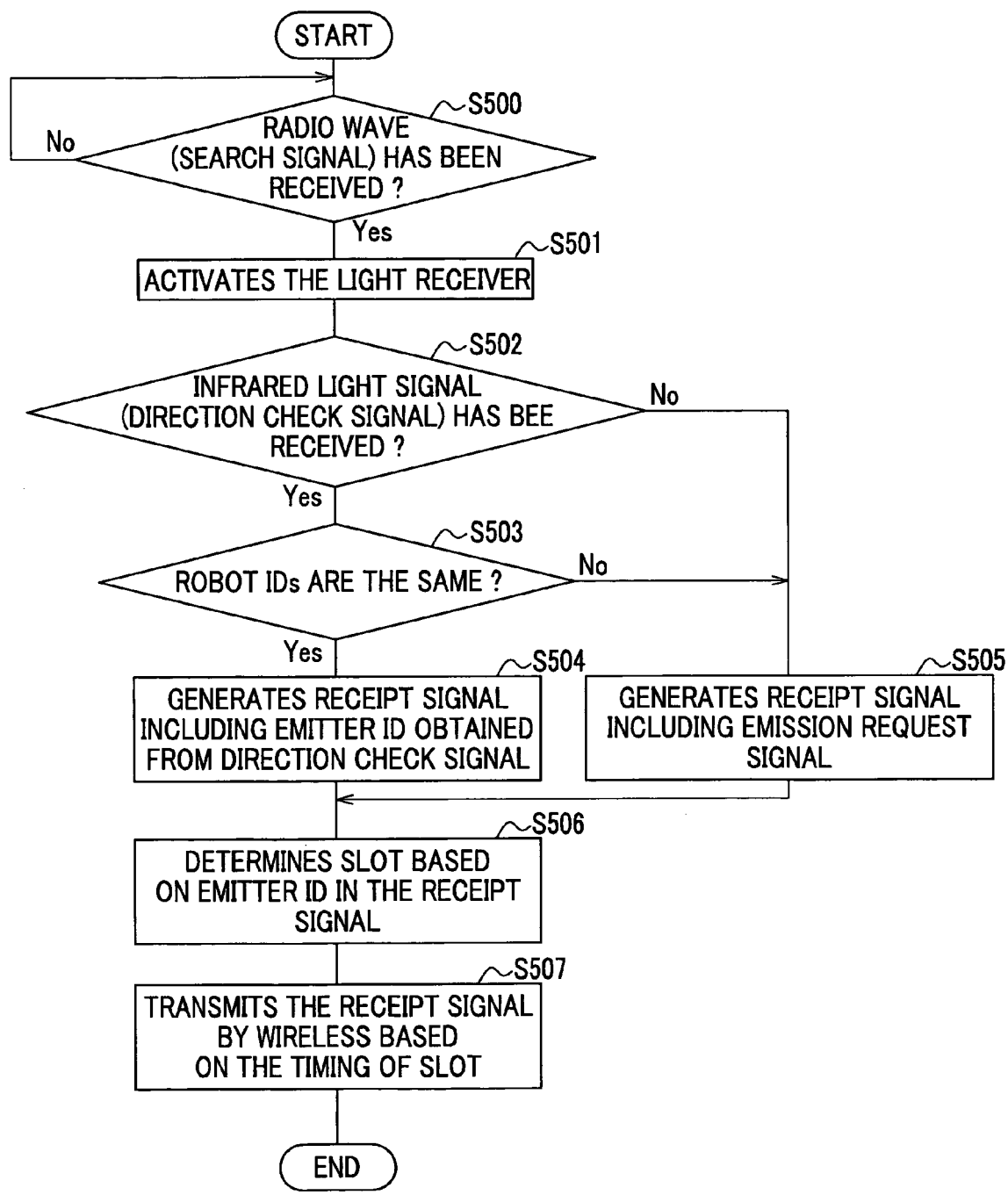
FIG. 29 is a flow chart for explaining the signal processing of the tag T4.

In this embodiment, the signal processing of the tag T4 is almost the same as the signal processing explained using FIG. 29. Therefore, the explanation which is the same as those have been made in FIG. 29 will be given briefly.

Figure 35:
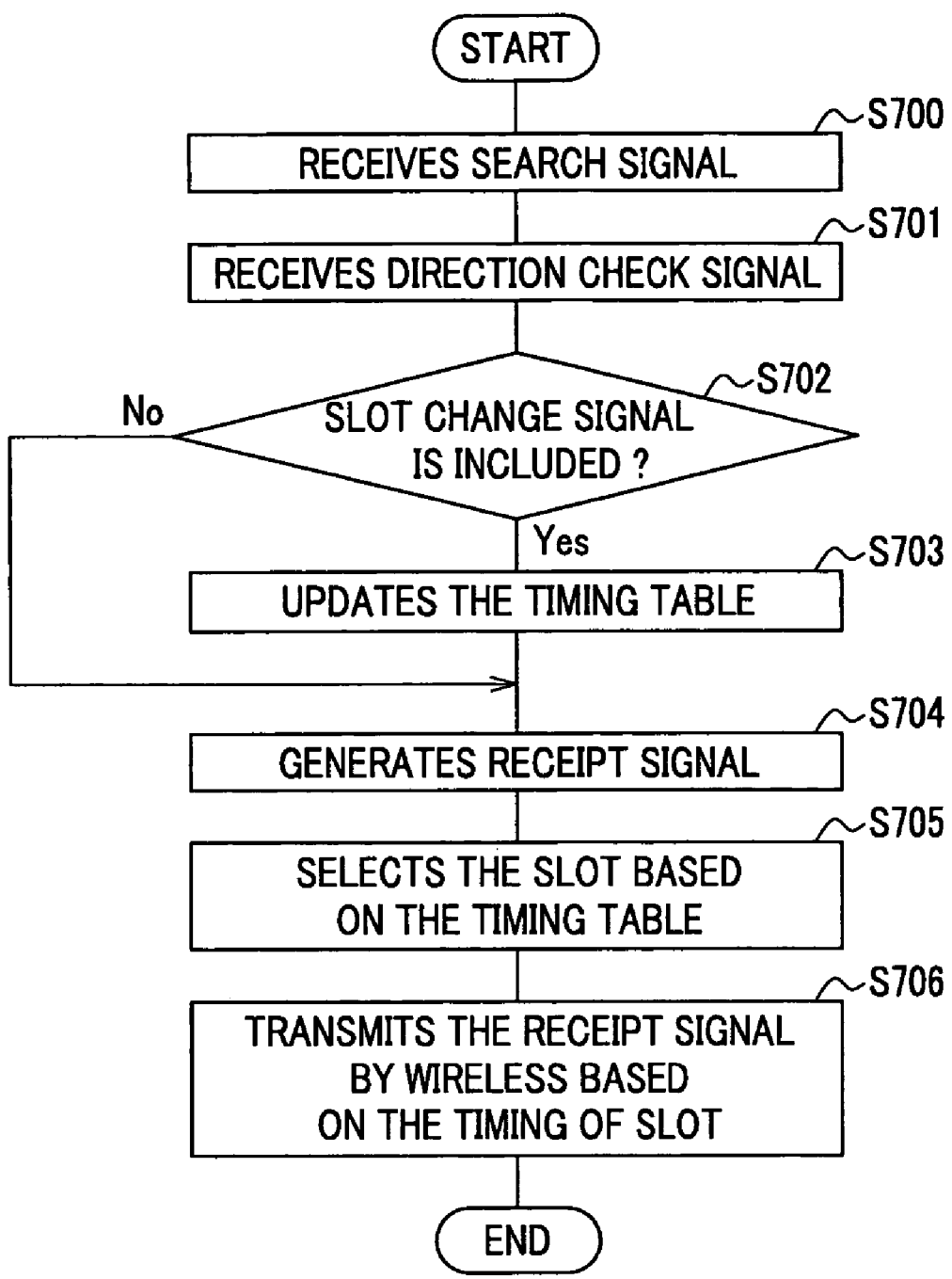
FIG. 35 is a flow chart showing the signal processing of the tag T4 based on the direction check signal generated in the target detection unit 200 of the robot R.

Referring to FIG. 35, the search signal transmitted from the robot R is received by the tag T4 (Step S700), and the infrared light signal (direction check signal) irradiated from the robot R is received by the tag T4 (Step S701).

The data processor 162 of the tag T4 updates the timing table stored in the storage 170 based on the slot change signal (Step S703), when the slot change signal is included in the direction check signal (Step S702, Yes).

The data processor 162 generates the receipt signal based on the above described procedures (Step S704), and outputs the receipt signal to the radio transceiver 140 after the predetermined processing of the receipt signal. In this occasion, the data processor 162 outputs the emitter ID which is the same emitter ID included in the receipt signal to the radio transceiver 140.

The slot selector 144 of the radio transceiver 140 refers to the timing table in the storage 170 based on the emitter ID entered from the processor unit 162 of the receipt signal generator 160, and selects the slot to be used for the transmission of the receipt signal (Step S705).

Then, the slot selector 144 transmits the receipt signal at the timing of the slot which has been selected (Step S706).

Here, since the timing table is suitably updated based on the number of the tag within the surrounding area of the robot R, the probability of the occurrence of the collision of the receipt signal to be transferred from each tag within the surrounding area can be decreased.

(The Processing in the Target Object Detection System A)

Next, the processing in the target object detection system A, which is adopted to the detection of the visitor of the office, will be explained with reference to the block diagrams of FIGS. 1, 23, and 30, the flow chart of FIG. 36.

Referring to FIG. 1, a visitor of the office, for example, receives the tag T4 at the reception desk, and information, e.g. a name of the visitor and a name of the section to be visited, is inputted by the terminal 5 disposed on the reception desk (Step S800).

Thus, information entered from the terminal 5 is stored in the recording unit (not shown) of the management computer 3 which connects with the terminal 5 through the network 4 (Step S801).

Then, the visitor attached the tag T4 at the reception desk and begins to travel to the destination section.

Here, the following explanation will be made under the assumption that the number of the visitor is three.

Figure 36:
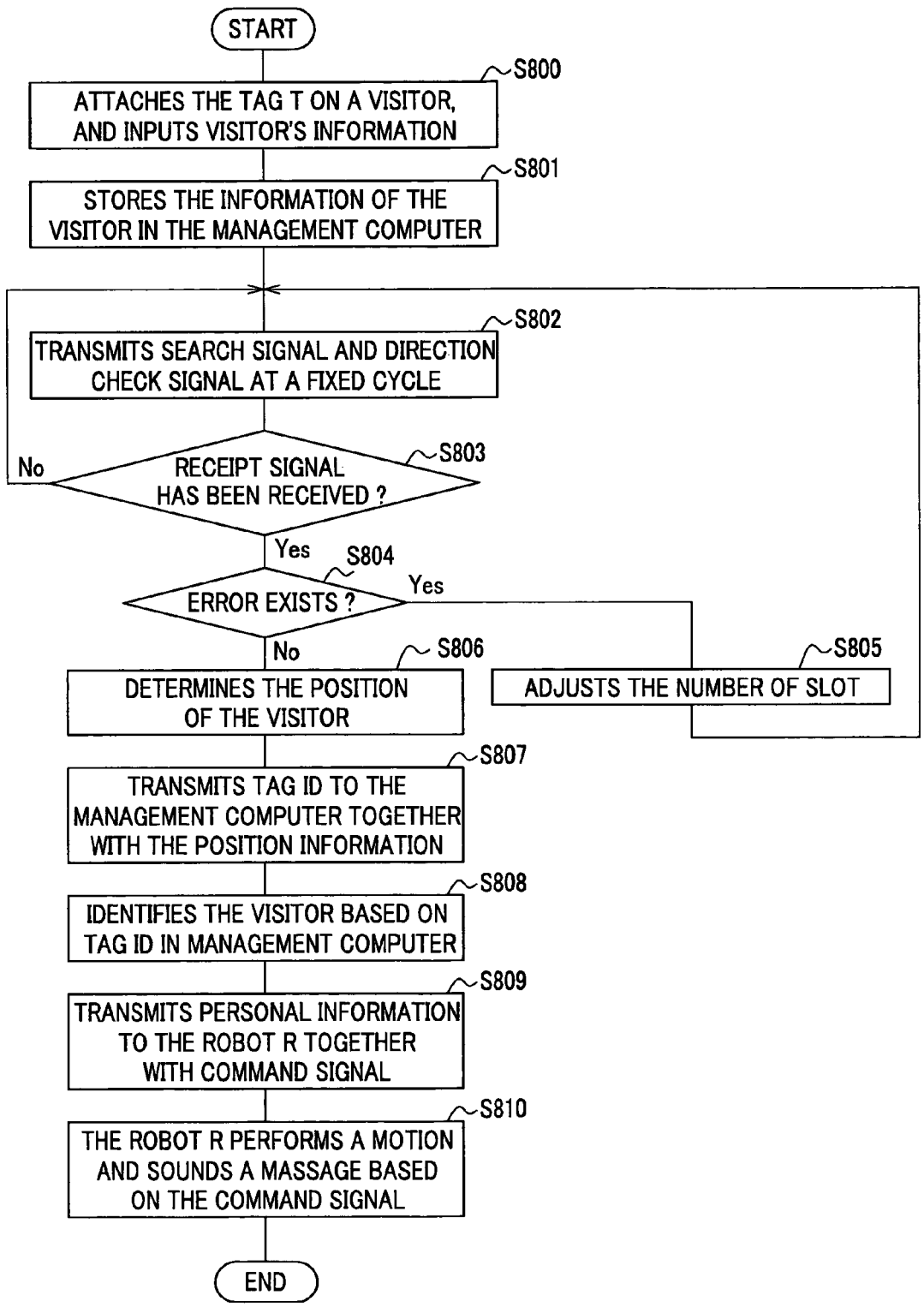
FIG. 36 is a flow chart for explaining the signal processing in the target object detection system, which is adapted to the detection of the visitor of the office.

Referring to FIG. 30 and FIG. 36, the target detection unit 200 of the robot R repeats the generation and transmission of the search signal and the direction check signal at a predetermined cycle (Step S802). The generation and transmission of the search signal and direction check signal is repeated till the receipt signal is received, if the receipt signal from the tag T4 attached to the visitor is not received (Step S803, No).

The tag counter 81*c* of the robot R counts the number of the receipt signal in order to determine the number of the visitor after the predetermined processing, if the receipt signal from the tag T4 attached to the visitor is entered (Step S803, Yes).

Then, the computed number of the visitor is compared with the number of the visitor entered at the reception desk, with reference to the management computer 3.

The slot number adjustor 81*d* adjusts the number of the slot being assigned to each emitter ID (Step S805), if the computed number of the visitor is smaller than the number of the visitor entered at the reception desk (Step S804, Yes). This is because the occurrence of an error in the receipt can be expected. Thereby, the probability of the occurrence of the collision at the time of next transmission of the receipt signal from the tag T can be reduced.

On the contrary, the position computing part 81*b* determines the position of the tag T4 which has transmitted the receipt signal by wireless (Step S806), if the computed number of the visitor agrees with the number of the visitor entered at the reception desk (Step S804, No). Then, the unit controller 80 of the target detection unit 200 outputs the tag ID, which was obtained from the receipt signal, to the controller 40 of the robot R.

The controller 40 of the robot R transmits the tag ID to the management computer 3 (Step S807). Thereby, the management computer 3 refers to the recording unit (not shown) based on the tag ID in order to perform the identification of the target object D having the tag T4 whose tag ID is the same as the tag ID transferred from the robot R. Thus, the identification of the target object (person) D is performed (Step S808).

Then, the information (personal information) with regard to the identified target object (person) is transferred to the robot R together with the command signal to be required for actuating the robot R (Step S809).

Thus, the robot R performs the motion (travel) and sounds the voice message, based on the command signal entered from the management computer 3.

In the present invention, for example, the robot R performs the following motions etc.: the robot R moves to the front position of the target object D (person) having the tag T, and performs the image pickup of the face image of the target object D; the robot R sounds the voice message such as "GOOD MORNING Mr. Kato"; and the robot R sends the predetermined message to the target object D (person).

Although there have been disclosed what are the patent embodiments of the invention, it will be understood by person skilled in the art that variations and modifications may be made thereto without departing from the scope of the invention, which is indicated by the appended claims.

According to the target object detection system of the present invention, since the positional relation between the target object and the detector (robot) can be detected, the application for various kinds of mobile object, e.g. a vehicle, and a traffic control system can be available.

What is claimed is:

1. A target object detection system for detecting a target object in a surrounding area of a detector using a tag provided on the target object, wherein the tag comprising:
  a radio wave receiver receiving radio wave transmitted from the detector;
  a light receiver receiving an infrared light signal irradiated from the detector;
  a receipt signal generator generating a receipt signal only when the light signal from the detector is received within a predetermined time after receiving radio wave; and
  a transmitter which transmits by wireless the receipt signal to the detector; and the detector comprising:
  a radio wave transmitter transmitting the radio wave to the surrounding area of the detector;
  a receiver receiving the receipt signal transmitted from the tag;
  a light emitter irradiating the light signal to a search region established around the detector;
  a controller controlling the radio wave transmitter, the receiver, and the light emitter; and
  a target position measuring unit measuring a distance from the detector to the target object based on the intensity of the receipt signal when the receipt signal is received by the receiver, and the target position measuring unit regarding the irradiation direction of the light signal from the light emitter as the direction of the target-object.

2. A target object detection system according to claim 1, wherein
  the receipt signal generator generates the receipt signal including an emission request signal when the light signal is not received within a predetermined time after receiving radio wave, and
  the controller controls the light emitter to irradiate the light signal when the receiver receives the receipt signal including the emission request signal.

3. A target object detection system according to claim 1, wherein
  a plurality of search regions are established around the detector and the detector is surrounded by a plurality of search regions.

4. A target object detection system according to claim 3, wherein
  the light emitter is provided for each search region, and each light emitter is directed to the corresponding search region,
  the light signal irradiated from each light emitter includes a unique identification number for identifying the light emitter which has irradiated the light signal,
  the receipt signal generator generates the receipt signal including the unique identification number, and
  the target position measuring unit identifies the light emitter which has irradiated the light signal received by the light receiver based on the unique identification number, and the target position measuring unit regards the search region corresponding to the identified light emitter as the direction of the target object.

5. A target object detection system according to claim 3, wherein
  the controller controls the irradiation of the light signal such that adjoining search regions are not irradiated consecutively, when the light signal is irradiated to the corresponding search region from each light emitter.

6. A target object detection system according to claim 1, wherein
  the tag further comprising:
  a light condition distinction unit checking whether the light received by the light receiver is a direct or reflected light within the search region, and generating a light condition data indicating the result of the check, wherein
  the receipt signal generator generates the receipt signal including the light condition data, and
  the target position measuring unit determines the direction of the target object based on the light condition data in addition to the irradiation direction of the light signal from the light emitter.

7. A target object detection system according to claim 6, wherein
  the detector further comprising:
  a map database which stores a map data of an area where the detector moves around, wherein
  the target position measuring unit determines the direction of the target object, based on map data, the irradiation direction of the light signal from the light emitter, and the light condition data, when the light received by the light receiver is not a direct light within the search region.

8. A target object detection system according to claim 6, wherein
the receipt signal generator generates the receipt signal including the light condition data, when the tag receives the radio wave and light signal which are irradiated from the detector.

9. A target object detection system according to claim 6, wherein
a plurality of search regions are established around the detector and the detector is surrounded by a plurality of search regions, and the light emitter is provided for each search region, and each light emitter is directed to the corresponding search region,
the light signal irradiated from each light emitter includes a unique identification number for identifying the light emitter which has irradiated the light signal,
the receipt signal generator generates the receipt signal including the unique identification number, and
the target position measuring unit identifies the light emitter which has irradiated the light signal received by the light receiver based on the unique identification number, and
the target position measuring unit identifies the direction of the target object based on at least the light condition data included in the receipt signal and the search region corresponding to the light emitter identified by the unique identification number.

10. A target object detection system according to claim 8, wherein
a plurality of search regions are established around the detector and the detector is surrounded by a plurality of search regions, and the light emitter is provided for each search region, and each light emitter is directed to the corresponding search region,
the light signal irradiated from each light emitter includes a unique identification number for identifying the light emitter which has irradiated the light signal,
the receipt signal generator generates the receipt signal including the unique identification number, and
the target position measuring unit identifies the light emitter which has irradiated the light signal received by the light receiver based on the unique identification number, and the target position measuring unit identifies the direction of the target object based on at least the light condition data included in the receipt signal and the search region corresponding to the light emitter identified by the unique identification number.

11. A target object detection system according to claim 1, wherein
the tag further comprising:
an activation controller activating the light receiver and receipt signal generator when radio wave from the detector is received, wherein
the receipt signal generator generates the receipt signal when the light signal from the detector is received within a first predetermined time after activating the light receiver and receipt signal generator.

12. A target object detection system according to claim 11, wherein
the receipt signal generator generates the receipt signal including an emission request signal when the light signal is not received within the first predetermined time after receiving radio wave from the detector, and the controller irradiates the light signal from the light emitter when the receiver receives the receipt signal including the emission request signal.

13. A target object detection system according to claim 11, wherein
the activation controller stops the light receiver and receipt signal generator, when the radio wave newly transferred from the detector is not received within a second predetermined time after transmitting the receipt signal including the emission request signal.

14. A target object detection system according to claim 11, wherein
a plurality of search regions are established around the detector and the detector is surrounded by a plurality of search regions, the light emitter is provided as the same number as the search region, each light emitter is directed to the corresponding search region,
the light signal irradiated from each light emitter includes a unique identification number for identifying the light emitter which has irradiated the light signal,
the receipt signal generator generates the receipt signal including the unique identification number, and
the target position measuring unit identifies the light emitter which has irradiated the light signal received by the light receiver based on the unique identification number, and the target position measuring unit regards the search region corresponding to the identified light emitter as the direction of the target object.

15. A target object detection system according to claim 13, wherein
the detector is a mobile robot which makes an action based on the command signal, and wherein
a plurality of search regions are established around the mobile robot and the mobile robot is surrounded by a plurality of search regions, the light emitter is provided as the same number as the search region, each light emitter is directed to the corresponding search region,
the light signal irradiated from each light emitter includes a unique identification number for identifying the light emitter which has irradiated the light signal,
the receipt signal generator generates the receipt signal including the unique identification number, and
the target position measuring unit identifies the light emitter which has irradiated the light signal received by the light receiver based on the unique identification number, and the target position measuring unit regards the search region corresponding to the identified light emitter as the direction of the target object.

16. A target object detection system according to claim 11, further comprising:
an external device generating a command signal which commands the detector to make an action defined by the command signal, the external device stores therein the information of the target object that are correlated with a tag ID for identifying the tag provided on the target object, wherein
the receipt signal generator generates the receipt signal including the tag ID, and
the controller of the detector transmits the information indicating the tag ID included in the receipt signal to the external device, wherein
the external device obtains the information of the target object based on the tag ID, and transmits it to the detector together with the command signal to the detector.

17. A target object detection system according to claim 1, wherein
- a plurality of search regions are established around the detector and the detector is surrounded by a plurality of search regions, the light emitter is provided as the same number as the search region, each light emitter is directed to the corresponding search region,
- the light signal irradiated from each light emitter includes a unique identification number for identifying the light emitter which has irradiated the light signal,
- the receipt signal generator generates receipt signal including the tag ID assigned to the tag which has the receipt signal generator in addition to the unique identification number,
- the tag further comprising:
- a slot storage storing a transmission timing of a plurality of slots which are established for allowing time-sharing, the transmission timing is being correlated with the unique identification number; and
- a slot selector selecting one slot from among a plurality of slots based on the unique identification number included in the light signal, wherein
- the transmitter transmits the receipt signal to the detector using a slot selected by the slot selector, and
- the detector identifies the light emitter which has irradiated the light signal received by the light receiver based on the unique identification number, and the detector regards the search region corresponding to the identified light emitter as the direction of the target object.

18. A target object detection system according to claim 17, wherein
- the detector further comprising:
- a tag counter counting the number of tags for each search region based on the tag ID and unique identification number, which are included in the receipt signal; and
- a slot number adjustor adjusting the transmission timing of at least one slot which is correlated with the unique identification number, based on the number of the tags counted by the tag counter, wherein
- the light emitter irradiates an infrared light including the information indicating correlation between the transmission timing and the unique identification number,
- the tag stores the correlation between the transmission timing and the unique identification number in the slot storage.

19. A target object detection system according to claim 17, wherein
- the receipt signal generator generates the receipt signal including an emission request signal when the light signal is not received within a predetermined time after receiving radio wave, and
- the controller controlling the light emitter to irradiate the light signal when the receiver receives the receipt signal including the emission request signal.

* * * * *